Figure 2:
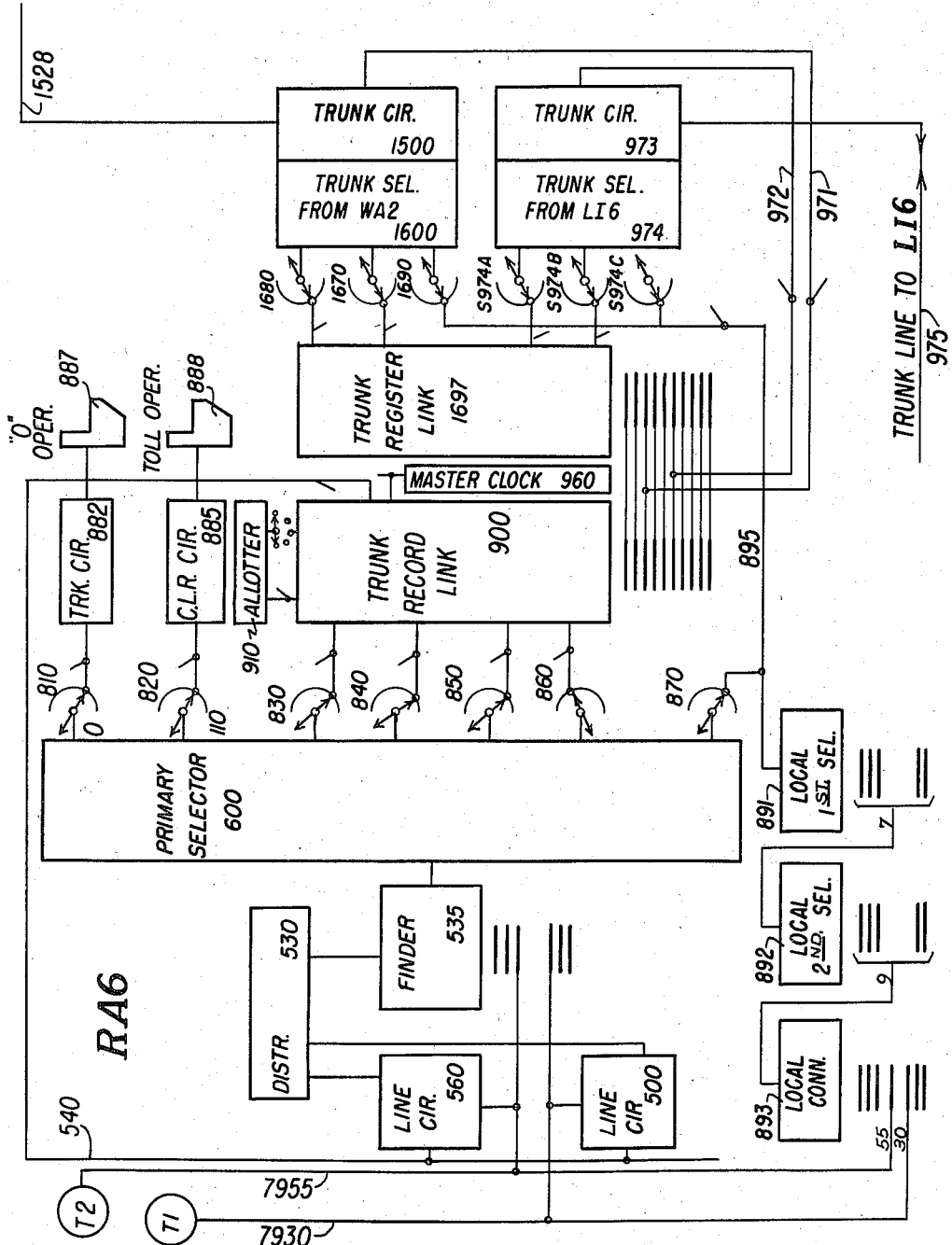

April 7, 1959
D. O. BAIRD ET AL
2,881,258
AUTOMATIC TELEPHONE SYSTEMS PROVIDED WITH
TOLL RECORDING FACILITIES
Filed Jan. 9, 1953
22 Sheets-Sheet 1
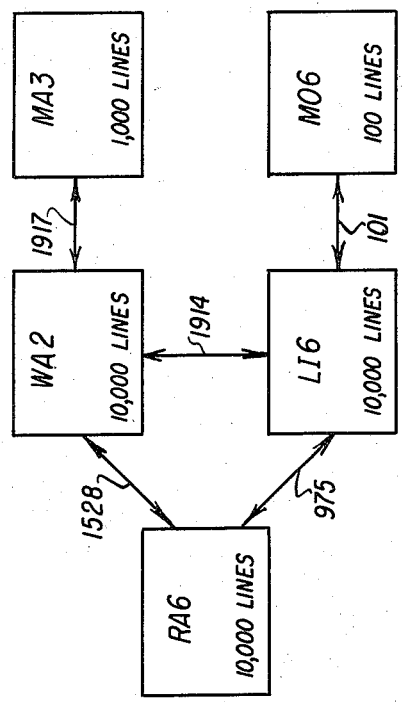
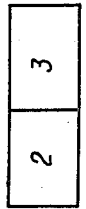
INVENTORS
Douglas O. Baird
BY Raymond G. Bielenberg
Smith, Olsen + Baird
Attys.

INVENTORS
Douglas O. Baird
Raymond G. Bielenberg
BY
Smith, Olsen & Baird
Attys.

PRIMARY SELECTOR 600

INVENTORS
Douglas O. Baird
Raymond G. Bielenberg

INVENTORS
Douglas O. Baird
Raymond G. Bielenberg
BY
Smith, Olsen + Baird
Attys.

INVENTORS
Douglas O. Baird
Raymond G. Bielenberg
BY
Smith, Olsen & Baird
Attys.

INVENTORS
Douglas O. Baird
Raymond G. Bielenberg
BY
Smith, Olsen + Baird
Attys.

INVENTORS
Douglas O. Baird
Raymond G. Bielenberg
BY
Smith, Olsen + Baird
Attys.

TRUNK SELECTOR 1800
FROM RA6

INVENTORS
Douglas O. Baird
Raymond G. Bielenberg
BY Smith, Olsen + Baird
Attys

INVENTORS
Douglas O. Baird
Raymond G. Bielenberg
BY
Smith, Olsen + Baird
Attys

United States Patent Office 2,881,258
Patented Apr. 7, 1959

2,881,258

AUTOMATIC TELEPHONE SYSTEMS PROVIDED WITH TOLL RECORDING FACILITIES

Douglas O. Baird, Skokie, and Raymond G. Bielenberg, Berwyn, Ill., assignors to General Telephone Laboratories, Incorporated, a corporation of Delaware Application January 9, 1953, Serial No. 330,522

21 Claims. (Cl. 179—18)

The present invention relates to automatic telephone systems involving toll recording facilities and more particularly to improved systems of the general character disclosed in the copending application of Douglas O. Baird and Raymond G. Bielenberg, Serial No. 276,164, filed March 12, 1952, in which short or suburban toll calls are set-up directly by subscribers at calling subscriber substations, without the assistance of operators, and in which records are automatically produced in conjunction with such toll calls for subscriber billing purposes.

Each office of an automatic telephone system of the character noted usually comprises a plurality of trunks terminating in switching apparatus, a plurality of register-translators, and equipment responsive to the presence of a calling line for connecting the calling line to an idle one of the trunks and for connecting an idle one of the register-translators to the one trunk. The subscriber at the subscriber substation on the calling line then proceeds to dial the three office code digits of the desired or called office and the four numerical digits of the desired or called subscriber line therein. The one register-translator registers the three office code digits and determines therefrom whether the call is to be completed in the local office of the calling subscriber line or in a remote office. In the event it is determined that the call is to be completed in the local office, the register-translator is dismissed after registering the third office code digits so that the four numerical digits dialed over the calling line are effective directly to operate the switching apparatus terminating the one trunk in order to extend the connection from the one trunk to the called line in the local office. On the other hand, in the event it is determined that the call is to be completed in a remote office, the register-translator is held and later effects operation of the switching apparatus terminating the one trunk to select a trunk line extending to the remote office, or at least to a tandem office in route to the remote office, and then transmits digits over the trunk line noted so that other equipment and switching apparatus may be controlled to complete the connection to the called line in the remote office. The connection between the one trunk and the trunk line over which the toll call is completed includes equipment for accumulating items of record information in conjunction with the toll call; and facility is provided for recording the items noted for billing purposes.

A telephone system of the character noted is quite satisfactory in operation; however, the number of register-translators required in each office is rather large since a register-translator is employed in conjunction with the extension of each call regardless of whether the call ultimately proves to be a local call or a toll call.

While it has been proposed that the switching apparatus in each office be arranged so that the trunk to which the register-translator is connected is seized by the switching apparatus only in the event of the extension of a toll call from the calling line, no simple arrangement of equipment to achieve this result has been suggested due primarily to the difficulty that the trunk noted must be selected by the switching apparatus in response to certain first office code digits and in response to certain combinations of first and second office code digits and in response to certain combinations of first and second and third office code digits, and the value of each of the office code digits noted employed in the operation of the switching apparatus to seize the trunk must be recaptured and registered subsequent to operation of the switching apparatus to seize the trunk.

Accordingly, it is a general object of the present invention to provide an improved apparatus for setting-up telephone connections in an automatic telephone system that employs at the calling office a primary selector that is connected to the calling subscriber line and that registers the complete called office code so that the single primary selector may readily and directly sort local and toll calls and forward them respectively to local switching apparatus and to a trunk record link in the calling office. The trunk record link recaptures and registers therein the complete called office code and immediately selects a trunk line to the called office, or to a tandem office in route to the called office, and then sends thereover the complete called office code registered therein. The tandem office also employs a trunk selector that is connected to the trunk line mentioned and that registers the complete called office code so that the single trunk selector may readily and directly sort terminating and through toll calls and forward them respectively to local switching apparatus and to a trunk register link in the tandem office. The trunk register link recaptures and registers therein the complete called office code and immediately selects a trunk line to the called office, or to another tandem office in route to the called office, and then sends thereover the complete called office code registered therein. Finally, the called office employs a trunk selector that is connected to the trunk line mentioned and that registers the complete called office code and selects directly the local switching apparatus in the called office. In the telephone system the called office code comprises three digits so that the primary selector and each of the trunk selectors mentioned is capable of registering and operating in response to the registration therein of the three digits of the called office code.

An important feature of the apparatus as noted above resides in the arrangement, whereby the mere dialing of the called office code over the calling subscriber line in the calling or originating office brings about the automatic extension of the connection to the local switching apparatus in the called or terminating office regardless of whether the call is local or toll and without reference to the number of tandem offices that may be required between the originating office and the terminating office in conjunction with the extension of a toll call, whereby both local and toll calls are set-up directly and exceedingly fast from calling subscriber lines in originating offices.

Another important feature of the apparatus as noted above resides in the arrangement, whereby both the trunk record link and the trunk register link are of the three-digit recapture type, since the respective seizing primary selector and trunk selector both register and are operated by the three digits of the called office code, thereby leading to simplification and uniformity in operation of the various selectors and links incorporated in the telephone system.

Another feature of the method and the apparatus, as noted above, resides in the arrangement, whereby the trunk record link in the calling or originating office is taken into use only in conjunction with toll calls and makes a record of the necessary items of information for subscriber billing purposes.

Another object of the invention is to provide in the originating office of the telephone system of the type described, an improved three-digit primary selector that preselects idle channels into the local switching apparatus, into the trunk record links, and into associated operator switchboard equipment.

Another object of the invention is to provide in the tandem office of the telephone system of the type described an improved three-digit trunk selector that preselects idle channels into the local switching apparatus and into the trunk register links.

A further object of the invention is to provide in a telephone system of the character described, an improved and simplified trunk link that is automatically set incident to the recapture of a called office code to register a variable number of numerical digits subsequently dialed over the connected calling subscriber line and depending upon the number of numerical digits in the directory number of the called subscriber line in the corresponding called office.

Further features of the invention pertain to the particular arrangement of the circuit elements of the telephone system, whereby the above-outlined and additional operating features thereof are attained.

*Section 1.—General arrangement of the telephone system*

Figure 3:
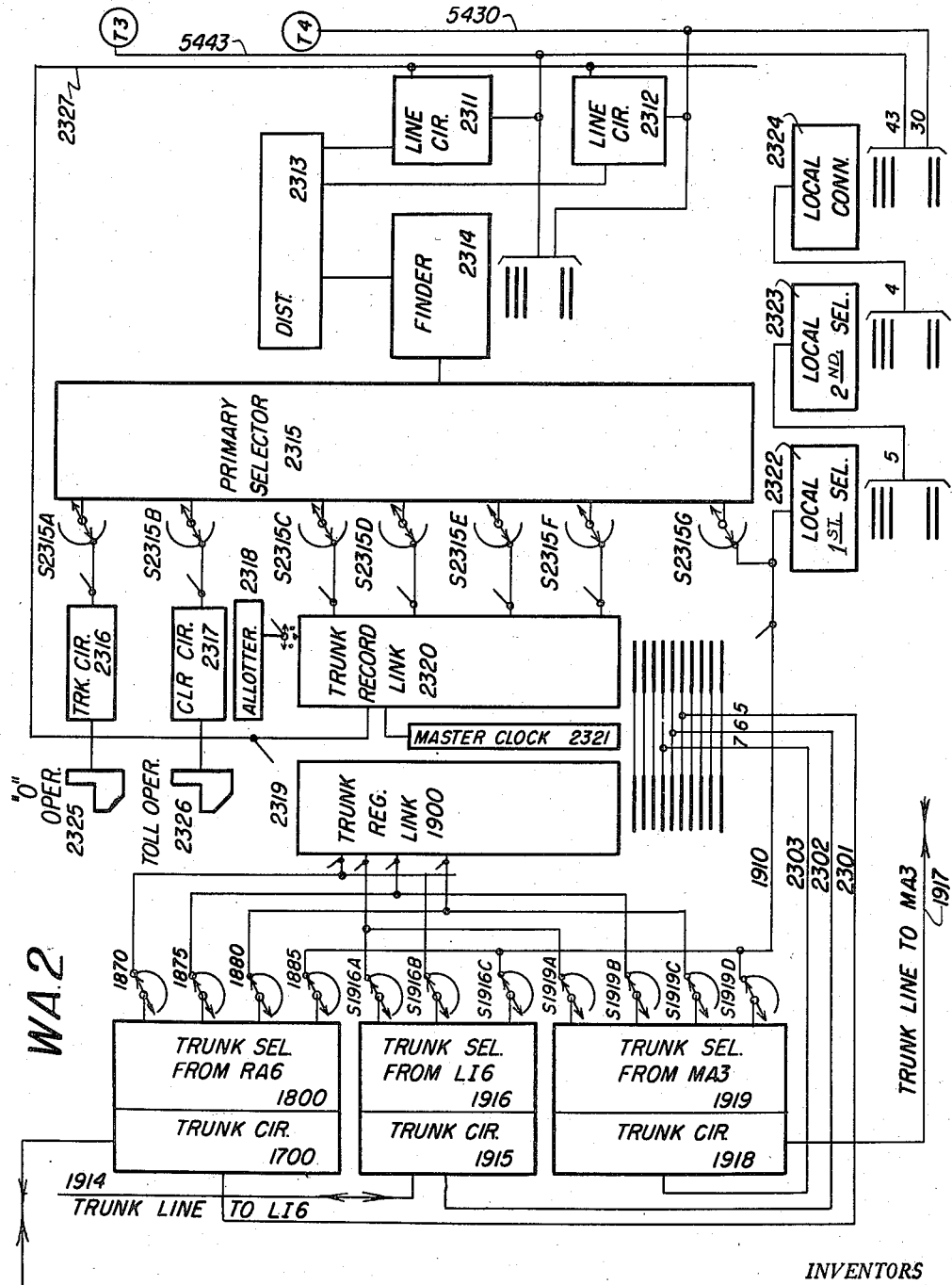

The invention, both as to its organization and method of operation, together with further objects and advantages thereof, will best be understood by reference to the following specification taken in connection with the accompanying drawings, in which Figure 1 is a schematic diagram of the area served by the telephone system incorporating apparatus embodying the present invention;

Figs. 2 and 3, taken together, are a schematic diagram of the general arrangement of the apparatus incorporated in two of the offices of the system shown in Fig. 1;

Fig. 4 illustrates the mode of combining Figs. 2 and 3 to form a unified diagram thereof;

Figs. 5 to 23, inclusive, taken together, illustrate the details of certain of the apparatus incorporated in the two offices shown in Figs. 2 and 3, which apparatus has embodied therein the features of the invention, as briefly outlined above; and Fig. 24 illustrates the mode of combining Figs. 5 to 23, inclusive, to form a unified diagram thereof.

Figure 5:
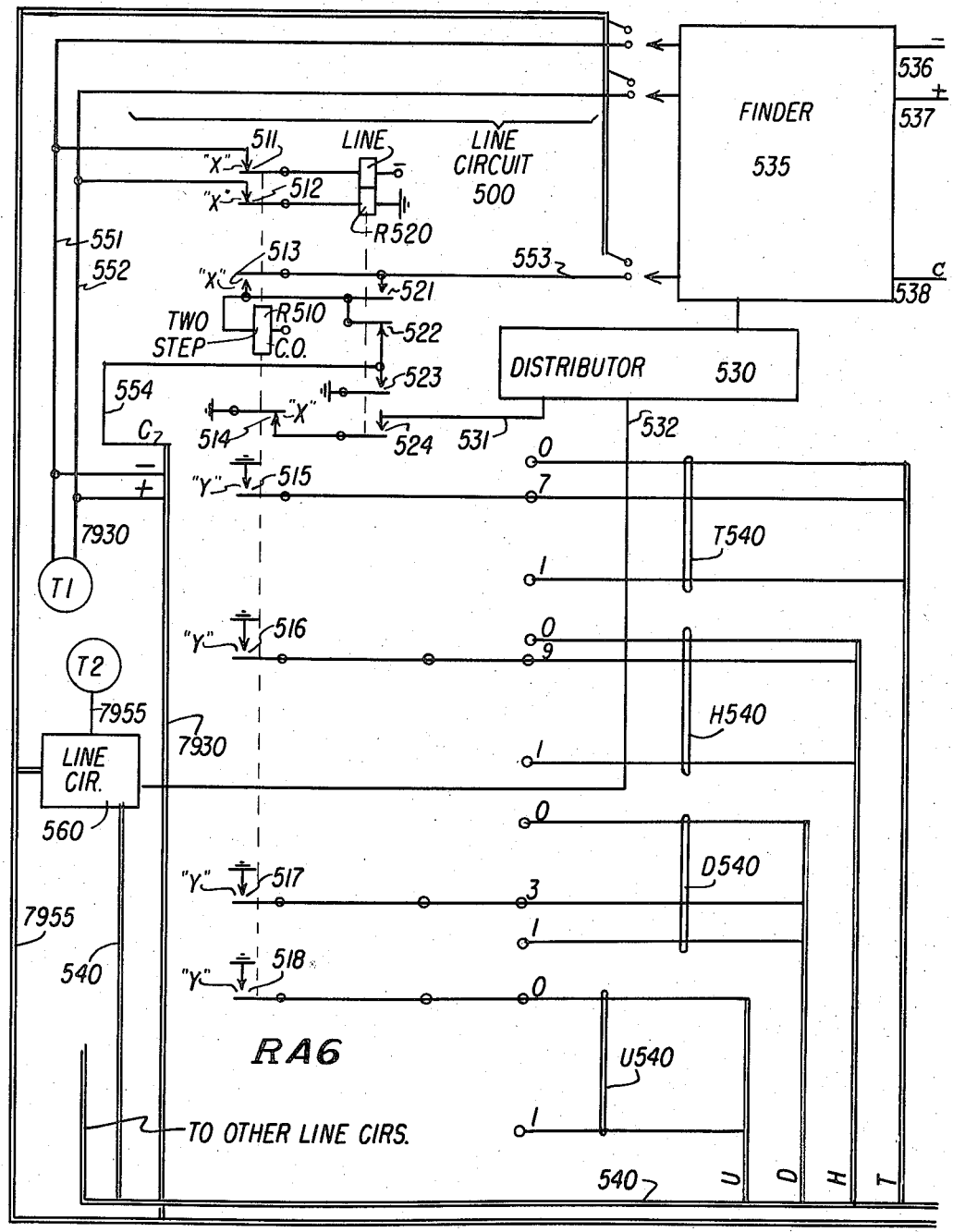
Figure 6:
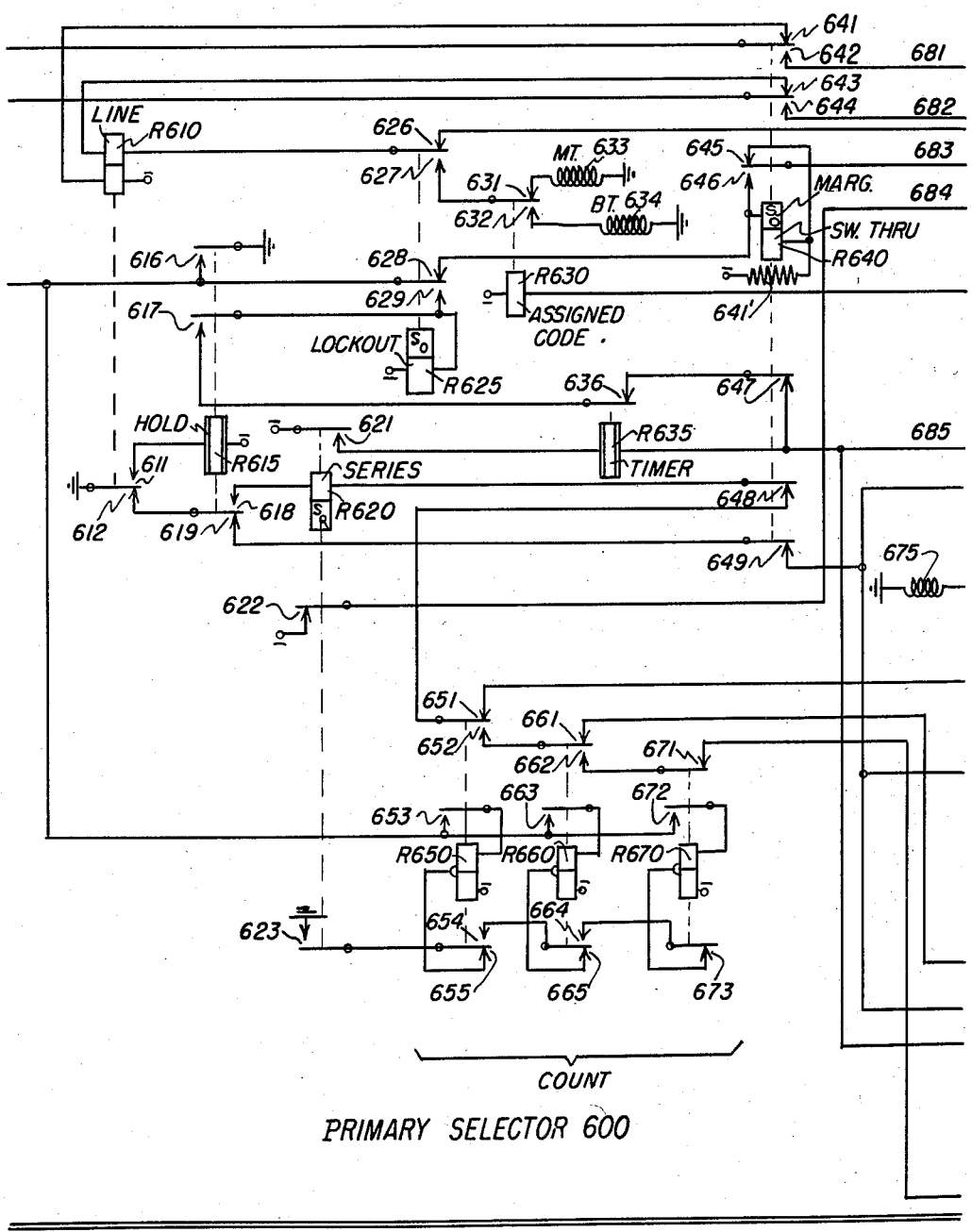
Figure 7:
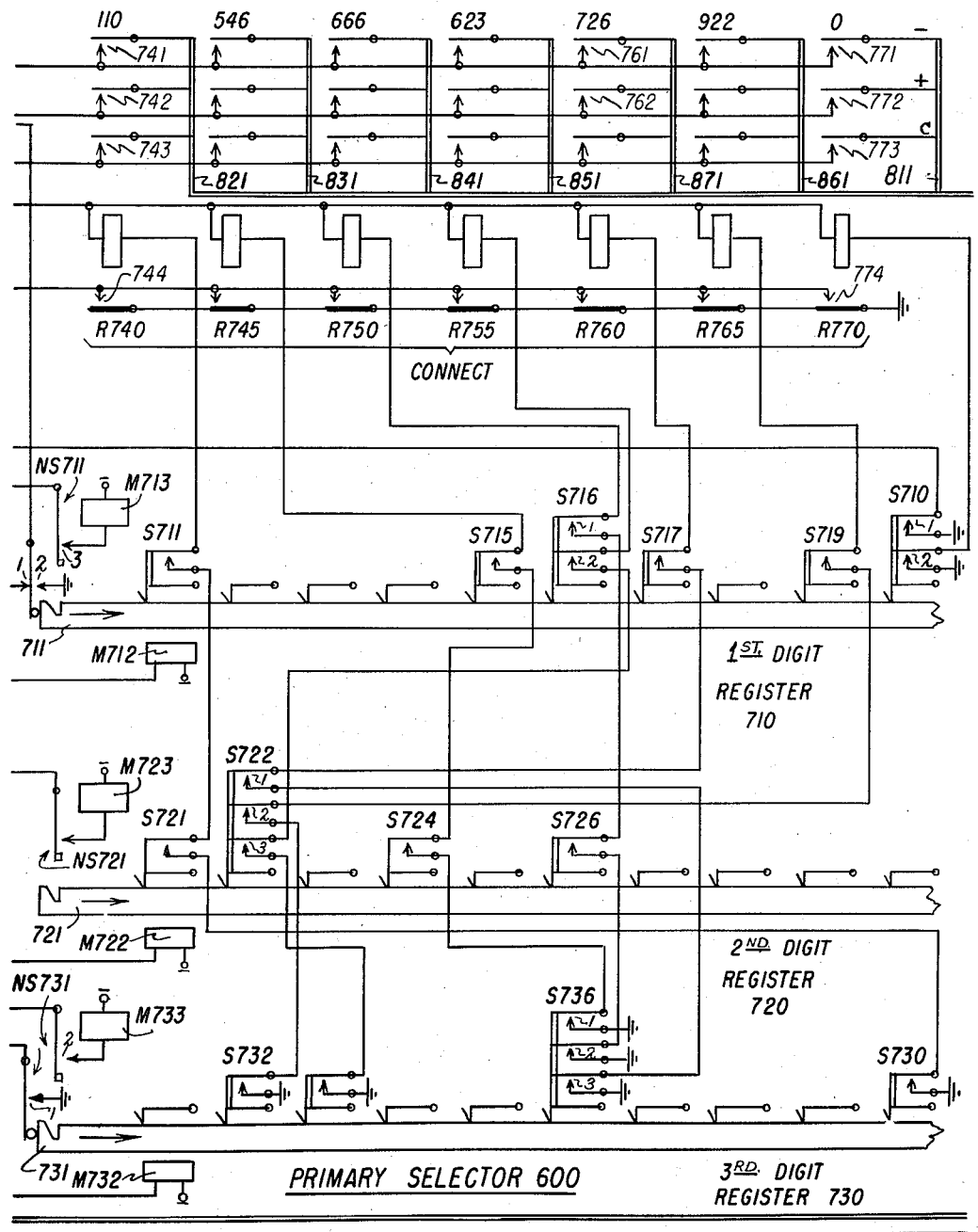
Figure 8:
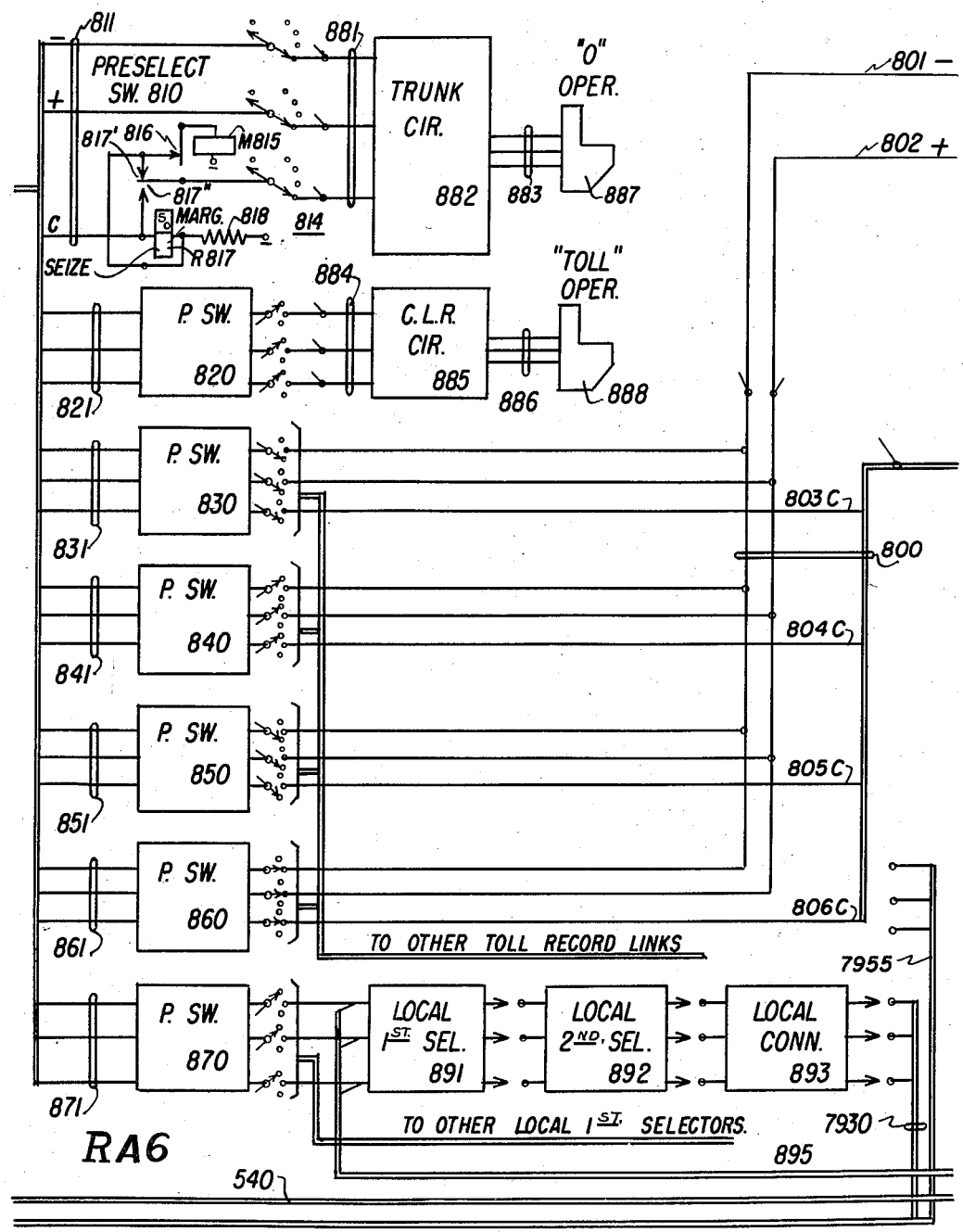
Figure 15:
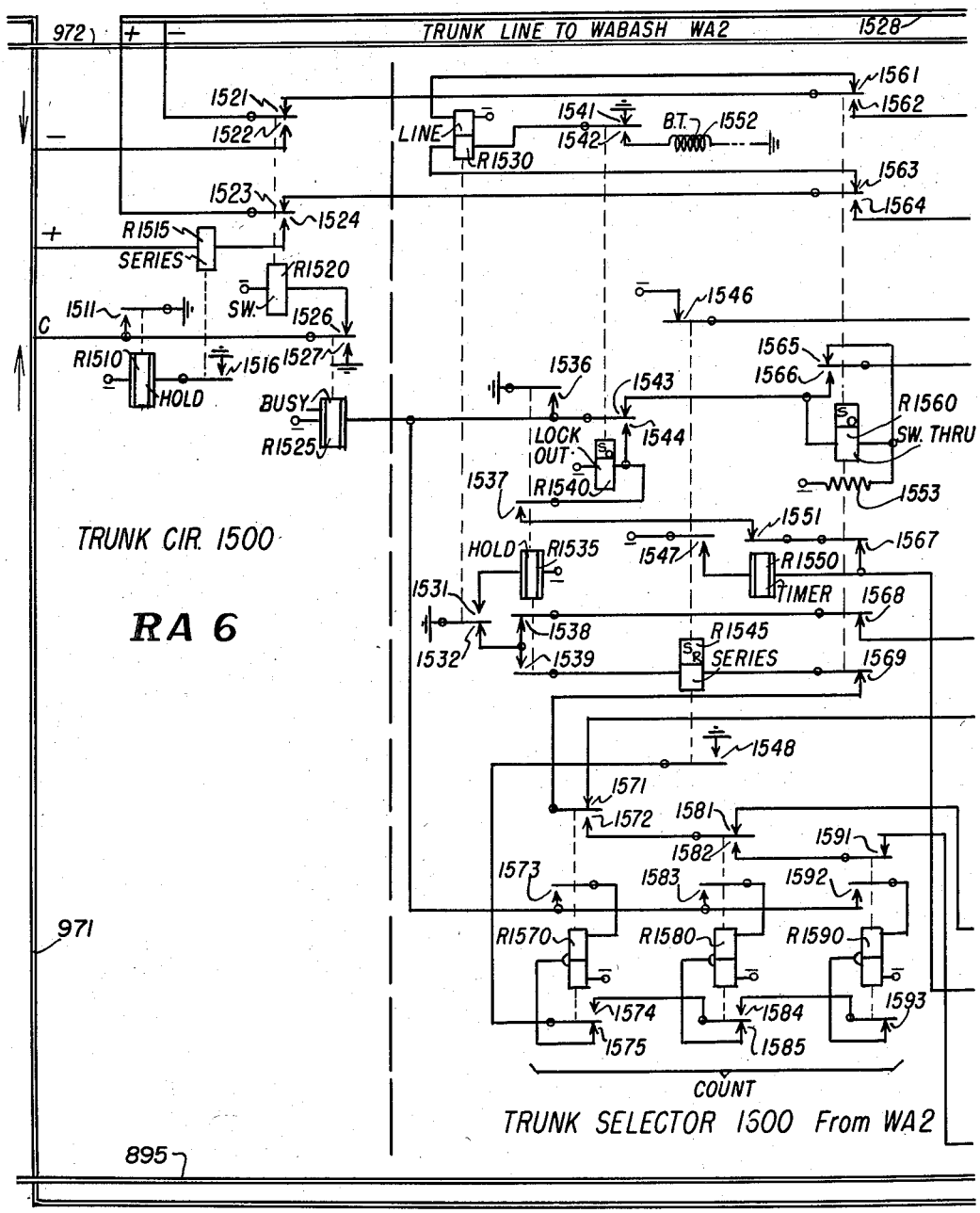
Figure 16:
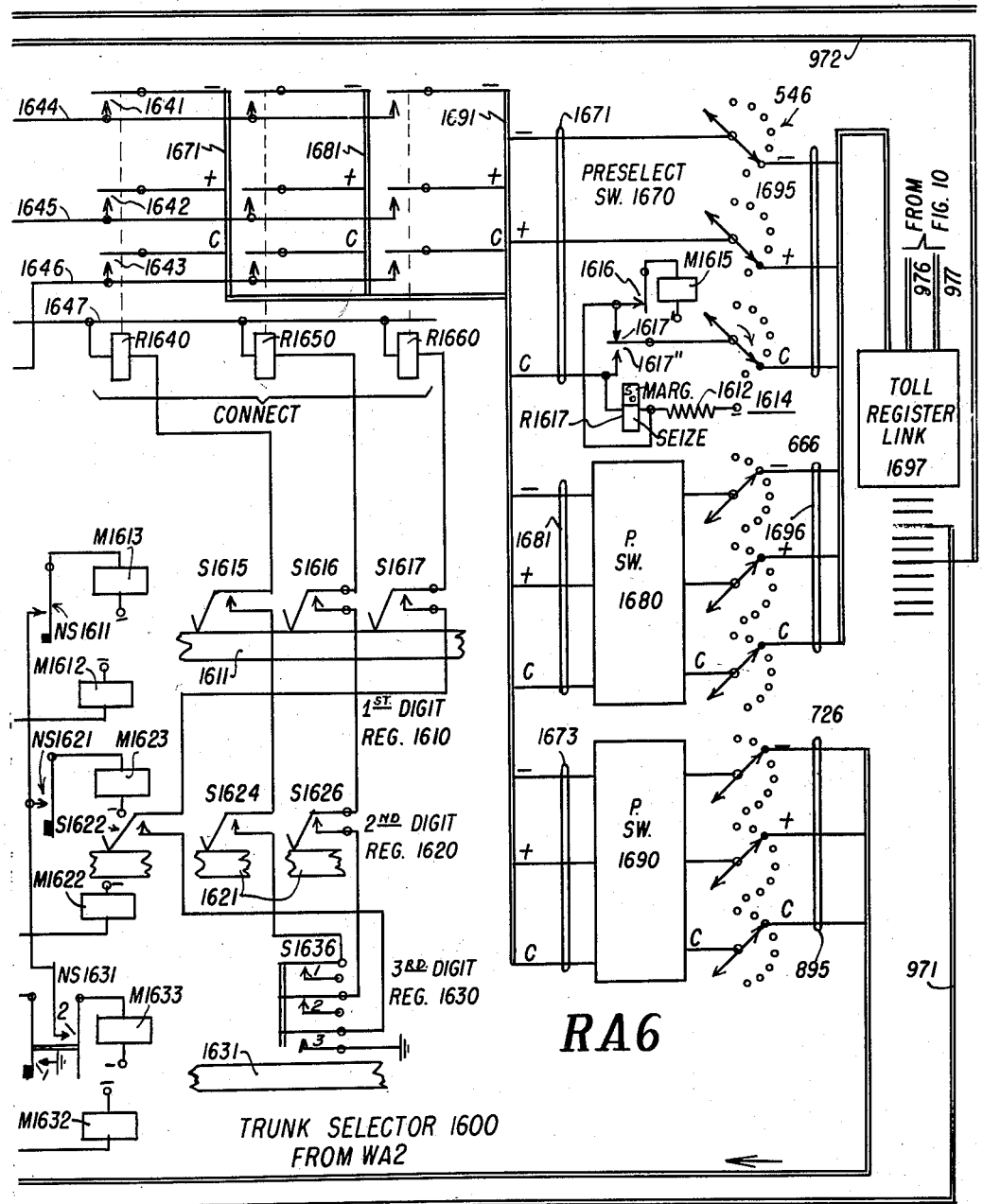
Figure 17:
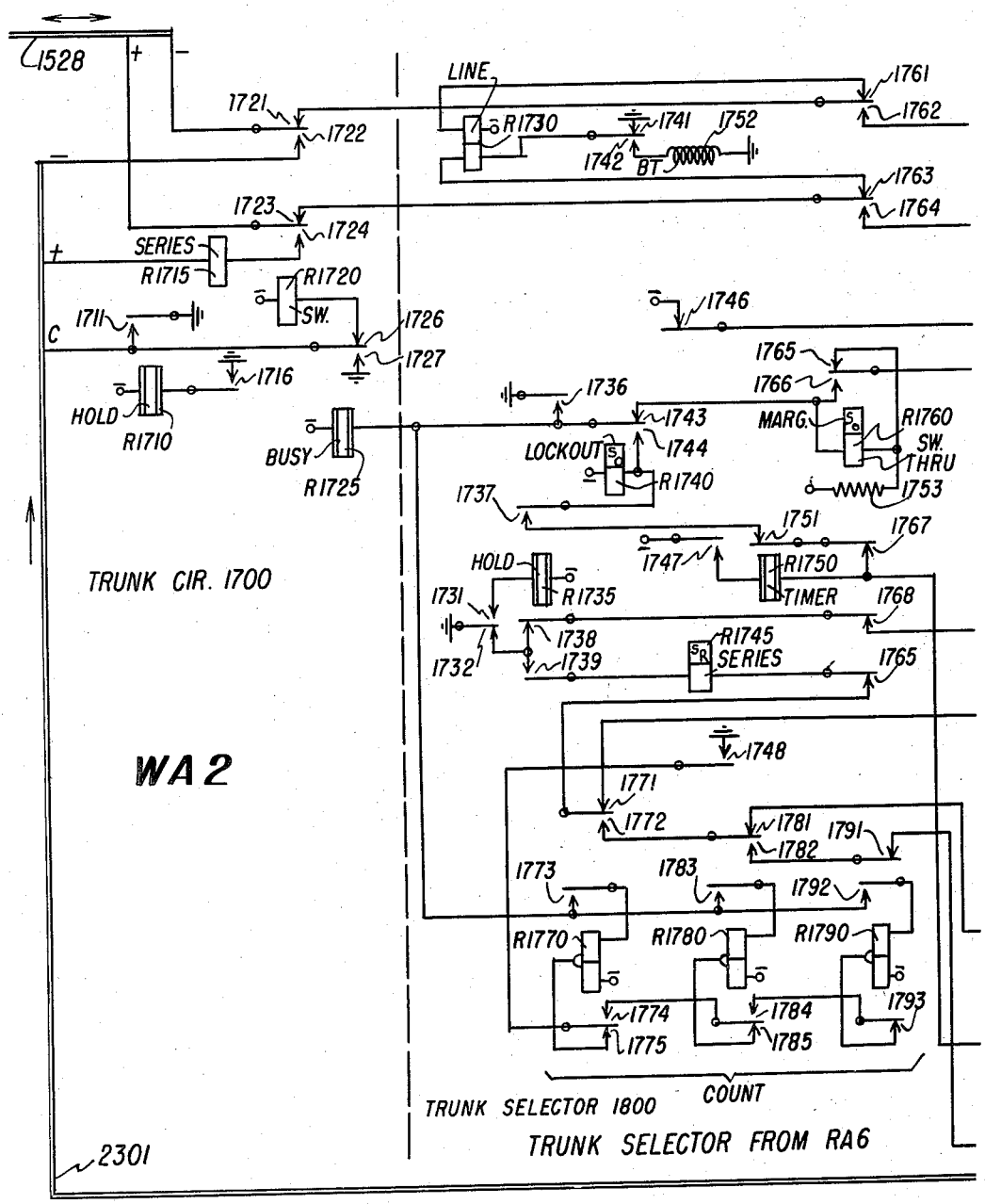
Figure 18:
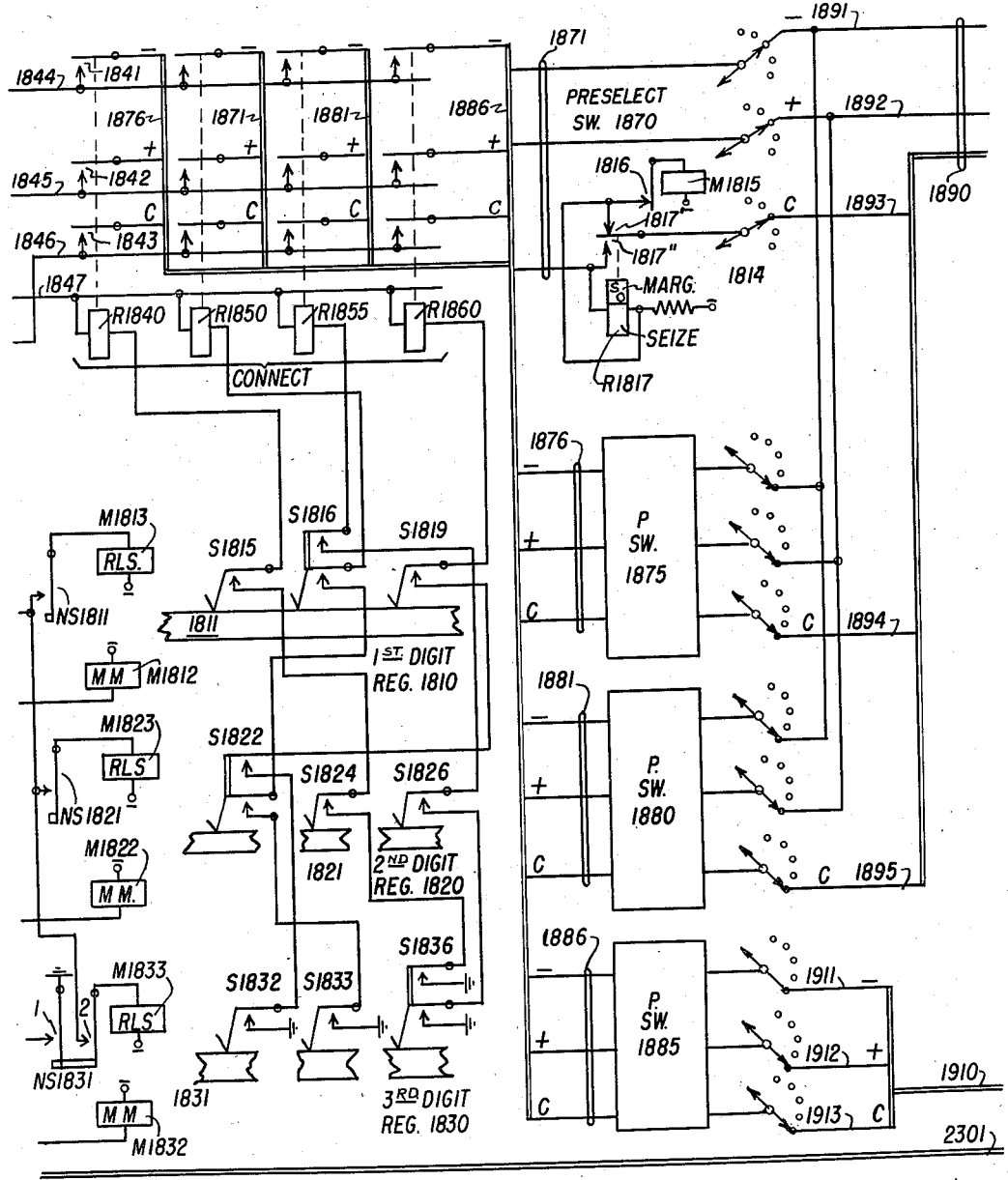
Figure 19:
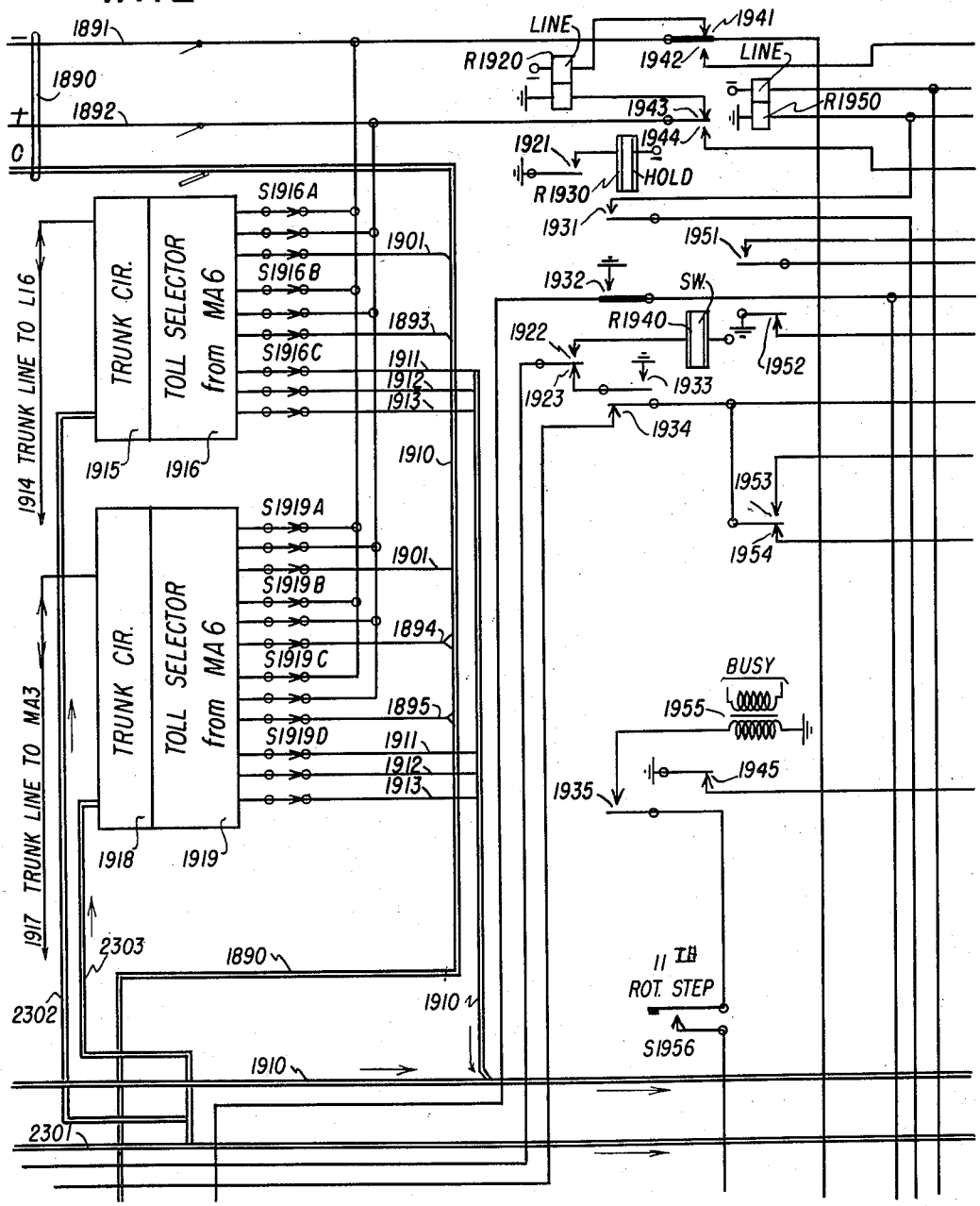
Figure 20:
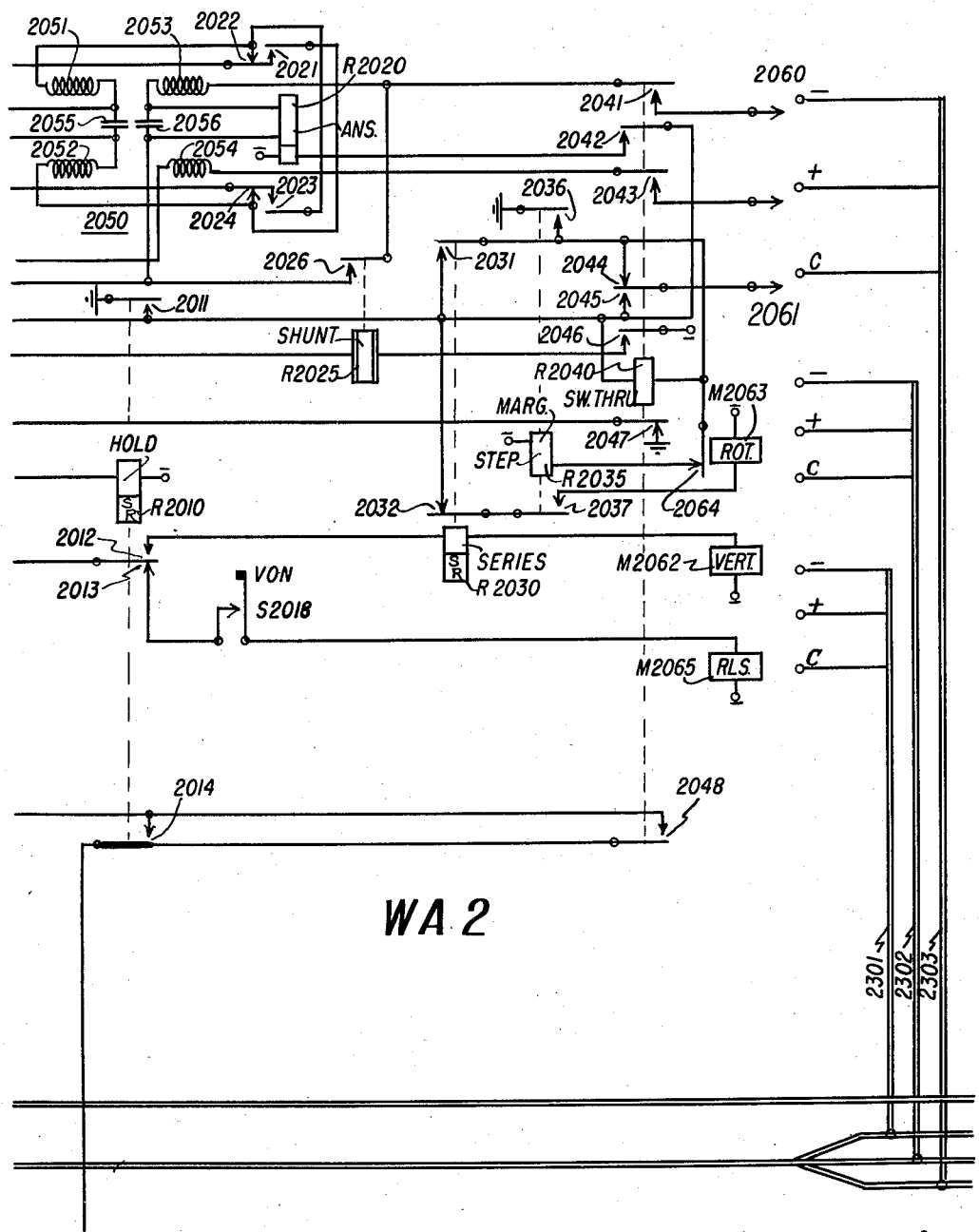
Figure 21:
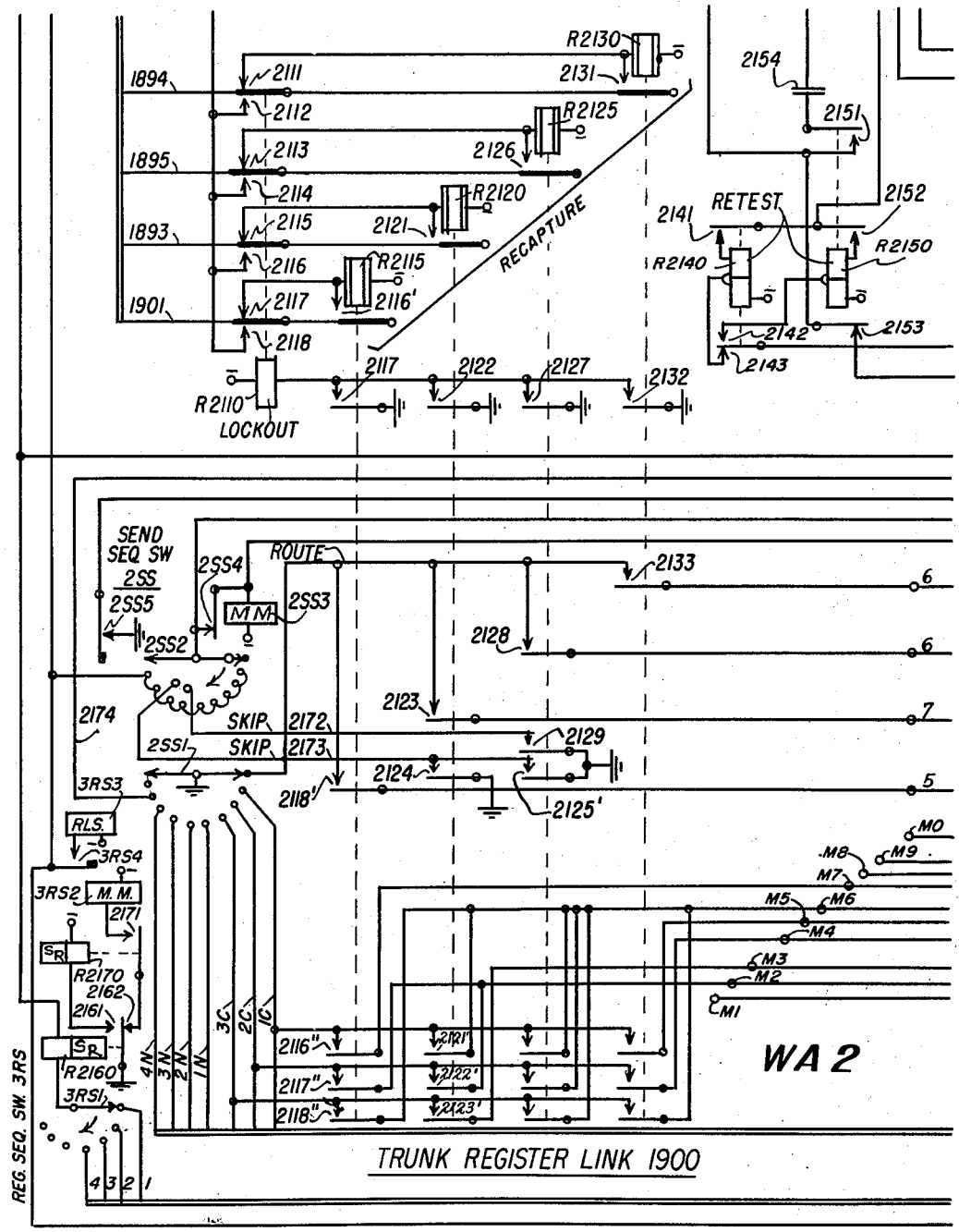
Figure 22:
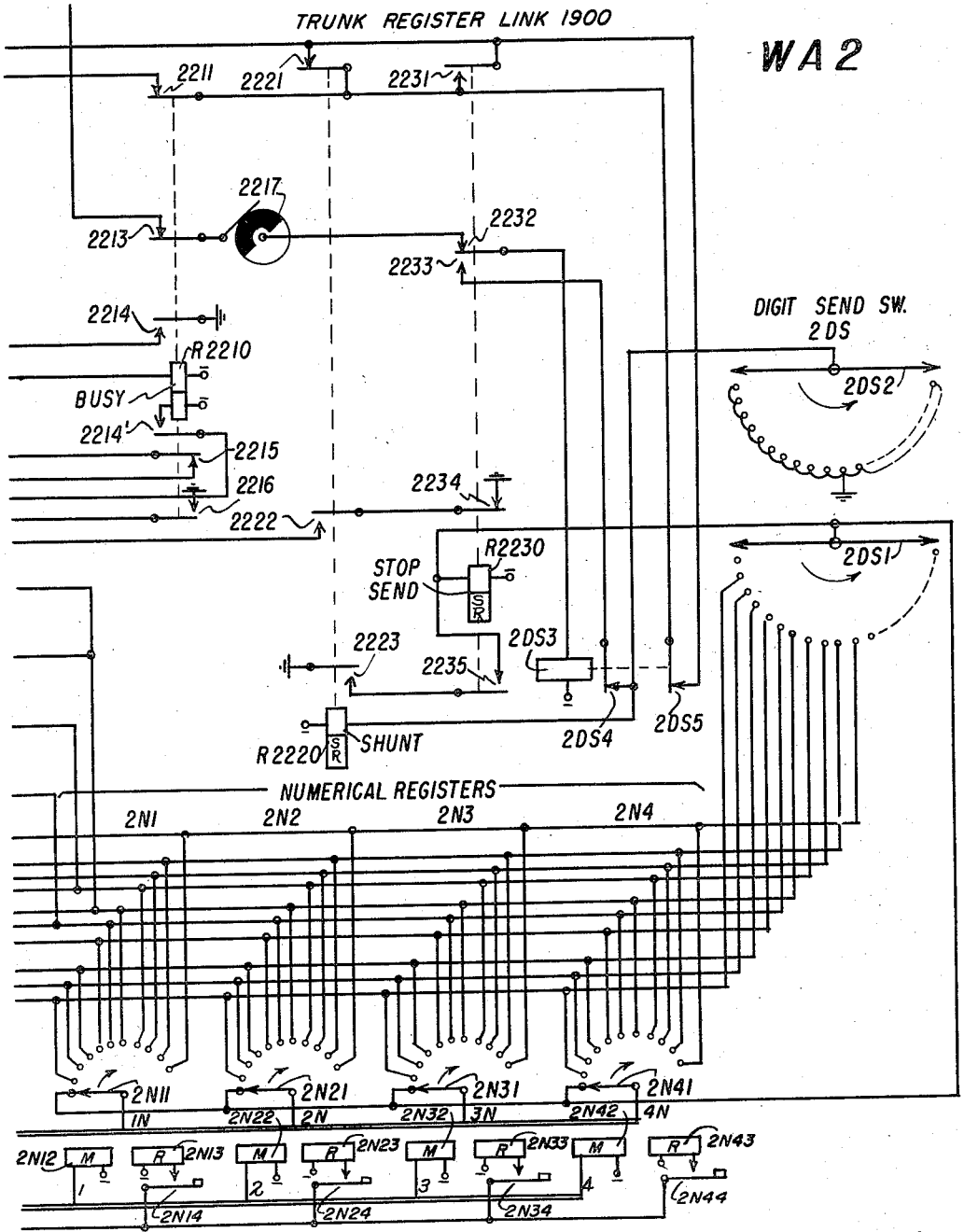
Figure 23:
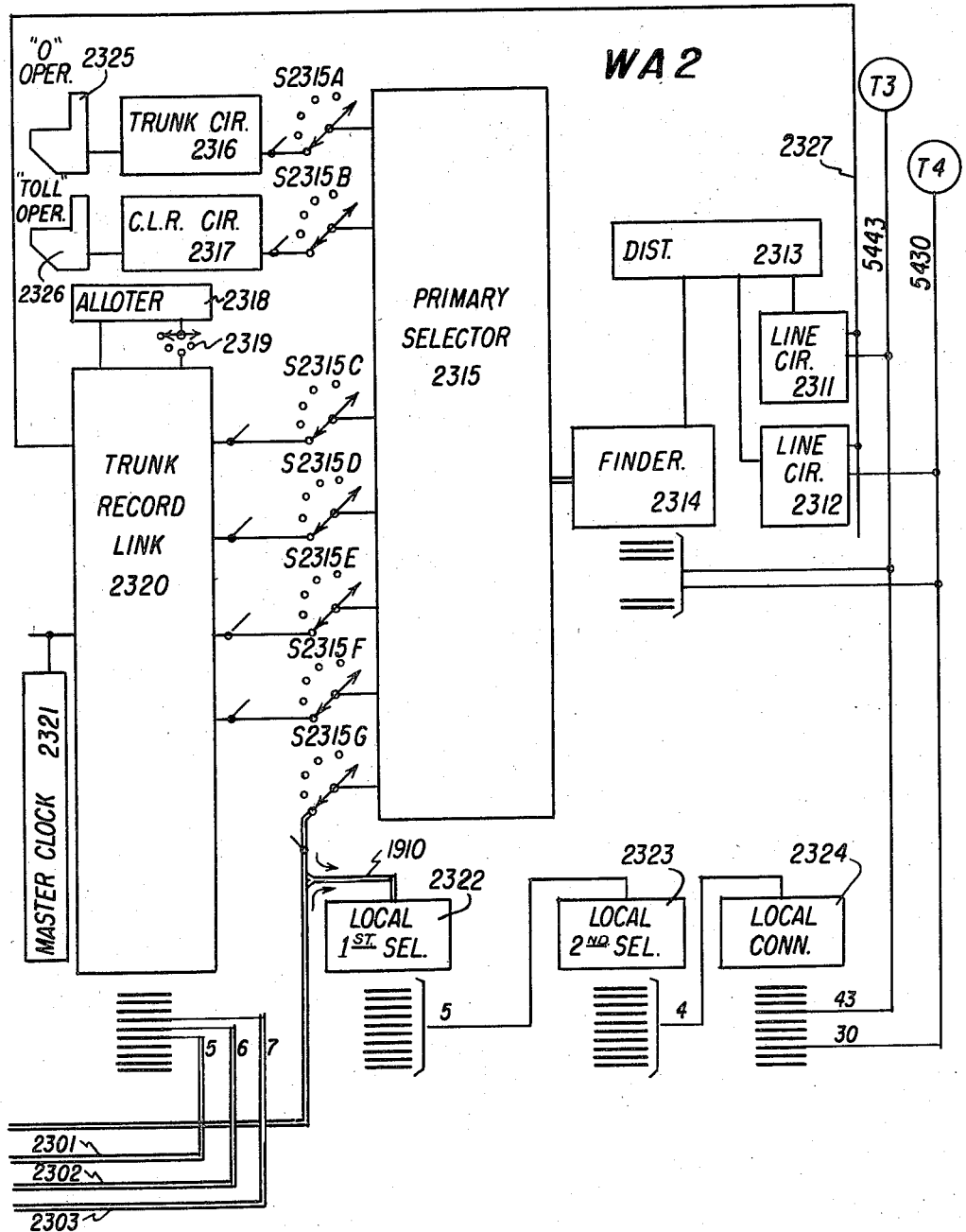

More particularly, Fig. 2 illustrates diagrammatically certain of the apparatus incorporated in the RAndolph-6 office of the telephone system; and Fig. 3 illustrates diagrammatically certain of the apparatus incorporated in the WAbash-2 office of the telephone system; Fig. 5 illustrates the details of one of the line circuits incorporated in the RAndolph-6 office; Figs. 6 to 8, inclusive, taken together, illustrate the details of the primary selector of one of the finder-primary selector links incorporated in the RAndolph-6 office; Figs. 9 to 14, inclusive, taken together, illustrate the details of one of the trunk record links incorporated in the RAndolph-6 office; Figs. 15 and 16, taken together, illustrate the details of one of the trunk circuits and the terminating trunk selector incorporated in the RAndolph-6 office; Figs. 17 and 18, taken together, illustrate the details of one of the trunk circuits and the terminating trunk selector incorporated in the WAbash-2 office; Figs. 19 to 22, inclusive, taken together, illustrate the details of one of the trunk register links incorporated in the WAbash-2 office; and Fig. 23 illustrates schematically certain of the switch apparatus incorporated in the WAbash-2 office.

Referring now to Fig. 1, the telephone system there illustrated serves an area comprising a number of offices, five of which are illustrated as RAndolph-6, WAbash-2, LIncoln-6, MAdison-3 and MOnroe-6. Each of the offices noted is of the automatic type and serves a corresponding number of subscriber lines. By way of illustration, the offices RA6, WA2 and LI6 may serve a maximum of ten-thousand subscriber lines each; the MA3 office may serve a maximum of one-thousand subscriber lines; and the MO6 office may serve a maximum of one-hundred subscriber lines. Each of the offices comprises apparatus for establishing local connections between the various subscriber substations therein, apparatus for extending connections from the various subscriber substations therein to the other offices, apparatus for completing connections extended from the other offices to the subscriber substations therein, and apparatus for extending tandem connections between various ones of the other offices. Also, each of the offices comprises equipment for automatically producing trunk records in conjunction with trunk connections involving calling subscriber substations therein.

The RA6 office and the WA2 office are interconnected by a group of trunk lines, including the trunk line 1528; the RA6 office and the LI6 office are interconnected by a group of trunk lines, including the trunk line 975; the WA2 office and the LI6 office are interconnected by a group of trunk lines, including the trunk line 1914; the WA2 office and the MA3 office are interconnected by a group of trunk lines, including the trunk lines 1917; and the LI6 office and the MO6 office are interconnected by a group of trunk lines, including the trunk line 101. In the telephone system and with reference to the RA6 office, the group of trunk lines 1528, etc., comprises a first choice route to the WA2 and the MA3 offices, while the group of trunk lines 975, etc., comprises a second choice route to the WA2 and the MA3 offices via the LI6 office in tandem relation. Similarly, with reference to the RA6 office, the group of trunk lines 975, etc., comprises a first choice route to the LI6 and the MO6 offices, while the group of trunk lines 1528, etc., comprises a second choice route to the LI6 and the MO6 offices via the WA2 office in tandem relation.

Referring now to Fig. 2, in the RA6 office, two of the subscriber substations T1 and T2 are illustrated as being connected to the subscriber lines having the respective directory numbers 7930 and 7955. Each of the subscriber lines is provided with a line circuit individual thereto, the line circuits 500 and 560 being individual to the respective subscriber lines 7930 and 7955. Also the RA6 office comprises a local switch train, including a plurality of finder-primary selector link groups respectively associated with the individual one-hundred line groups of subscriber lines. The group of finder-primary selector links associated with the 7900 group of subscriber lines includes the finder-primary selector link illustrated consisting of the finder 535 and the primary selector 600. Accordingly, the finder 535 has access to the 7900 group of subscriber lines, including the subscriber lines 7930 and 7955. Also, this group of finder-primary selector links is provided with an associated distributor 530 that is operatively associated with the line circuits 500, 560, etc., of the subscriber lines in the 7900 group. In the arrangement, each of the primary selectors 600, etc., is adapted to receive and register the three digits of any assigned called office code, as well as the three digits of an assigned toll or special service code, and the single digit 0 assigned to manual operator calls; and further, each of the primary selectors 600, etc., is provided with a corresponding plurality of preselect switches that are employed for a purpose more fully explained hereinafter. Also the local switch train in the RA6 office comprises a group of local first selectors 891, etc., groups of local second selectors, the seventh group of local second selectors including the local second selectors 892, etc., and groups of local connectors, one of the ninth groups of local connectors including the local connectors 893, etc. Thus, in the arrangement, the local first selectors 891, etc., have access to the local second selectors 892, etc.; the local second selectors 892, etc., have access to the local connectors 893, etc.; and the local connectors 893, etc., have access to the subscriber lines 7930, 7955, etc.

Also, the RA6 office is provided with a manual or 0 operator switchboard 887 accessible via a group of trunk circuits 882, etc., as well as a toll operator switchboard 888 accessible via a group of CLR circuits 885, etc. Further in the RA6 office, there are provided an appropriate group of trunk record links 900, etc., having an associated allotter 910 and an appropriate group of trunk register links 1697, etc. In the RA6 office, the trunk lines 1528, 975, etc., are respectively terminated in trunk circuits 1500, 973, etc., that are respectively provided with trunk selectors 1600, 974, etc.; which trunk selectors 1600, 974, etc., are respectively provided with appropriate groups of preselect switches that are employed for a purpose more fully explained hereinafter. Finally, a master clock 960 provided in the RA6 office is commonly associated with the various trunk record links 900, etc.

Each of the primary selectors 600, etc., is capable of registering the complete code of a called service or office and is provided with corresponding associated preselect switches that are employed for the purpose of extending the corresponding connections. For example, the primary selector 600 is capable of registering the single digit 0 and is provided with the corresponding preselect switch 810 for extending connections via the trunk circuits 882, etc., to the 0 operator switchboard 887. Also the primary selector 600 is capable of registering the three digits 1, 1 and 0 and is provided with the corresponding preselect switch 820 for extending connections via the CLR circuits 885, etc., to the toll operator switchboard 888. Further, the primary selector 600 is capable of registering the three digits 7, 2 and 6 and is provided with the corresponding preselect switch 870 for extending connections to the local first selector 891, etc. Finally, the primary selector 600 is capable of registering the called office codes 546, 666, 623 and 922 and is provided with the corresponding preselect switches 830, 840, 850 and 860 for extending connections to the trunk record links 900, etc. The trunk record links 900, etc., are of the three-digit recapture type so that when a connection is extended thereto via one of the preselect switches 830, etc., of one of the primary selectors 600, etc., the corresponding called office code is automatically recaptured and registered therein.

Each of the trunk selectors 1600, etc., is capable of registering the complete code of a called office and is provided with corresponding associated preselect switches that are employed for the purpose of extending the corresponding connections; for example, the trunk selector 1600 is capable of registering the called office code 726 and is provided with the corresponding preselect switch 1690 for extending connections to the local first selectors 891, etc. Further, the trunk selector 1600 is capable of registering the called office codes 666 and 546 and is provided with the corresponding preselect switches 1680 and 1670 for extending connections to the trunk register links 1697, etc. The trunk register links 1697, etc., are of the three-digit recapture type so that when a connection is extended thereto via one of the preselect switches 1680, etc., of one of the trunk selectors 1600, etc., the corresponding called office code is automatically recaptured and registered therein.

Similarly, the trunk selector 974 is capable of registering the called office code 726 and is provided with the corresponding preselect switch S974C for extending connections to the local first selectors 891, etc. Further, the trunk selector 974 is capable of registering the called office codes 623 and 922 and is provided with the corresponding preselect switches S974A and S974B for extending connections to the trunk register links 1697, etc.

Finally, each of the trunk record links 900, etc., and each of the trunk register links 1697, etc., have access to the trunk circuits 1500, etc., via the trunks 971, etc., and to the trunk circuits 973, etc., via the trunks 972, etc. Further, in the RA6 office, a common marking cable 540 is provided, one end of the marking cable 540 being commonly multipled to each of the line circuits 500, 560, etc., and the other end of the marking cable 540 being commonly multipled to each of the toll record links 900, etc.

Referring now to Fig. 3, in the WA2 office, two of the subscriber substations T3 and T4 are illustrated as being connected to the subscriber lines having the respective directory numbers 5443 and 5430. Each of the subscriber lines is provided with a line circuit individual thereto, the line circuits 2311 and 2312 being individual to the respective subcriber lines 5443 and 5430. Also the WA2 office comprises a local switch train, including a plurality of finder-primary selector link groups respectively associated with the individual one-hundred line groups of subscriber lines. The group of finder-primary selector links associated with the 5400 group of subscriber lines includes the finder-primary selector link illustrated consisting of the finder 2314 and the primary selector 2315. Accordingly, the finder 2314 has access to the 5400 group of subscriber lines, including the subscriber lines 5443 and 5430. Also this group of finder-primary selector links is provided with an associated distributor 2313 that is operatively associated with the line circuits 2311, 2312, etc., of the subscriber lines in the 5400 group. In the arrangement, each of the primary selectors 2315, etc., is adapted to receive and register the three digits of any assigned called office code, as well as the three digits of an assigned toll or special service code, and the single digit 0 assigned to manual operator calls; and further, each of the primary selectors 2315, etc., is provided with a corresponding plurality of preselect switches that are employed for a purpose more fully explained hereinafter. Also the local switch train in the WA2 office comprises a group of local first selectors 2322, etc., groups of local second selectors, the fifth group of local second selectors including the local second selectors 2323, etc., and groups of local connectors, one of the fourth groups of local connectors including the local connectors 2324. Thus in the arrangement, the local first selectors 2322, etc., have access to the local second selectors 2323, etc.; the local second selectors 2323, etc., have access to the local connectors 2324, etc.; and the local connectors 2324, etc., have access to the subscriber lines 5443, 5430, etc.

Also, the WA2 office is provided with a manual or 0 operator switchboard 2325 accessible via a group of trunk circuits 2316, etc., as well as a toll operator switchboard 2326 accessible via a group of CLR circuits 2317, etc. Further, in the WA2 office, there are provided an appropriate group of trunk record links 2320, etc., having an associated allotter 2318, and an appropriate group of trunk register links 1900, etc. In the WA2 office, the trunk lines 1528, 1914, 1917, etc., are respectively terminated in trunk circuits 1700, 1915, 1918, etc., that are respectively provided with trunk selectors 1800, 1916, 1919, etc.; which trunk selectors 1800, 1916, 1919, etc., are respectively provided with appropriate groups of preselect switches that are employed for a purpose more fully explained hereinafter. Finally, a master clock 2321 provided in the WA2 office is commonly associated with the various trunk record links 2320, etc.

Each of the primary selectors 2315, etc., is capable of registering the complete code of a called service or office and is provided with corresponding associated preselect switches that are employed for the purpose of extending the corresponding connections. For example, the primary selector 2315 is capable of registering the single digit 0 and is provided with the corresponding preselect switch S2315A for extending connections via the trunk circuits 2316, etc., to the 0 operator switchboard 2325. Also the primary selector 2315 is capable of registering the three digits 1, 1 and 0 and is provided with the corresponding preselect switch S2315B for extending connections via the CLR circuit 2317, etc., to the toll operator switchboard 2326. Further, the primary selector 2315 is capable of registering the three digits 9, 2 and 2 and is provided with the corresponding preselect switch S2315G for extending connections to the local first selectors 2322, etc. Finally, the primary selector 2315 is capable of registering the called office codes 726, 623, 666 and 546 and is provided with the corresponding preselect switches S2315C, S2315D, S2315E and S2315F for extending connections to the trunk record links 2320, etc. The trunk record links 2320, etc., are of the three-digit recapture type so that when a connection is extended thereto via one of the preselect switches S2315C, etc., of one of the primary selectors 2315, etc., the corresponding called office code is automatically recaptured and registered therein.

Each of the trunk selectors 1800, etc., is capable of registering the complete code of a called office and is provided with corresponding associated preselect switches that are employed for the purpose of extending the corresponding connections. For example, the trunk selector 1800 is capable of registering the called office code 922 and is provided with the corresponding preselect switch 1885 for extending connections to the local first selectors 2322, etc. Further, the trunk selector 1800 is capable of registering the called office codes 623, 546 and 666 and is provided with the corresponding preselect switches 1870, 1875 and 1880 for extending connections to the trunk register links 1900, etc. The trunk register links 1900, etc., are of the three-digit recapture type so that when a connection is extended thereto via one of the preselect switches 1870, etc., of one of the trunk selectors 1800, etc., the corresponding called office code is automatically recaptured and registered therein.

Similarly the trunk selector 1916 is capable of registering the called office code 922 and is provided with the corresponding preselect switch S1916C for extending connections to the local first selectors 2322, etc. Further, the trunk selector 1916 is capable of registering the called office codes 726 and 623 and is provided with the corresponding preselect switches S1916A and S1916B for extending connections to the trunk register links 1900, etc. Also the trunk selector 1919 is capable of registering the called office code 922 and is provided with the corresponding preselect switch S1919D for extending connections to the local first selectors 2322, etc. Further, the trunk selector 1919 is capable of registering the called office codes 726, 546 and 666 and is provided with the corresponding preselect switches S1919A, S1919B and S1919C for extending connections to the trunk register links 1900, etc.

Finally, each of the trunk record links 2320, etc., and each of the trunk register links 1900, etc., have access to the trunk circuits 1700, etc., 1915, etc., and 1918, etc., via the trunks 2301, etc., 2302, etc., and 2303, etc.

Further, in the WA2 office, a common marking cable 2327 is provided, one end of the marking cable 2327 being commonly multipled to each of the line circuits 2311, 2312, etc., and the other end of the marking cable 2327 being commonly multipled to each of the trunk record links 2320, etc.

In view of the foregoing, it will be understood that each of the other offices LI6, etc., is provided with apparatus substantially identical to that described in conjunction with the RA6 and WA2 offices, the local switch train in each of the offices mentioned being appropriate to the number of subscriber lines served therein.

*Section 2.—The apparatus incorporated in the telephone system*

In the various offices RA6, etc., each of the subscriber substations T1, etc., is provided with conventional sub-subscriber substation apparatus including a telephone instrument, a dial mechanism and a ringer. Also, the finders 535, 2314, etc., the various selectors 891, 892, 2322, 2323, etc., and the local connectors 893, 2324, etc., are of conventional Strowger types, and the distributors 530, 2313, etc., may be of any suitable type.

The line circuits 500, 560, 2311, 2312, etc., may be substantially identical; and the line circuit 500, illustrated in Fig. 5, comprises a relay group, including a cutoff relay R510 of the two-step type and a line relay R520. The cutoff relay R510 is operative through its first step to serve the usual cutoff function and is operative through its second step to serve the purpose of marking the directory number of the subscriber line 7930 to the marking cable 540 that extends to the various toll record links 900, etc., the marking cable 540 commonly extending to each of the line circuits 500, 560, etc., in the RA6 office, as previously noted. More particularly, the marking cable 540 comprises four groups of marking conductors T540, H540, D540 and U540 respectively corresponding to the thousand, the hundred, the ten and the unit digits of the directory number of the various subscriber lines 7930, etc. Each of the groups of marking conductors T540, etc., includes ten individual marking conductors respectively corresponding to the ten values of the corresponding digit. Accordingly, in the line circuit 500, the cut-off relay R510 is provided with "Y" contacts 515, 516, 517 and 518 respectively marking the seventh, ninth, third and tenth conductors in the respective groups T540, H540, D540 and U540 in the marking cable 540, the directory number of the subscriber line 7930.

In view of the foregoing, it will be understood that in the line circuit 560, the cutoff relay, not shown, is arranged to mark the directory number of the subscriber line 7955 in the marking cable 540. Furthermore, it will be understood that in the line circuits 2311 and 2312 the cutoff relays, not shown, are arranged to mark the respective directory numbers of the subscriber lines 5443 and 5430 in the marking cable 2327 that extends to the various trunk record links 2320, etc.

The primary selectors 600, etc., in the RA6 office are identical; and the primary selectors 2315, etc., in the WA2 office are identical. For example, the primary selector 600 comprises, as shown in Figs. 6 and 7, a relay group including a line relay R610, a hold relay R615, a series relay R620, a lockout relay R625, an assigned code relay R630, a timer relay R635, a switchthrough relay R640, three count relays R650, R660 and R670 and seven connect relays R740, R745, R750, R755, R760, R765 and R770. Further, the primary selector 600 comprises a first digit register 710, a second digit register 720 and a third digit register 730. Preferably, the digit registers 710, etc., are identical and may be of any suitable form, although for purpose of illustration, the digit registers 710, etc., have been illustrated in expanded longitudinal form. Specifically, the first digit register 710 is illustrated as including a slide 711 provided with an operating magnet M712 and a release magnet M713, the slide 711 being operative step by step away from its normal position by the operating magnet M712 and being returned back into its normal position in response to energization of the release magnet M713. Associated with the slide 711 is a set of off-normal springs NS711 that is operated in response to movement of the slide 711 out of its normal position. Also associated with the slide 711 are a number of sets of switch springs S711, S715, S716, S717, S719 and S710 that are sequentially operated in the corresponding stepped positions of the slide 711. Thus it will be understood that in the first, fifth, etc., stepped positions of the slide 711, the associated respective sets of switch springs S711, S715, etc., are operated. The second digit register 720 is substantially identical to the first digit register 710 and includes the corresponding elements 721, M722, M713, NS721 and S722, etc.; and likewise, the third digit register 730 is substantially identical to the first digit register 710 and includes the corresponding elements 731, M732, M733, NS731 and S732, etc. Further, the primary selector 600 comprises the seven preselect switches 810, 820, 830, 840, 850, 860 and 870 that may be identical to each other. Specifically, the preselect switch 810, illustrated in Fig. 8, comprises a rotary switch 814 provided with three wipers having associated contact banks and terminating the various trunks 881, etc., extending to the trunk circuits 882, etc., that terminate the trunks 883, etc., extending to the 0 operator switchboard 887. The rotary switch 814 also comprises a rotary magnet M815 and an associated seize relay R817. As explained more fully hereinafter, the rotary switch 814 is operative continuously to test the trunks 881, etc., and to preselect an idle trunk in the group to the use of the individually associated primary selector 600. The preselect switches 820, etc., also preselect idle trunks in the associated groups 884, etc., for the use of the individually associated primary selector 600, as explained more fully hereinafter.

In view of the foregoing description of the connection and arrangement of the primary selector 600 and the individually associated preselect switches 810, etc., in the RA6 office, it will be understood that the primary selector 2315 and the preselect switches S2315A, etc., in the WA2 office are connected and arranged in a similar manner.

The trunk record links 900, etc., provided in the RA6 office may be identical; and the trunk record link 900, illustrated in Figs. 9 to 14, inclusive, comprises a relay group including a line relay R920, a hold relay R930, a switch relay R940, a register relay R950, an identity relay R960, a record relay R970, a line relay R980, a hold relay R1010, an answer relay R1020, a shunt relay R1025, a series relay R1030, a step relay R1035, a switch-through relay R1040, a lockout relay R1110, two gang relays R1120 and R1130, a lockout relay R1140, a release relay R1150, a lockout relay R1210, four recapture relays R1215, R1220, R1225 and R1230, two route relays R1240 and R1250, a series relay R1260, a step relay R1270, a busy relay R1310, a shunt relay R1320, a stop-send relay R1330, and two gang relays R1420 and R1430. In passing, it is noted that the recapture relays R1215, R1220, R1255 and R1230 respectively correspond to the called office codes 922, 623, 666 and 546 and are respectively operative to effect the recapture of the corresponding called office codes.

Also the trunk record link 900 comprises four groups of storage relays 1401, 1402, 1403 and 1404 that are employed for the purpose of storing the respective thousand, hundred, ten and unit digits of the directory number of a calling subscriber line connected thereto, four groups of storage relays 1171, 1172, 1173 and 1174 that are employed for the purpose of storing the release time of an established connection, and four groups of storage relays 1175, 1176, 1177 and 1178 that are employed for the purpose of storing the answer time of an established connection. More particularly, the relay groups 1171, 1172, 1173 and 1174 are operatively associated with the master clock 1160 and store the respective ten-hour digit, unit-hour digit, ten-minute digit and unit-minute digit of the release time, employing a twenty-four hour time system, as explained more fully hereinafter. Similarly the relay groups 1175, 1176, 1177 and 1178 are operatively associated with the master clock 1160 and store the respective ten-hour digit, unit-hour digit, ten-minute digit and unit-minute digit of the answer time, employing a twenty-four hour time system, as explained more fully hereinafter. Further the trunk record link 900 comprises four storage registers or switches 1N1, 1N2, 1N3 and 1N4 that are employed for the purpose of storing the respective thousand digit, hundred digit, ten digit and unit digit of a four-digit directory number of a called subscriber line involved in a connection routed via the trunk record link 900. Moreover, the trunk record link 900 comprises a register sequence switch 1RS, a send sequence switch 1SS, a digit send switch 1DS, and a record sequence switch 2RS, as well as a source of booster battery 926, and two continuously rotating sending cams 1317 and 1405. The booster battery 926 may be of +70 volts with respect to —48 volts exchange battery and is provided with a grounded negative terminal and an ungrounded positive terminal; the impulsing cam 1317 may have a speed of rotation of about ten revolutions per second and the impulsing cam 1405 may have a speed of rotation of about twenty revolutions per second.

The time release registers 1171, etc., the time answer registers 1175, etc., and the calling number registers 1401, etc., may be of the conventional relay type; and as illustrated, the calling number register 1401 includes ten relays T1, T2, etc., operative to register the corresponding values of the thousand digit of the directory number of the calling subscriber line involved in the connection employing the trunk record link 900, as explained more fully hereinafter. The numerical registers 1N1, 1N2, 1N3 and 1N4 may be identical, and specifically the numerical register 1N1 is of the minor switch type, including a wiper 1N11 provided with an associated contact bank, a rotary magnet 1N12 for driving the wiper noted step by step in the clockwise direction away from its home position, a release magnet 1N13 for releasing the wiper noted and for causing it to be returned back into its home position, and a set of switch springs 1N14 that is operated when the wiper noted is driven out of its home position. The identical numerical registers 1N2, 1N3 and 1N4 respectively comprise the wipers 1N21, 1N31 and 1N41, the rotary magnets 1N22, 1N32 and 1N42, the release magnets 1N23, 1N33 and 1N43 and the sets of switch springs 1N24, 1N34 and 1N44. The register sequence switch 1RS is of the minor type, including a wiper 1RS1 provided with an associated contact bank, a rotary magnet 1RS2 for driving the wiper noted step by step in the clockwise direction away from its home position, a release magnet 1RS3 for releasing the wiper noted and for causing it to be returned back into its home position, and a set of switch springs 1RS4 that is operated when the wiper noted is driven out of its home position. The send-sequence switch 1SS is of the rotary type including two wipers 1SS1 and 1SS2 provided with individually associated contact banks, a rotary magnet 1SS3 for driving the wipers noted step by step in the clockwise direction, and a set of switch springs 1SS5 that is operated when the wipers noted are driven out of their home positions. The digit send sequence switch 1DS is of the rotary type including two wipers 1DS1 and 1DS2 provided with individually associated contact banks, and a rotary magnet 1DS3 for driving the wipers noted step by step in the counter-clockwise direction away from their home positions. The record sequence switch 2RS is of the minor type including two wipers 2RS1 and 2RS2 provided with individually associated contact banks, a rotary magnet 2RS3 for driving the wipers noted step by step in the counter-clockwise direction away from their home positions, a release magnet 2RS4 for releasing the wipers noted and for causing them to be returned back into their home positions, and a set of switch springs 2RS5 that is operated when the wipers noted are driven out of their home positions.

Further, the trunk record link 900 comprises a repeater 1050 including coupled windings 1051, 1053 and 1052, 1054, and is terminated by a switching mechanism 1060 of the Strowger type. The Strowger mechanism 1060 includes a wiper shaft carrying a wiper set 1061, a vertical magnet M1062 for driving the wiper shaft step by step in the vertical direction away from its normal vertical position, a rotary magnet M1063 for driving the wiper shaft step by step in the rotary direction away from its normal rotary position, and a release magnet M1065 for releasing the wiper shaft and for causing it to be returned back into its normal rotary and vertical positions. Associated with the mechanism 1060 are two sets of switch springs S1017 and S1018 that are operated when the wiper shaft is driven one step in the vertical direction out of its normal vertical position, as well as a set of switch springs S927 that is operated when the wiper shaft is driven eleven steps in the rotary direction away from its normal rotary position. Finally, the trunk record link 900 comprises a magnetic recorder 1410 individual thereto and including a magnetic recording head 1416 carrying an associated winding 1418 and operatively associated with an elongated paramagnetic medium 1411 carried by two reels 1412 and 1413. In the arrangement, the medium 1411 is wound from the reel 1412 onto the reel 1413 by a drive connection between a motor 1414 and the reel 1413, the drive connection including a suitable power transmission 1415. In the arrangement, the elongated medium 1411 may consist of a wire or tape formed directly of paramagnetic material, or it may consist of a tape formed of paper, or other non-metallic material and coated with a paramagnetic material.

Figure 9:
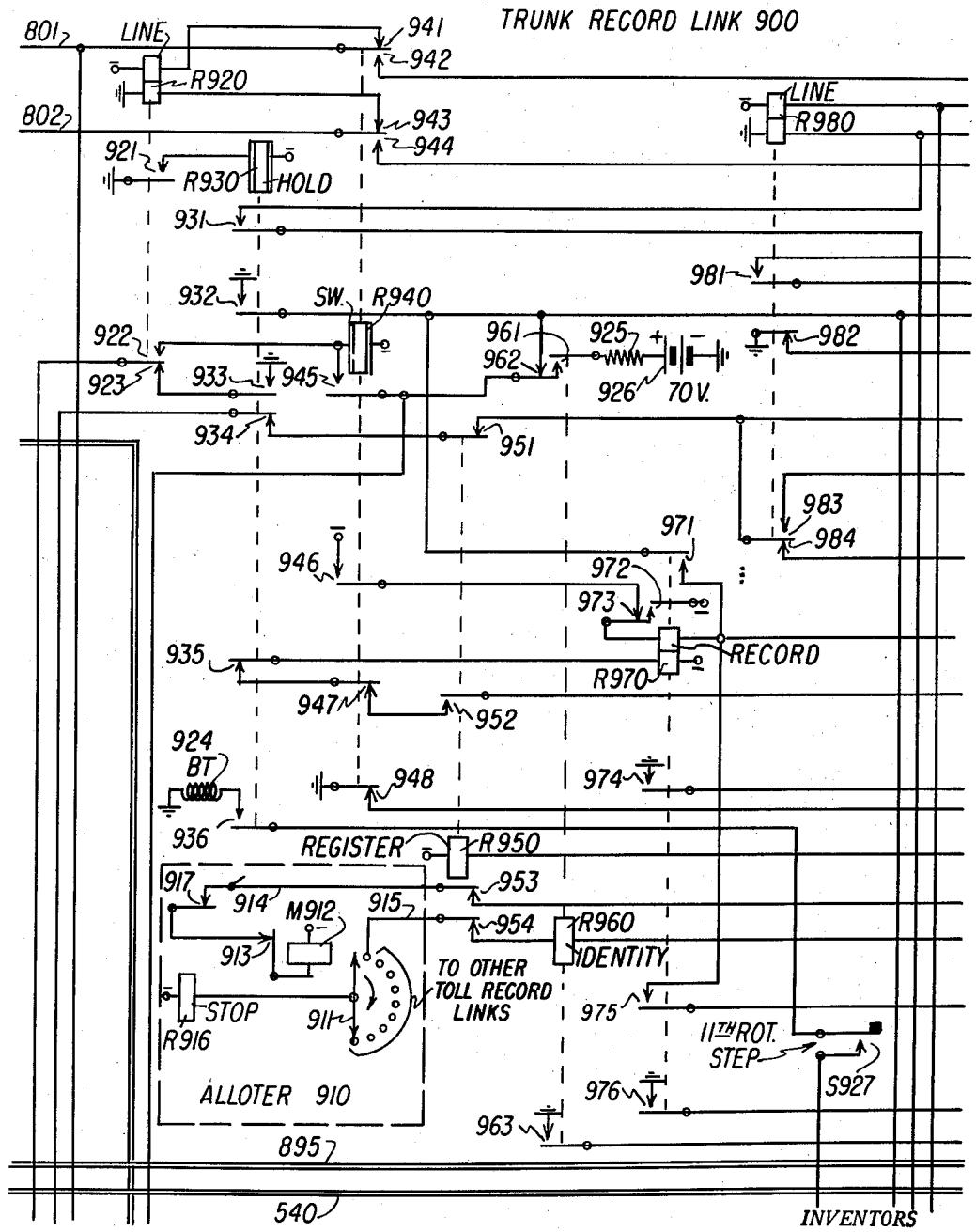
Figure 10:
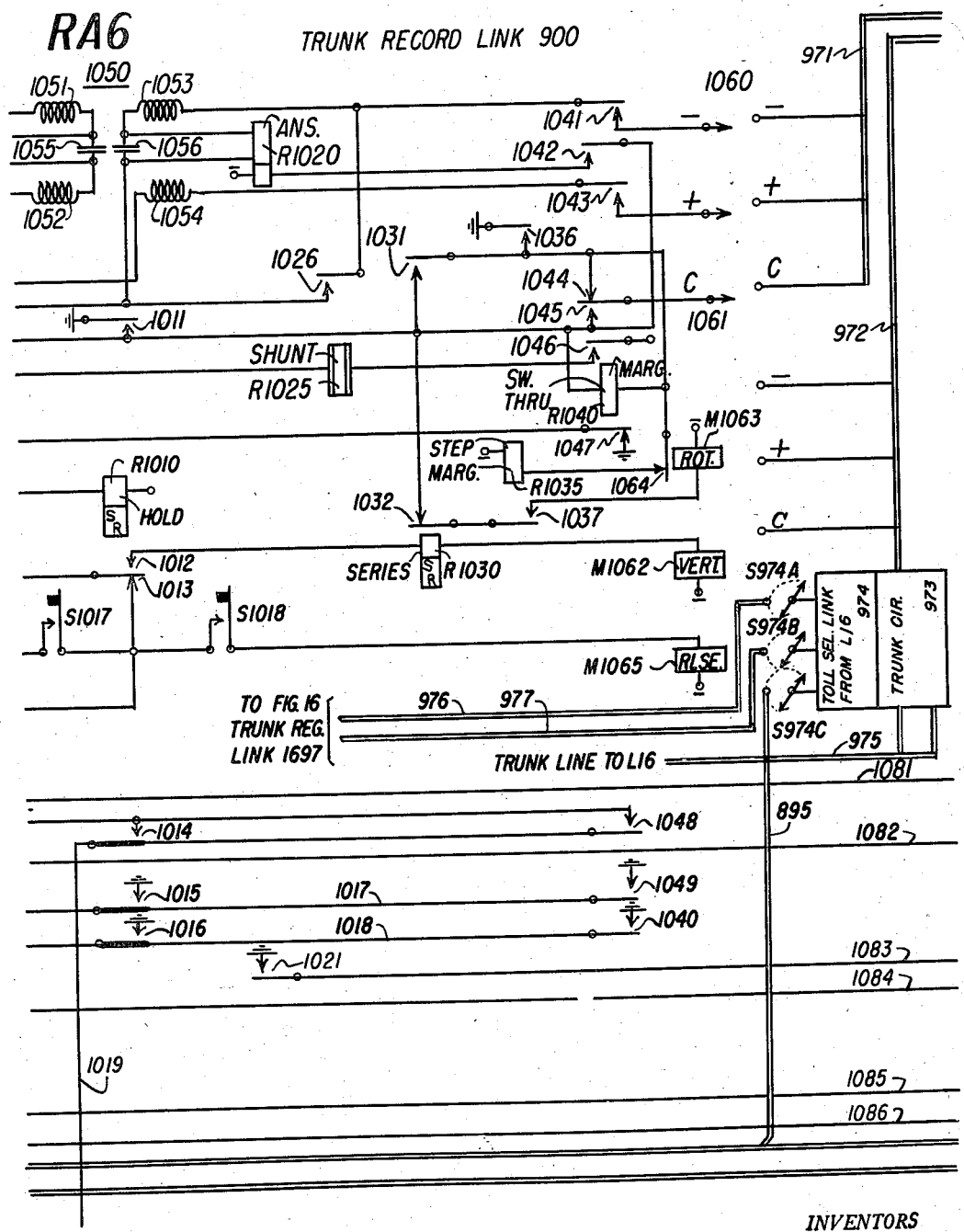

The allotter 910 that is commonly associated with the trunk record links 900, etc., comprises, as illustrated in Fig. 9, a stop relay R916, a common start conductor 914, individual mark conductors 915, etc., extending to the respective trunk record links 900, etc., and a rotary switch 911 including a single wiper provided with an associated contact bank terminating the mark conductors 915, etc., as well as a rotary magnet M912 for driving the wiper noted step by step in the clockwise direction.

Figure 11:
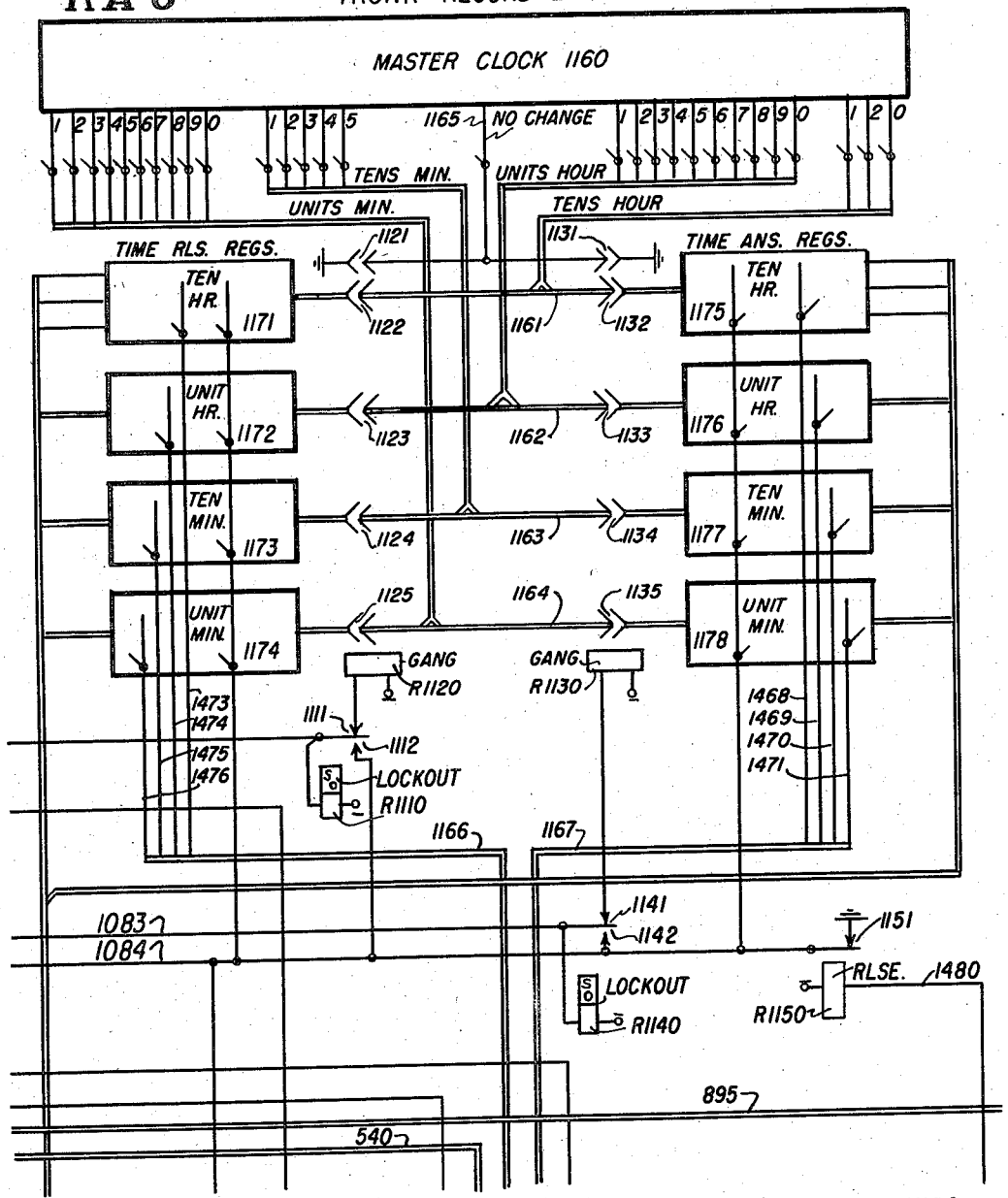
Figure 12:
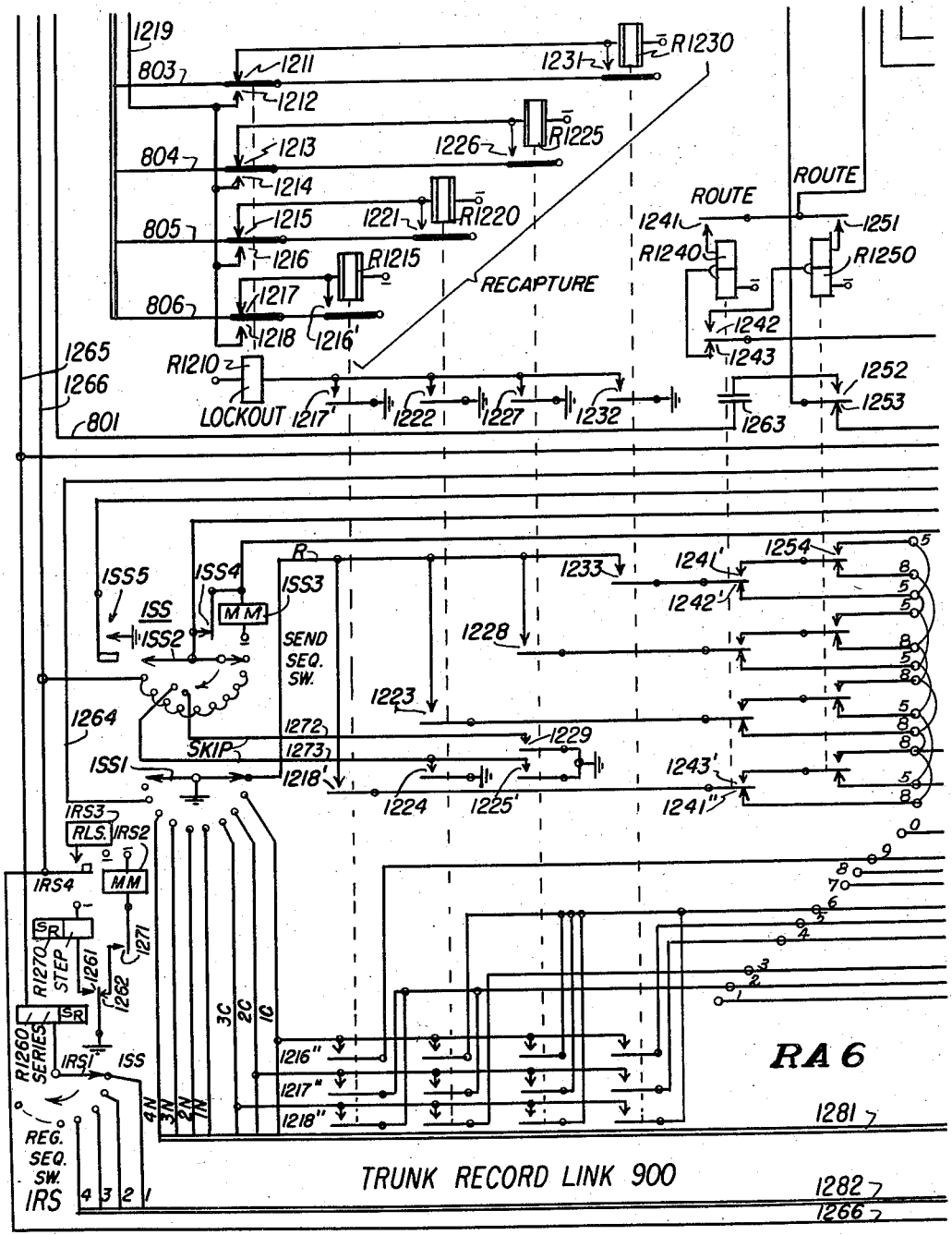
Figure 13:
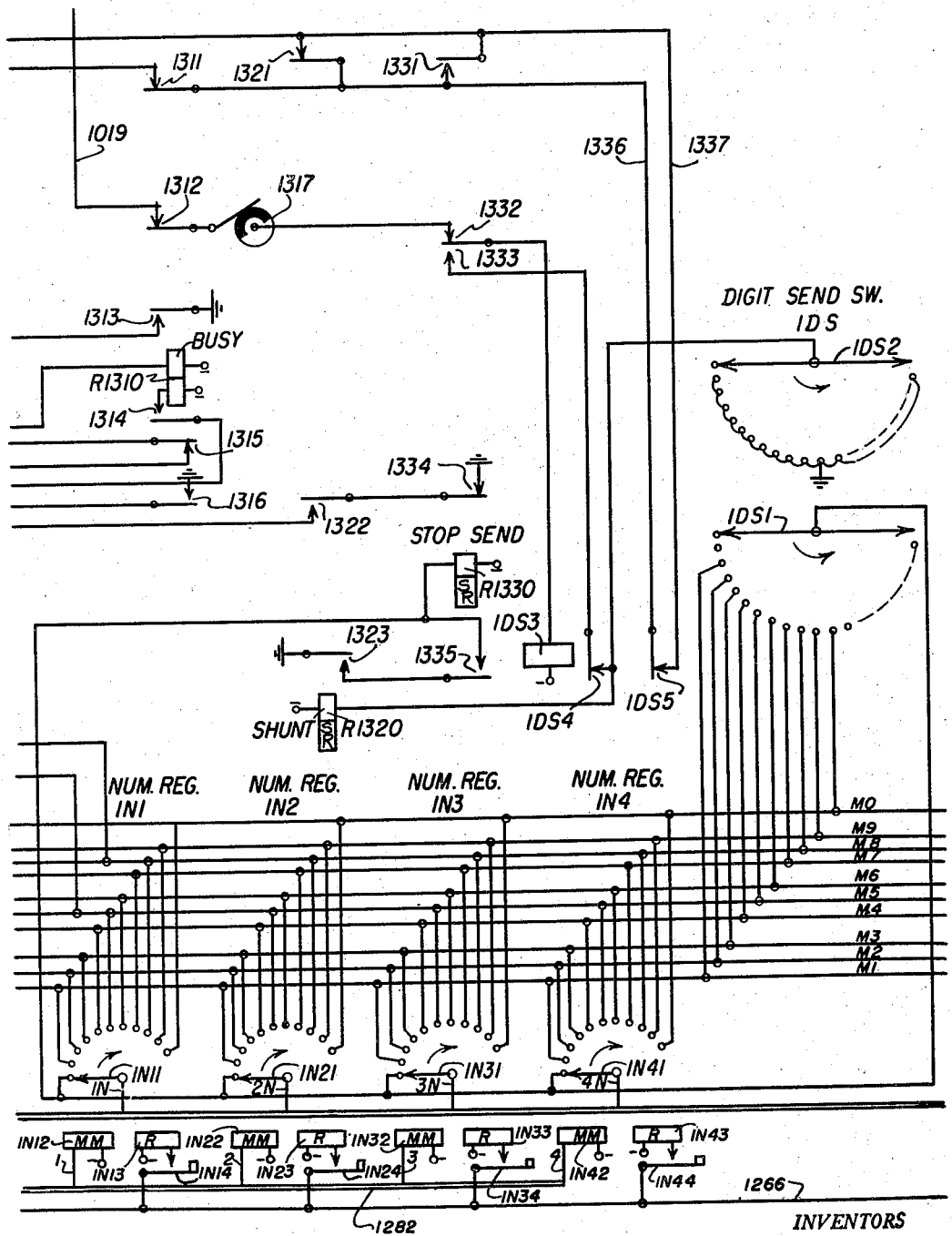
Figure 14:
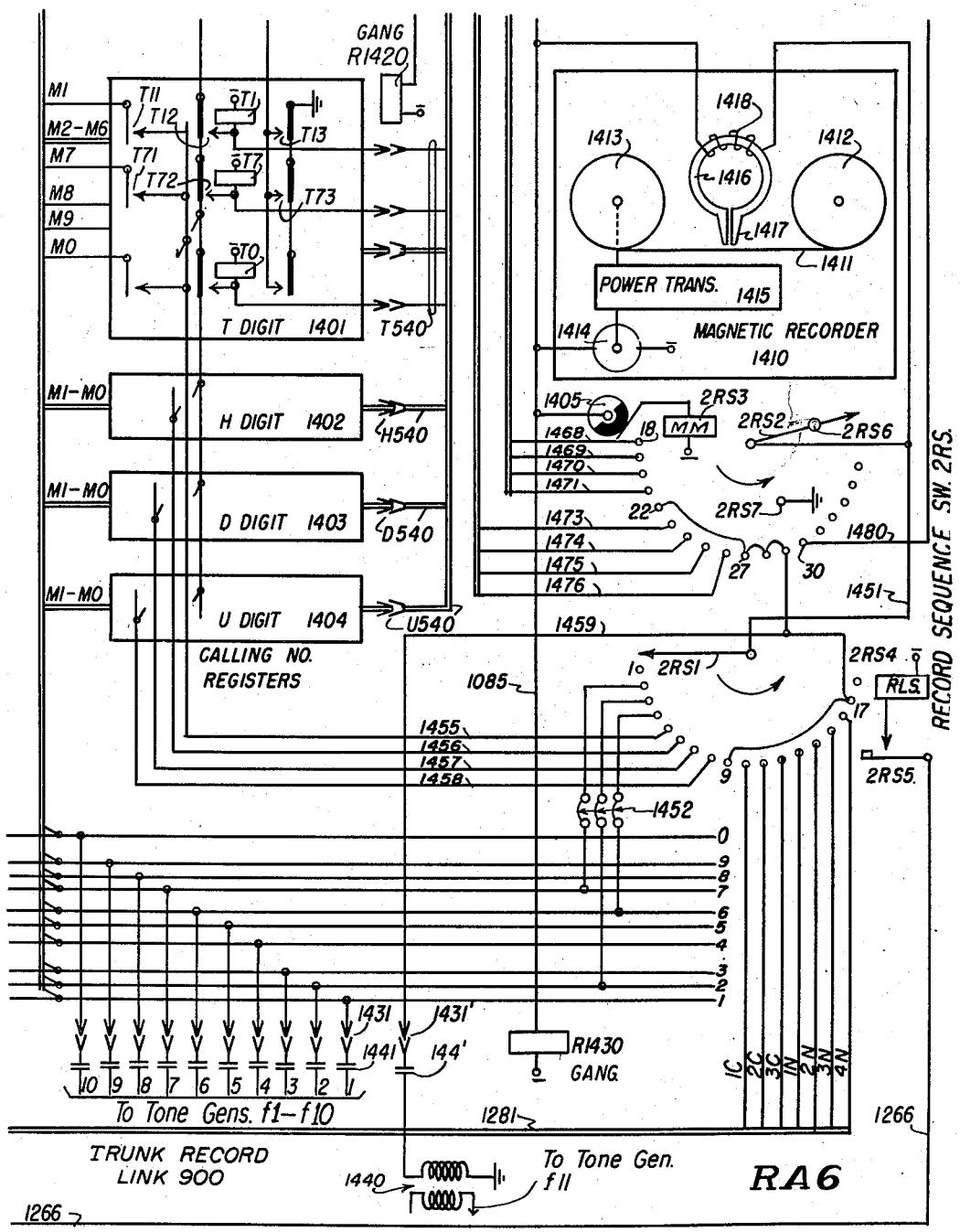

The master clock 1160, indicated in Fig. 11, may be of any suitable type operative on a twenty-four hour basis and comprising a tens-hour cable 1161, including individual 1, 2 and 0 marking conductors, a units-hour cable 1162, including individual 1 to 0 marking conductors, a tens-minute cable 1163, including individual 1 to 5 marking conductors, and a units-minute cable 1164, including individual 1 to 0 marking conductors, as well as a no-change conductor 1165.

In view of the foregoing, it will be understood that the trunk record links 2320, etc., provided in the WA2, etc., offices are substantially identical to the trunk record link 900, described above.

The trunk circuits 1500, etc., in the RA6 office and the trunk circuit 1700, etc., in the WA2 office are identical; and likewise the trunk selectors 1600, etc., in the RA6 office and the trunk selectors 1800, etc., in the WA2 office are substantially identical. For example, the trunk circuit 1500 provided in the RA6 office and terminating the trunk line 1528 comprises, as illustrated in Fig. 15, a relay group, including a hold relay R1510, a series relay R1515, a switch relay R1520, and a busy relay R1525; and likewise the trunk circuit 1700 provided in the WA2 office and terminating the trunk line 1528 comprises, as illustrated in Fig. 17, a relay group, including a hold relay R1710, a series relay R1715, a switch relay R1720 and a busy relay R1725.

The trunk selector 1600 provided in the RA6 office, illustrated in Figs. 15 and 16, is quite similar to the primary selector 600, previously described, and comprises a relay group, including a line relay R1530, a hold relay R1535, a lockout relay R1540, a series relay R1545, a timer relay R1550, a switch-through relay R1560, three count relays R1570, R1580 and R1590, and three connect relays R1640, R1650 and R1660. Also the trunk selector 1600 comprises a first digit register 1610, a second digit register 1620, and a third digit register 1630. The registers 1610, 1620 and 1630 respectively include the slides 1611, 1621 and 1631, the operating magnets M1612, M1622 and M1632, the release magnets M1613, M1623 and M1633, the sets of off-normal switch springs NS1611, NS1621 and NS1631 and the various sets of switch springs S1615, etc., S1624, etc., and S1636, etc.

Further, the trunk selector 1600 is provided with three preselect switches 1670, 1680 and 1690; and as illustrated the preselect switch 1670 includes the wiper set 1614 of three individual wipers, the rotary magnet M1615 for driving the wipers mentioned step by step in the clockwise direction and a seize relay R1617.

The trunk selector 1800 provided in the WA2 office, illustrated in Figs. 17 and 18, is quite similar to the primary selector 600, previously described, and comprises a relay group, including a line relay R1730, a hold relay R1735, a lockout relay R1740, a series relay R1745, a timer relay R1750, a switchthrough relay R1760, three count relays R1770, R1780 and R1790 and four connect relays R1840, R1850, R1855 and R1860. Also, the trunk selector 1800 comprises a first digit register 1810, a second digit register 1820, and a third digit register 1830. The registers 1810, 1820, and 1830 respectively include the slides 1811, 1821 and 1831, the operating magnets M1812, M1822 and M1833, the release magnets M1813, M1823 and M1833, the sets of off-normal switch springs NS1811, NS1821 and NS1931, and the various sets of switch springs S1815, etc., S1822, etc., and S1832, etc. Further, the trunk selector 1800 is provided with four preselect switches 1870, 1875, 1880 and 1885; and as illustrated the preselect switch 1870 includes the wiper set 1814 of three individual wipers, the rotary magnet M1815 for driving the wipers mentioned step by step in the clockwise direction, and a seize relay R1817.

Similarly, the trunk register links 1900, etc., provided in the WA2 office may be identical; and the trunk register link 1900, illustrated in Figs. 19 to 22, inclusive, comprises a relay group including a line relay R1920, a hold relay R1930, a switch relay R1940, a line relay R1950, a hold relay R2010, an answer relay R2020, a shunt relay R2025, a series relay R2030, a step relay R2035, a switchthrough relay R2040, a lockout relay R2110, four recapture relays R2115, R2120, R2125 and R2130, two retest relays R2140 and R2150, a series relay R2160, a step relay R2170, a busy relay R2210, a shunt relay R2220, and a stop-send relay R2230. In passing, it is noted that the recapture relays R2115, R2120, R2125 and R2130 respectively correspond to the called office codes 726, 623, 666 and 546 and are respectively operative to effect the recapture of the corresponding called office codes.

Also the trunk register link 1900 comprises four storage registers or switches 2N1, 2N2, 2N3 and 2N4 that are employed for the purpose of storing the respective thousand digit, hundred digit, ten digit and unit digit of a four-digit directory number of a called subscriber line involved in a connection routed via the trunk register link 1900. Moreover the trunk register link 1900 comprises a register sequence switch 3RS, a send sequence switch 2SS, and a digit send switch 2DS, as well as a continuously rotating sending cam 2217. The impulsing cam 2217 may have a speed of rotation of about ten revolutions per second.

The numerical registers 2N1, 2N2, 2N3 and 2N4 may be identical, and specifically the numerical register 2N1 is of the minor switch type, including a wiper 2N11 provided with an associated contact bank, a rotary magnet 2N12 for driving the wiper noted step by step in the clockwise direction away from its home position, a release magnet 2N13 for releasing the wiper noted and for causing it to be returned back into its home position, and a set of switch springs 2N14 that is operated when the wiper noted is driven out of its home position. The identical numerical registers 2N2, 2N3 and 2N4 respectively comprise the wipers 2N21, 2N31 and 2N41, the rotary magnets 2N22, 2N32 and 2N42, the release magnets 2N23, 2N33 and 2N43 and the sets of switch springs 2N24, 2N34 and 2N44. The register sequence switch 3RS is of the minor type, including a wiper 3RS1 provided with an associated contact bank, a rotary magnet 3RS2 for driving the wiper noted step by step in the clockwise direction away from its home position, a release magnet 3RS3 for releasing the wiper noted and for causing it to be returned back into its home position, and a set of switch springs 3RS4 that is operated when the wiper noted is driven out of its home position. The send-sequence switch 2SS is of the rotary type, including two wipers 2SS1 and 2SS2 provided with individually associated contact banks, a rotary magnet 2SS3 for driving the wipers noted step by step in the clockwise direction, and a set of switch springs 2SS5 that is operated when the wipers noted are driven out of their home positions. The digit send switch 2DS is of the rotary type, including two wipers 2DS1 and 2DS2 provided with individually associated contact banks, and a rotary magnet 2DS3 for driving the wipers noted step by step in the counterclockwise direction away from their home positions.

Further, the trunk register link 1900 comprises a repeater 2050, including coupled windings 2051, 2053 and 2052, 2054 and is terminated by a switching mechanism 2060 of the Strowger type. The Strowger mechanism 2060 includes a wiper shaft carrying a wiper set 2061, a vertical magnet M2062 for driving the wiper shaft step by step in the vertical direction away from its normal vertical position, a rotary magnet M2063 for driving the wiper shaft step by step in the rotary direction away from its normal rotary position, and a release magnet M2065 for releasing the wiper shaft and for causing it to be returned back into its normal rotary and vertical positions. Associated with the mechanism 2060 is a set of switch springs S2018 that is operated when the wiper shaft is driven one step in the vertical direction out of its normal vertical position, as well as a set of switch springs S1956 that is operated when the wiper shaft is driven eleven steps in the rotary direction away from its normal rotary position.

In view of the foregoing, it will be understood that the trunk register links 1697, etc., provided in the RA6 offices, etc., are substantially identical to the trunk register link 1900, described above.

The connection and arrangement of the apparatus incorporated in the telephone system will best be understood from the following description of the setting-up of various telephone connections therein.

*Section 3.—Local calls in the RA6 office*

Considering now the extension of a local call from a calling subscriber substation to a called subscriber substation in the RA6 office, such, for example, as a call from the calling subscriber substation T1 to the called subscriber substation T2, the subscriber at the calling subscriber substation T1 initiates the call and then dials the called office code RA6 (726) followed by the numerical designation 7955 of the subscriber line extending to the called subscriber substation T2. When the call is initiated at the calling subscriber substation T1, a loop circuit is completed for energizing in series the upper and lower windings of the line relay R520 in the line circuit 500 individual to the calling subscriber line 7930, whereby the line relay R520 operates. Upon operating, the line relay R520 interrupts, at the contacts 522, the normal connection from battery potential via the winding of the cutoff relay R510 to the control conductor 554 of the subscriber line 7930; and completes, at the contacts 523, a path for applying direct ground potential to the control conductor 554, so as to mark the subscriber line 7930 as busy to the connectors in the local switch train having access thereto. Also, the line relay R520 completes, at the contacts 521, a connection from battery potential via the winding of the cutoff relay R510 to the control conductor 553 of the subscriber line 7930 appearing before the finders 535, etc. Further, the line relay R520 completes, at the contacts 524, a path for applying ground potential to the start conductor 531 extending to the distributor 530 so that the distributor 530 is governed to effect the assignment of an idle one of the finder-primary selector links to the use of the calling subscriber line 7930. For example, the distributor 530 may assign the link illustrated, whereby the finder 535 is operated to find the calling subscriber line 7930 so that the finder 535 switches through completing a loop circuit for energizing in series the upper and lower windings of the line relay R610 in the primary selector 600 causing the latter relay to operate. Further, the finder 535 effects the application of ground potential upon the control conductor 553 bringing about operation of the cutoff relay R510 through its first step. When the cutoff relay R510 is thus operated through its first step, it completes, at the contacts 513, a substantially identical holding circuit for energizing the winding thereof; and interrupts, at the contacts 514, the path for applying ground potential to the start conductor 531 so as to dismiss the distributor 530. Further, the cutoff relay R510 interrupts, at the contacts 511 and 512, the loop circuit for energizing in series the upper and lower windings of the line relay R520 so as to cause the latter relay to restore. Upon restoring the line relay R520 completes, at the contacts 522, a path, including the contacts 513, between the grounded control conductor 553 and the control conductor 554 so as to retain the subscriber line 7930 marked as busy to the local connectors in the local switch train having access thereto.

Upon operating the line relay R610 completes, at the contacts 611, a circuit for operating the hold relay R615; whereby the latter relay completes, at the contacts 616, a path for applying ground potential to the control conductor 538 extending back to the finder 535 so as to maintain ground potential upon the control conductor 553 subsequent to the complete switch-through of the finder 535 and so as to maintain the finder 535 in its operated position. The loop circuit for energizing the upper and lower windings of the line relay R610 includes the telephone instrument bridged across the line conductors 551 and 552 of the calling subscriber line 7930 at the calling subscriber substation T1, as well as the dial tone coil 675 in the primary selector 600, whereby dial tone current is returned over the loop circuit to the calling subscriber substation T1 indicating to the subscriber thereat that he may proceed with the dialing of the first digit 7 of the called office code 726 at this time.

The subscriber dials the first digit 7, whereby the line relay R610 follows over the loop circuit, including the calling subscriber line 7930. Each time the line relay R610 restores and then reoperates, it interrupts and then recompletes, at the contacts 611, the circuit for energizing the winding of the hold relay R615; whereby the latter relay is retained in its operated position during impulsing as it is of the slow-to-release type. Also, each time the line relay R610 restores and then reoperates, it completes and then interrupts, at the contacts 612, a circuit for energizing the winding of the series relay R620 and for operating the operating magnet M712 of the first digit register 710, this circuit also including the contacts 618, 648 and 651. Accordingly, the series relay R620 operates and remains operated during impulsing as it is of the slow-to-release type. Upon operating the series relay R620 prepares, at the contacts 621, a circuit for operating the timer relay R635; interrupts, at the contacts 622, a further point in the circuit for operating one of the connect relays R760, etc.; and completes, at the contacts 623, a circuit for energizing the lower winding of the first count relay R650. When the lower winding of the first count relay R650 is thus energized, the latter relay operates through its first step, it being of the two-step type, completing, at the contacts 653, a substantially identical path, including the grounded control conductor 538, for short-circuiting the upper winding thereof.

At this time, the operating magnet M712 is energized and deenergized sequentially seven times bringing about the corresponding stepping of the slide 711 from its normal position seven steps toward the right. When the slide 711 is moved out of its normal position the set of switch springs NS711 is operated so that the contacts 1 thereof are opened to interrupt the connection of the dial tone coil 675 in the loop circuit extending back to the calling subscriber substation T1; and the contacts 2 thereof are closed so as to complete the loop circuit independently of the dial tone coil 675; whereby, at this time, the return of dial tone from the primary selector 600 back to the calling subscriber substation T1 is interrupted. Also, when the set of switch springs NS711 is thus operated, the contacts 3 thereof are closed to prepare a circuit traced hereinafter for operating the release magnet M713. At this time, the slide 711 of the first digit register 710 is moved from its normal position seven steps toward the right so as to bring about operation of the corresponding set of switch springs S717 effecting closure of the contacts thereof so as to prepare a chain circuit, traced hereinafter, for operating the connect relay R760.

At the conclusion of the first digit 7 of the called office code, the line relay R610 is retained in its operated position retaining the hold relay R615 in its operated position so as to effect the restoration of the series relay R620, the latter relay being of the slow-to-release type. Upon restoring, the series relay R620 interrupts, at the contacts 621, the previously prepared point in the circuit for operating the timer R635; prepares at the contacts 622, the point in the circuit for operating the connect relay R760; and interrupts, at the contacts 623, the path for shortcircuiting the upper winding of the first count relay R650; whereby the upper and lower windings thereof are energized in series circuit relation causing the first count relay R650 to operate through its second step. Upon operating through its second step, the first count relay R650 interrupts, at the contacts 651, a further point in the impulsing circuit extending to the operating magnet M712 of the first digit register 710; and prepares, at the contacts 652, a point of a substantially identical impulsing circuit extending to the operating magnet M722 of the second digit register 720. Also, the first count relay R650 interrupts, at the contacts 655, a further point in the circuit for short-circuiting the upper winding thereof; and prepares, at the contacts 654, a circuit for energizing the lower winding of the second count relay R660.

The subscriber at the calling subscriber substation T1 then proceeds to dial the second digit 2 of the called office code 726, whereby the line relay R610 follows effecting the registration of the second digit 2 in the second digit register 720, effecting reoperation of the series relay R620, and effecting operation through its first step of the second count relay R660; all in a manner substantially identical to that described above. Shortly following the second digit 2, the series relay R620 restores effecting operation of the second count relay R660 through its second step, in the manner previously explained; whereby the impulsing circuit is switched from the second digit register 720 to the third digit register 730. At this time, the slide 721 of the second digit register 720 occupies its second stepped position registering the digit 2 and closing the set of switch springs S722 so as to prepare a further point in the circuit for operating the connect relay R760.

The subscriber at the calling subscriber substation T1 then proceeds to dial the third digit 6 of the called office code 726, whereby the line relay R610 follows effecting the registration of the third digit 6 in the third digit register 730, effecting reoperation of the series relay R620, and effecting operation through its first step of the third count relay R670; all in a manner substantially identical to that described above. Shortly following the third digit 6, the series relay R620 restores effecting operation of the third count relay R670 through its second step, in the manner previously explained; whereby the impulsing circuit is switched off of the third digit register 730. At this time, the slide 731 of the third digit register 730 occupies its sixth stepped position registering the digit 6 and closing the set of switch springs S736 so as to prepare a further point in the circuit for operating the connect relay R760.

When the slide 731 of the third digit register 730 is moved out of its normal position, the set of switch springs NS731 is operated so that the contacts 1 thereof are closed, completing a circuit for operating the timer relay R635. Upon operating, the timer relay R635 interrupts, at the contacts 636, a circuit traced hereinafter, for energizing the winding of the lockout relay R625, so as to prevent operation of the latter relay at this time, the lockout relay R625 being of the slow-to-operate type. Now shortly following the dialing of the third digit 6 of the called office code 726, the series relay R620 restores, as previously noted, interrupting, at the contacts 621, the circuit for energizing the winding of the timer relay R635, so as to cause the latter relay to restore shortly thereafter, the timer relay R635 being of the slow-to-release type. Upon restoring, the series relay R620 completes, at the contacts 622, the previously-mentioned circuit for energizing the winding of the connect relay R760, which circuit also includes the operated sets of switch springs S717, S722 and S736, respectively associated with the slides 711, 721 and 731 of the respective digit registers 710, 720 and 730; whereby the connect relay R760 is operated. Upon operating, the connect relay R760 completes, at its contacts 761, etc., connections between the conductors 681, 682 and 683, and the corresponding conductors in the trunk 871 extending to the preselect switch 870.

The mode of operation of the preselect switch 870 is the same as that of the preselect switch 810, described in detail in Section 4, appearing hereinafter; whereby, at this time, it may be assumed that the preselect switch 870 has already operated to preselect an idle local first selector accessible thereto, such, for example, as the local first selector 891. Accordingly, in this case, when the connect relay R760 is operated, the control conductor of the trunk 871 has battery potential appearing thereon, whereby the winding of the switchthrough relay R640 is energized over the connection, including the control conductor 683, as well as via a parallel priming circuit, including the contacts 616 and 628 and the resistor 641'. Accordingly, in this case, the switchthrough relay R640 operates shortly thereafter, it being of the slow-to-operate type, to interrupt, at the contacts 645, the connection between the resistor 641' and the control conductor 683; and to complete, at the contacts 646, a direct connection between the control conductor 683 and the grounded control conductor 538. It is noted that the switchthrough relay R640 will not operate upon its priming circuit alone via the resistor 641', as it is of the marginal type, but the switchthrough relay R640 will be retained in its operated position upon its priming circuit alone. Thus, at this time, direct ground potential upon the control conductor 538 is applied to the control conductor 683 and consequently to the control conductor of the trunk 871 so as to bring about operation of the seize relay in the preselect switch 870 and the consequent seizure of the local first selector 891. Also upon operating, the switchthrough relay R640 interrupts, at the contacts 641 and 643, the loop circuit extending to the upper and lower winding of the line relay R610; and completes, at the contacts 642 and 644, direct connections between the line conductors 536 and 537 and the line conductors of the trunk 871 extending via the preselect switch 870 to the line conductors of the trunk extending into the local first selector 891. Accordingly, at this time, the loop circuit from the calling subscriber substation T1 is extended directly to the line relay in the local first selector 891 effecting operation of the latter relay and the consequent seizure of the local first selector 891 so that ground potential is returned over the control conductor of the trunk extending from the local first selector 891 so as to retain operated the preselect switch 870, the primary selector 600 and the finder 535.

Also, upon operating the switchthrough relay R640 interrupts, at the contacts 647, a further point in the circuit for operating the lockout relay R625 so as to prevent operation of the latter relay in the present example. Also, the switchthrough relay R640 interrupts, at the contacts 648, a further point in the impulsing circuit in the primary selector 600; and interrupts, at the contacts 649, a further point in the circuits for operating the release magnets M713, M723 and M733. When the above-traced loop circuit to the upper and lower windings of the line relay R610 is thus interrupted, the latter relay restores to effect the restoration of the hold relay R615 shortly thereafter, the latter relay being of the slow-to-release type. Upon restoring, the hold relay R615 interrupts, at the contacts 616, the direct path for applying ground potential in the primary selector 600 to the control conductor 538; however, at this time, ground potential in the local first selector 891 is returned back over the connection, including the control conductors 683 and 538, whereby the switchthrough relay R640 and the cutoff relay R510 are retained in their operated positions, and the finder 535 is retained in its operated position. Since the primary selector 600 is retained in its operated position by virtue of the operated position of the switchthrough relay R640, the connect relay R760 is retained in its operated position; and the count relays R650, R660 and R670 are retained in their operated positions.

At this time, the connection has been advanced from the calling subscriber substation T1 via the primary selector 600 to the local first selector 891. Accordingly, when the subscriber at the calling subscriber substation T1 dials the numerical digits 7, 9, 5 and 5, the component elements of the local switch train may be operated in the usual manner to extend the connection to the called subscriber line 7955 extending to the called subscriber substation T2. Specifically, the local first selector 891 may respond to the first numerical digit 7 to select the group and then the individual local second selector 892; the local second selector 892 may respond to the second numerical digit 9 to select the group and then the individual local connector 893; and the local connector 893 may respond to the third and fourth numerical digits 5 and 5 to select the called subscriber line 7955 in the corresponding 7900 group and extending to the called subscriber substation T2. At this time, the local connector 893 operates in the usual manner to test the idle or busy condition of the called subscriber line 7955 as marked by the individually associated line circuit 560. In the event the called subscriber substation T2 is busy at this time, the local connector 793 brings about the return of busy tone current over the connection to the calling subscriber substation T1 so that the subscriber thereat disconnects effecting the release of the switching apparatus in a manner substantially identical to that described hereinafter. On the other hand, in the event the called subscriber substation T2 is idle at this time, the local connector 893 operates to project ringing current over the called subscriber line 7955 so as to operate the ringer at the called subscriber substation T2, and so as to return ring-back tone current over the connection in order to indicate to the subscriber at the calling subscriber substation T1 that the called subscriber substation T2 is being rung.

Assuming that the called subscriber substation T2 is idle at this time, when the call is answered thereat, the local connector 893 operates to interrupt the projection of ringing current over the called subscriber line 7955 and to interrupt the return of ring back tone current over the connection to the calling subscriber substation T1. At this time a connection is established between the calling subscriber substation T1 and the called subscriber substation T2; and subsequently incident to disconnection at the subscriber substations T1 and T2 the local connector 893 is released bringing about the control of the line circuit 560 to mark the called subscriber substation T2 as idle at this time. Also the release of the local connector 893 effects the releases of the local second selector 892 and the local first selector 891 so that ground potential is removed from the control conductor of the trunk 871 effecting the release of the preselect switch 870 and the consequent release of the finder 535. When the finder 535 is thus released ground potential is removed from the control conductor 553 of the subscriber line 7930 effecting the restoration of the cutoff relay R510 in the line circuit 500; whereby the subscriber line 7930 is again marked as idle to the local connector 893, etc., in the local switch train having access thereto.

When ground potential is removed from the control conductor 683, the circuit for retaining operated the switchthrough relay R640 in the primary selector 600 is interrupted; whereby the latter relay upon restoring completes, at the contacts 649, the parallel circuits previously mentioned for operating the release magnets M713, M723 and M733; whereby the slides 711, 721 and 731 are released and returned back into their normal positions reoperating the sets of switch springs NS711, NS721 and NS731 to interrupt the circuits for the release magnets M713, M723 and M733. When the slides 711, 721 and 731 are thus restored to their normal positions, the sets of switch springs S717, S722 and S736 are returned to their normal positions interrupting the circuit for retaining operated the connect relay R760 so as to disconnect the conductors 681, 682 and 683 from the corresponding conductors of the trunk 871 extending to the preselect switch 870; whereby the primary selector 600 is also completely released. At this time, the established connection between the calling subscriber substation T1 and the called subscriber substation T2 is completely released, and all of the apparatus involved therein is completely released and available for further use.

*Section 4.—Operator calls in the RA6 office*

First assuming that a call is to be extended from the calling subscriber substation T1 to the 0 operator switchboard 887 in the RA6 office, the subscriber at the calling subscriber substation T1 first initiates the call and dials the single digit 0. In this case, the line circuit 500 may control the distributor 530 to bring about operation of the finder 535 and the consequent seizure of the primary selector 600; all in the manner explained in Section 3; whereby a loop circuit is completed from the calling subscriber substation T1 to the line relay R610 in the primary selector 600. The line relay R610 operates effecting operation of the hold relay R615; and dial tone current is returned over the connection to the calling subscriber substation T1. In this case the subscriber at the calling subscriber substation T1 dials the single digit 0 causing the line relay R610 to follow so that the single digit 0 is registered in the first digit register 710, in the manner previously explained. During the transmission of the single digit 0, the series relay R620 is operated and the first count relay R650 is operated through its first step. In this case, the slide 711 of the first digit register 710 is operated out of its normal position ten steps effecting operation of the set of switch springs S710 so as to close the contacts 1 and 2 thereof. When the contacts 1 of the set of switch springs S710 are thus closed, a circuit is completed for operating the timer relay R635 so as to prevent immediate operation of the lockout relay R625, as previously explained.

Now at this time it may first be assumed that the preselect switch 810 occupies its rest position preselecting the trunk 881 extending to the trunk circuit 882, this assumption being predicated upon the condition that the trunk circuit 882 is idle at this time; whereby battery potential appears upon the control conductor of the trunk 881. Now the application of battery potential upon the control conductor of the trunk 881 completes a circuit, also including the contacts 817' and 816, for short-circuiting the rotary magnet M815 of the rotary switch 814 terminating the trunk 811 extending to the preselect switch 810. Thus at this time, it may be assumed that the preselect switch 810 has preselected the trunk 881 extending to the idle trunk circuit 882 and terminating the idle trunk 882 extending to the 0 operator switchboard 887.

Thus in this case when the contacts 2 of the set of switch springs S710 are closed, a circuit for operating the connect relay R770 is prepared; which circuit is completed shortly following the dialing of the single digit 0, and as a consequence of the restoration of the series relay R620. Upon operating the connect relay R770 completes, at the contacts 771, 772 and 773, connections between the conductors of the trunk 811 extending to the preselect switch 810 and the conductors 681, 682 and 683. Now since battery potential is applied in the trunk circuit 882 to the control conductor of the trunk 881 and battery potential is applied via the rotary magnet M815, and battery potential is applied via the resistor 818, battery potential appears upon the control conductor of the trunk 811; whereby the winding of the switchthrough relay R640 is energized over the circuit, including the control conductor 683, as well as via the priming circuit, including the resistor 641'. In this case, the switchthrough relay R640 operates shortly thereafter, it being of the slow-to-operate type, since the switchthrough relay R640 cannot operate on its priming circuit alone and must have further energization via the control conductor 683. Accordingly in this case, the switchthrough relay R640 operates interrupting, at the contacts 645, the connection between the control conductor 683 and the resistor 641'; and completing, at the contacts 646, the path for applying ground potential, at the contacts 616, to the control conductor 683; whereby the winding of the seize relay R817 in the preselect switch 810 is directly energized causing the latter relay to operate shortly thereafter, it being of the slow-to-operate type. Now in passing, it is pointed out that the application of direct ground potential to the control conductor 683 also energizes the rotary magnet M815 in series with the winding of the seize relay R817 via a path, including the contacts 816; however, the rotary magnet M815 cannot operate in this circuit due to the high series resistance of the winding of the seize relay R817. Now when the seize relay R817 operates, it interrupts, at the contacts 817' the normal connection between the control wiper of the wiper set 814 and the rotary magnet M815; and completes, at the contacts 817" a direct connection between the control wiper of the wiper set 814 and the control conductor of the trunk 811 so that direct ground potential is applied to the control conductor of the trunk 881 in order to effect the seizure of the trunk circuit 882 and the consequent forwarding of the call via the trunk 883 to the 0 operator switchboard 887. Also at this time, the trunk circuit 882 operates to bring about the return of ground potential over the control conductor of the trunk 881 so as to retain the seize relay R817 in the preselect switch 810 in its operated position and so as to retain the switchthrough relay R640 in the primary selector 600 in its operated position, and so as to retain ground potential upon the control conductor 538 in order to retain the finder 535 in its operated position and to retain the cutoff relay R510 in the line circuit 500 in its operated position.

At this time, the call has been forwarded from the calling subscriber substation T1 to the called 0 operator switchboard 887; and when the call is answered at the 0 operator switchboard 887, a two-way communication connection is completed. Thereafter and as a consequence of disconnection at the 0 operator switchboard 887 and disconnection at the calling subscriber substation T1, the trunk circuit 882 is released bringing about the removal of ground potential from the control conductor of the trunk 881 and the return of battery potential thereon, whereby the seize relay R817 in the preselect switch 810 is restored and the switchthrough relay R640 in the primary selector 600 is restored. The restoration of the switchthrough relay R640 effects the release of the primary selector 600, in the manner explained in Section 3; and also at this time the finder 535 and the line circuit 500 are released. At this time the established connection between the calling subscriber substation T1 and the called 0 operator switchboard 887 is completely released and all of the apparatus involved therein is completely released and available for further use.

In view of the foregoing, it will be understood that the extension of a call from the calling subscriber substation T1 to the toll switchboard 888 in the RA6 office is substantially identical; and this call may proceed via the primary selector 600 in response to the registration therein of the code 110. In this case, the registration of the code mentioned in the primary selector 600 effects operation of the connect relay R740; whereby it may be assumed that the preselect switch 820 extends the call via the trunk 884, the CLR circuit 885 and the trunk 886 to the toll operator switchboard 888. This CLR call is answered at the toll operator switchboard 888 and extended in the usual manner. The subsequent release of this connection is substantially the same as that described above.

*Section 5.—Incomplete calls in the RA6 office*

In the extension of a local call via the primary selector 600, as described in Section 3, and in the extension of operator calls via the primary selector 600, as described in Section 4, it was assumed that the appropriate preselect switches 870, 810 and 820 had previously selected an idle trunk in the corresponding group prior to operation of the corresponding connect relays R760, R770 or R740; whereby, in each case, the switchthrough relay R640 was operated. However, it may occur that all of the trunks in the group appearing before the preselect switch 870, 810, 820, etc., is busy at the time of operation of the corresponding connect relay R760, R770, R740, etc. For example, assuming that a call is directed via the primary selector 600 when all of the trunks 881, etc., appearing before the preselect switch 810 are busy; whereby the preselect switch 810 is operating when the connect relay R770 in the primary selector 600 is operated. In this case, successive ground potential appearing upon the control wiper of the wiper set 814 of the preselect switch 810 causes successive stepping of the rotary magnet via a circuit including the contacts 816 and 817'. More particularly, each time the rotary magnet M815 operates it conditions the wiper set 814 to be driven an additional step, and interrupts, at the contacts 816, the operating circuit therefor. Accordingly, the rotary magnet M815 restores driving the wiper set 814 the additional step, and recompleting, at the contacts 816, the operating circuit therefor. Accordingly, the rotary magnet M815 operates continuously in search of an idle trunk in the associated group 881, etc.; operation of the rotary magnet M815 being arrested in an obvious manner when an idle trunk in the group mentioned is found by the wiper set 814 as a consequence of the presence of battery potential upon the control conductor of the idle trunk thus found.

Accordingly, in the present case, when all of the trunks 881, etc., are busy ground potential is intermittently applied via the contacts 817' and the winding of the seize relay R817 to the control conductor of the trunk 811; whereby the winding of the switchthrough relay R640 is not energized in parallel via the conductor 683 with the priming circuit thereof via the resistor 641' to effect operation thereof as a consequence of operation of the connect relay R770. Thus in this case, shortly following the single digit 0, the timer relay R635 restores as it is of the slow-to-release type. In this case, the timer relay R635 completes, at the contacts 636, a circuit, including the contacts 647 and 617, as well as the grounded conductor 685, for energizing the winding of the lockout relay R625 in order to cause the latter relay to operate shortly thereafer, it being of the slow-to-operate type. Also in this case, since the assigned code 0 has been registered in the first digit register 710 effecting operation of the connect relay R770, the assigned code relay R630 occupies its operated position. The operated assigned code relay R630 opens the contacts 631 and closes the contacts 632 shifting the circuit from the misdial coil 633 to the busy tone coil 634. Upon operating the lockout relay R625 completes, at the contacts 629, a holding circuit, including the contacts 616, for energizing the winding thereof; and interrupts, at the contacts 628, a further point in the test circuit for operating the switchthrough relay R640. Also the lockout relay R625 opens the contacts 626 and closes the contacts 627 completing an alternative loop circuit for energizing the upper and lower windings of the line relay R610 in series with the busy tone coil 634. Accordingly, at this time the busy tone current is returned over the loop circuit to the calling subscriber substation T1 indicating to the subscriber thereat that an all-trunks-busy condition is present in the connected primary selector 600. The subscriber at the calling subscriber substation T1 then disconnects effecting the restoration of the line relay R610 and the subsequent restoration of the hold relay R615, in the manner previously explained; whereby the lockout relay R625 is restored and the primary selector 600 is released, in the manner previously explained.

In view of the foregoing, it will be understood that after the dialing of any assigned code into the primary selector 600, the assigned code relay R630 occupies its operated position and the switchthrough relay R640 fails to operate in the event of an all-trunks-busy condition in the associated group of trunks appearing before the appropriate one of the preselect switches 810, etc., individual to the primary selector 600; whereby the timer relay R635 upon restoring completes the circuit for operating the lockout relay R625 as a consequence of the restored position of the switchthrough relay R640. The conjoint operation of the assigned code relay R630 and the lockout relay R625 brings about the return of the busy tone current to the calling subscriber substation, in the manner described above.

Now in the event the subscriber at the calling subscriber substation T1 should dial an unassigned code into the primary selector 600, then it would follow that no one of the connect relays R770, etc., would be operated at the conclusion of the dialing of the third digit of the unassigned code; whereby the assigned code relay R630 is retained in its restored position. In this case, at the conclusion of the third digit of the unassigned code registered in the primary selector 600, the series relay R620 restores effecting the subsequent restoration of the timer relay R635 and the consequent operation of the lockout relay R625 since the switch through relay R640 occupies its restored position. In this case, upon operating the lockout relay R625 completes, at the contacts 627, a circuit, including the contacts 631 of the restored assigned code relay R630, for returning a misdial tone via the misdial coil 633 over the loop circuit to the calling subscriber substation T1, in order to indicate to the subscriber thereat that the code that has been dialed and registered in the primary selector 600 is an unassigned code. The subscriber at the calling subscriber substation T1 then disconnects in order to effect the release of the primary selector 600, in the manner previously described.

In passing, it is noted that the dial tone current from the dial tone coil 675, the busy tone current from the busy tone coil 634, and the misdial tone current from the misdial tone coil 633 have distinct characteristics producing corresponding distinct audible sounds in the receiver of the telephone instrument at the calling subscriber substation T1 so as appropriately to inform the subscriber thereat with regard to the condition encountered in the primary selector 600.

As explained in more detail hereinafter, only the codes 0, 110, 922, 546, 666, 623 and 726 are assigned in the primary selector 600, and that the registration of any other code in the primary selector 600 is not effective to bring about the operation of one of the connect relays R770, etc., and the consequent operation of the assigned code relay R630.

*Section 6.—A call from a subscriber substation in the RA6 office to a subscriber substation in the WA2 office*

Considering now the extension of a call from a subscriber substation in the RA6 office to a subscriber substation in the WA2 office, such, for example, as a call from the calling subscriber substation T1 in the RA6 office to the called subscriber substation T3 in the WA2 office, the subscriber at the calling subscriber substation T1 initiates the call and dials the called office code WA2 (922) followed by the numerical designation 5443 of the called subscriber line extending to the called subscriber substation T3. Again it may be assumed that this connection is extended from the calling subscriber substation T1 via the finder 535 to the primary selector 600 and that the called office code 922 is registered in the primary selector 600, in the manner previously explained, in order to bring about operation of the connect relay R765 and the consequent extension of the connection via the corresponding preselect switch 860. Thus the primary selector 600 is switched through, in the manner previously explained, and it may be assumed that the preselect switch 860 has selected the line conductors 801 and 802 and the control conductor 806 extending to the particular idle toll record link 900. In this case, when the primary selector 600 is thus switched-through the loop circuit from the calling subscriber substation T1 is extended via the primary selector 600 and the preselect switch 860 into the trunk record link 900, this loop circuit, including the line conductors 801 and 802 and the contacts 941 and 943, as well as the upper and lower windings of the line relay R920; whereby the latter relay is operated over the loop circuit mentioned. Also ground potential, at the contacts 616 of the hold relay R615 in the primary selector 600, is forwarded via the connection over the control conductor 806 to the trunk record link 900 completing a direct circuit, including the contacts 1217, for operating the recapture relay R1215. Upon operating the line relay R920 completes, at the contacts 921, a circuit for operating the hold relay R930; and upon operating the hold relay R930 completes, at the contacts 932, a path, including the contacts 962, for applying ground potential to the conductor 1219. Upon operating the recapture relay R1215 completes, at the contacts 1217' a circuit for operating the lockout relay R1210; and upon operating the lockout relay R1210 completes, at the contact 1218, a holding circuit, including the contacts 1216' and the grounded conductor 1219 for retaining operated the recapture relay R1215. Further, the lockout relay R1210 connects, at the contacts 1218, the grounded conductor 1219 to the control conductor 806 in order to retain operated the preselect switch 860, the primary selector 600, and the finder 535 subsequent to the restoration of the hold relay R615 in the primary selector 600. Moreover, the lockout relay R1210 interrupts, at the contacts 1211, 1213, 1215 and 1217 the normal connections between the windings of the recapture relays R1230, R1225, R1220 and R1215 and the corresponding control conductors 803, 804, 805 and 806 appearing before the various preselect switches 860, etc. Furthermore, the lockout relay R1210 completes, at the contacts 1212, 1214, 1216 and 1218 multiple paths for connecting the grounded conductor 1219 to the control conductors 803, 804, 805 and 806 so as to mark the trunk record link 900 as busy to each of the other primary selectors having access thereto. Accordingly, at this time, the trunk record link 900 has been seized by the preselect switch 860 individual to the operated primary selector 600 and the trunk record link 900 is now marked as busy to the other preselect switches of the other primary selectors in the RA6 office.

Also, upon operating the recapture relay R1215 closes the contacts 1216", 1217" and 1218" completing connections between the respective mark conductors M9, M2 and M2 and the respective code conductors 1C, 2C and 3C appearing before the send sequence switch 1SS thereby to effect the automatic recapture in the trunk record link 900 of the called office code 922 that was employed in the operation of the primary selector 600 to effect seizure via the preselect switch 860 of the toll record link 900. Also upon operating, the recapture relay R1215 closes the contacts 1218' completing a connection between the R conductor and the mark conductor M8, this connection including the contacts 1241" of the restored route relay R1240, thereby to establish the routing digit 8 to be transmitted to the Strowger mechanism 1060, as explained more fully hereinafter. In other words, the operation of the recapture relay R1215 not only effects the recapture and registration of the called office code 922 in the trunk record link 900 but it also established the appropriate translated routing digit 8 to be employed for the purpose of operating the Strowger mechanism 1060.

Also, the hold relay R930 completes, at the contacts 931, an impulsing loop, including the contacts 1311 and 1321 for operating the line relay R980. Upon operating the line relay R980 completes, at the contacts 983, a circuit, including the contacts 1047, for operating the hold relay R1010. Upon operating the hold relay R1010 completes, at the contacts 1011 a ground path in multiple to the contacts 932; and completes, at the contacts 1015 and 1016 paths for applying ground potential to the conductors 1017 and 1018. Ground potential applied to the ground conductor 1017 is forwarded via the contacts 953 to the start conductor 914 extending into the allotter 910; and ground potential applied to the conductor 1018 is extended via the winding of the identity relay R960 and the contacts 954 to the mark conductor 915 extending into the allotter 910. Assuming that the allotter 910 is idle at this time, the application of ground potential to the start conductor 914 completes a circuit, including the contacts 917 and 913, for operating the rotary magnet M912; whereby the rotary magnet M912 is operated buzzer fashion driving the wiper 911 step by step in the clockwise direction until it engages a contact in the associated contact bank having ground potential appearing thereon from a grounded one of the mark conductors. Assuming that the grounded mark conductor 915 is first encountered by the wiper 911 operation of the rotary magnet M912 proceeds until the wiper 911 engages the contact in the associated contact bank terminating the mark conductor 915, whereupon a series circuit is completed for energizing the winding of the identity relay R960 and the winding of the stop relay R916 causing these relays to operate. Upon operating, the stop relay R916 interrupts, at the contacts 917, the circuit for operating the rotary magnet M912 in order to arrest further rotation of the wiper 911 at this time. Accordingly the allotter 910 has operated to select the calling trunk record link 900 in the RA6 office and to allot thereto the common marking cable 540, as explained more fully below.

Upon operating, the identity relay R960 completes, at the contacts 963, a circuit, including the conductor 1086, for operating the gang relay R1420; whereby the gang relay R1420 connects, at the contacts 1421, etc., the four groups of marking conductors T540, H540, D540 and U540, comprising the marking cable 540, to the calling number registers 1401, 1402, 103 and 1404 in the trunk record link 900. It is noted that each of the groups of marking conductors T540, etc., comprises ten individual marking conductors that are respectively connected to the marking relays T1, etc., in the corresponding registers 1401, etc. Also, the identity relay R960 completes, at the contacts 961, a path including the resistor 925, for connecting the booster battery 926 to the conductor 1219; and interrupts, at the contacts 962, the normal path for connecting ground potential to the conductor 1219. Accordingly, at this time, the +70 volts booster battery is substituted for ground potential upon the conductor 1219 and consequently back through the connection upon the control conductor 553 in the line circuit 500 individual to the calling subscriber line 7930. This application of booster battery potential upon the control conductor 553 effects appropriate energization of the cutoff relay R510 in the line circuit 500 so that the cutoff relay R510 is operated through its second step also to close the "Y" contacts 515, 516, 517 and 518; whereby ground potential is applied to the respective seventh, ninth, third and tenth marking conductors in the respective groups of marking conductors T540, H540, D540 and U540, comprising the marking cable 540; whereby the corresponding mark relays in the respective calling number registers 1401, 1402, 1403 and 1404 in the toll record link 900 are operated. For example, in the thousand digit registers 1401, the seventh mark relay T7 is operated completing, at the contacts T72, a holding circuit for energizing the winding thereof that includes the grounded conductor 1084; completing, at the contacts T71 thereof, a connection between the seventh mark conductor M7 and the conductor 1455 extending to the record sequence switch 2RS, for a purpose more fully explained hereinafter; and completing, at the contacts T73, a path for applying ground potential to the conductor 1082, so as to effect operation of the register relay R950. Accordingly, at this time, the directory number 7930 of the calling subscriber line 7930 extending to the calling subscriber substation T1 is identified by virtue of the operated position of the cutoff relay R510 in its second step in the individually associated line circuit 500; and the individual digits of the identified directory number 7930 are respectively registered in the corresponding calling number registers 1401, 1402, 1403 and 1404 in the trunk record link 900.

Upon operating, the register relay R950 interrupts, at the contacts 953, the path for applying ground potential to the start conductor 914; and interrupts, at the contacts 954, the series circuit for retaining operated the identity relay R960 in the trunk record link 900 and the stop relay R916 in the allotter 910. Upon restoring, the stop relay R916 reconnects at the contacts 917, the rotary magnet M912 to the start conductor 914 so that the allotter 910 may select any other one of the trunk record links in the RA6 office that may be calling at this time. Upon restoring, the identity relay R960 interrupts, at the contacts 963, the circuit for retaining operated the gang relay R1420; whereby the latter relay disconnects, at its contacts 1421, etc., the marking cable 540 from the calling number registers 1401, 1402, 1403 and 1404 in the toll record link 900. Also upon restoring, the identity relay R960 recompletes, at the contacts 962, the path for applying ground potential to the conductor 1219; and interrupts, at the contacts 961, the path for connecting the booster battery 926 to the conductor 1219. Accordingly, at this time, booster battery potential is removed from and ground potential is returned upon the connection extending back through the primary selector 600 and including the control conductor 553; whereby the cutoff relay R510 in the line circuit 500 individual to the calling subscriber line 7930 restores back into its first step. When the cutoff relay R510 restores back into its first step, it opens the "Y" contacts 515, etc., retaining open the "X" contacts 511, etc. Accordingly, the cutoff relay R510 removes the markings in the line circuit 500 from the marking conductors in the marking cable 540 that were individual to the calling subscriber line 7930 and returns back into its normal cutoff operation. From the foregoing, it will be understood that the extension of the connection from the calling subscriber substation T1 to the trunk record link 900 brings about the automatic identification of the directory number of the calling subscriber line 7930 extending to the calling subscriber substation T1 and the registration of the individual digits thus identified in the calling number registers 1401, etc., in the trunk record link 900.

Also upon operating, the hold relay R1010 completes, at the contacts 1014, a path, including the contacts 948, for applying ground potential to the conductor 1019 that is connected via the contacts 1312 to the impulsing cam 1317 and therefrom via the contacts 1332 to the rotary magnet 1DS3 of the digit send switch 1DS. Accordingly, at this time, the continuously rotating impulsing cam 1317 transmits ground impulses to the rotary magnet 1DS3 at a rate of ten impulses per second causing the magnet 1DS3 to operate and restore intermittently driving the wipers 1DS1 and 1DS2 step by step in the counterclockwise direction. More particularly, each time the rotary magnet 1DS3 operates, it conditions the wipers 1DS1 and 1DS2 to be driven one step in the counterclockwise direction; and each time the rotary magnet 1DS3 restores it drives the wipers 1DS1 and 1DS2 the step noted. At this time, the send sequence switch 1SS occupies its home position applying ground potential to the route conductor R and via the contacts 1218' of the operated recapture relay R1215 and thence via the contacts 1241" to the eighth marking conductor M8 in the associated group of marking conductors. When the wiper 1DS2 of the digit send switch 1DS is driven out of its home position into engagement with the first contact in the associated contact bank ground potential connected to the associated terminated multiple completes the circuit for operating the shunt relay R1320. Upon operating, the shunt relay R1320 interrupts, at the contacts 1321, the shunt path across the impulsing conductors 1336 and 1337 that are included in the circuit for operating the line relay R980; whereby only the path including the contacts 1DS5 is completed across the impulsing conductors 1336 and 1337 at this time. Also, the shunt relay R1320 completes, at the contacts 1322, a direct circuit for operating the rotary magnet 1SS3 of the send sequence switch 1SS; whereby the rotary magnet 1SS3 upon operating conditions the wipers 1SS1 and 1SS2 to be driven one step in the clockwise direction out of their home positions subsequently incident to the deenergization of the rotary magnet 1SS3, as explained more fully hereinafter.

Accordingly, the next time the rotary magnet 1DS3 operates, it interrupts, at the contacts 1DS5, the impulsing path across the impulsing conductors 1336 and 1337 so as to cause the line relay R980 to restore; and thereafter the rotary magnet 1DS3 restores in order to recomplete, at the contacts 1DS5, the impulsing path across the impulsing conductors 1336 and 1337 so as to effect reoperation of the line relay R980. Thus it will be understood that after the rotary magnet 1DS3 of the digit send switch 1DS effects operation of the shunt relay R1320 impulses are transmitted, at the contacts 1DS5, over the impulsing conductors 1336 and 1337 to the line relay R980; whereby the latter relay follows. Each time the line relay R980 restores and then reoperates, it interrupts and then recompletes, at the contacts 983, the circuit for energizing the winding of the hold relay R1010, whereby the latter relay is retained in its operated position during impulsing, since it is of the slow-to-release type. Also, each time the line relay R980 restores and then reoperates, it completes and then interrupts, at the contacts 984, the previously-mentioned circuit, including the contacts 1047 and 1012, for energizing the winding of the series relay R1030 and for operating the vertical magnet M1062 of the Strowger mechanism 1060; whereby the series relay R1030 operates and remains operated during impulsing, as it is of the slow-to-release type, and the vertical magnet M1065 operates and restores intermittently in order to drive the wiper shaft of the Strowger mechanism 1060 step by step in the vertical direction away from its normal vertical position. When the wiper shaft of the Strowger mechanism 1060 is driven one step in the vertical direction away from its normal vertical position the sets of switch springs S1017 and S1018 are operated, for a purpose more fully explained hereinafter. After the rotary magnet 1DS3 of the digit send switch 1DS has operated and restored eight times following the operation of the shunt relay R1320 to effect the transmission of eight impulses via the contacts 1DS5, comprising the route digit 8, to the line relay R980, the wiper 1DS1 engages the ninth contact in the associated contact bank terminating the grounded marking conductor M8; whereby ground potential applied thereto is extended to the winding of the stop send relay R1330 causing the latter relay to operate. Upon operating the stop send relay R1330 completes, at the contacts 1335, a holding circuit for energizing the winding thereof; and completes, at the contacts 1331, a shunt connection across the impulsing conductors 1336 and 1337 so as to insure the termination of the present digit by retaining the line relay R980 in its operated position. Accordingly, in the present example, the route digit 8 registered in the trunk record link 900 is sent by the digit send switch 1DS to the line relay R980 and repeated thereby to the vertical magnet M1062; whereby the wiper carriage is driven to the eighth level in the associated contact bank terminating the group of outgoing trunks 971, etc., extending to the trunk circuits 1500, etc., terminating the trunk lines 1528, etc., extending directly from the RA6 office to the WA2 office and constituting a first choice route therebetween.

More particularly, upon operating the series relay R1030 completes at the contacts 1031, a circuit, including the contacts 1064, for operating the step relay R1035; whereby the latter relay completes, at the contacts 1036, a holding circuit, including the contacts 1064, for energizing the winding thereof. Now at the conclusion of the route digit 8, the line relay R980 is retained in its operated position, as previously noted, in order to retain operated the hold relay R1010 and to cause the series relay R1030 to restore shortly thereafter, the latter relay being of the slow-to-release type. Upon restoring, the series relay R1030 completes, at the contacts 1032, a circuit, including the contacts 1037 and 1011, for operating the rotary magnet M1063; whereby the wiper shaft of the Strowger mechanism 1060 is driven one step in the rotary direction away from its normal rotary position so that the wipers thereof select the first trunk in the previously selected group. Also upon operating, the rotary magnet M1063 interrupts, at the contacts 1064, the holding circuit for retaining operated the step relay R1035. Upon restoring, the step relay R1035 interrupts, at the contacts 1037, the circuit for retaining operated the rotary magnet M1063. At this time, ground potential appears upon the control conductor of the selected trunk in the event it is busy, whereby there is completed a circuit including the control wiper of the wiper set and the contacts 1044 and 1064, for reoperating the step relay R1035. Upon reoperating, the step relay R1035 recompletes, at the contacts 1037, the circuit for reoperating the rotary magnet M1063; whereby the wiper carriage of the Strowger mechanism 1060 is driven an additional step in the rotary direction so that the wiper set thereof selects the next trunk in the previously selected group. Also, the rotary magnet M1063 effects the restoration of the step relay R1035 and the latter relay upon restoring effects the restoration of the rotary magnet M1063 so that the presently selected trunk in the previously selected group is tested, in the manner described above. When an idle trunk in the previously selected group is selected by the wiper set, battery potential upon the control conductor thereof is applied to the control wiper of the wiper set completing a path, including the contacts 1044 and 1064, for short-circuiting the winding of the step relay R1035; and completing a multiple circuit, also including the contacts 1044 and 1011, for energizing the winding of the switchthrough relay R1040, causing the latter relay to operate. Upon operating, the switchthrough relay R1040 interrupts, at the contacts 1044, the original operating circuit therefor; completes, at the contacts 1045, a direct path for applying ground potential, at the contacts 1011, to the control wiper of the wiper set; and completes, at the contacts 1041 and 1043, a bridge, including the windings 1053 and 1054 of the repeater 1050, the contacts 981 and the upper winding of the answer relay R1020, across the line wipers of the wiper set. Accordingly, at this time, an operative connection is completed between the trunk record link 900 via the Strowger mechanism 1060 and the trunk circuit terminating the selected outgoing trunk, such, for example, as the trunk circuit 1500 terminating the selected outgoing trunk 971; whereby the trunk circuit 1500 effects seizure of the trunk circuit 1700 over the trunk line 1528 and the consequent seizure of the trunk selector 1800 in the WA2 office, as explained more fully hereinafter. Hence, at this time, the connection has been extended from the RA6 office to the WA2 office via the trunk line 1528.

Reverting to the trunk record link 900, upon operating the switchthrough relay R1040 is retained in its operated position by a holding circuit, including the contacts 1011 and 1064, as well as the winding of the step relay R1035. However, the step relay R1035 is not reoperated via the above-traced holding circuit since it is of the marginal type. Further, the switchthrough relay R1040 completes, at the contacts 1042, a circuit, including the contacts 1011, for energizing the lower winding of the answer relay R1020, so as to render the latter relay operative when the upper winding thereof is subsequently energized by a current of the opposite polarity than that which is now supplied thereto over the connection including the trunk line 1528, the answer relay R1020 being of the polarized type. Further the switchthrough relay R1040 prepares, at the contacts 1046, a circuit for operating the shunt relay R1025; and interrupts, at the contacts 1047, the circuit for energizing the winding of the hold relay R1010 so as to cause the latter relay to restore shortly thereafter, it being of the slow-to-release type. Finally, the switchthrough relay R1040 completes, at the contacts 1048, 1049 and 1040 connections in multiple to the contacts 1014, 1015 and 1016 of the hold relay R1010 so that the restoration of the hold relay R1010 is without effect at this time. Moreover, at the contacts 932, ground potential is retained upon the control wiper of the wiper set of the Strowger mechanism 1060 after the opening of the contacts 1011 incident to the restoration of the hold relay R1010.

Continuing now with the operation of the digit send switch 1DS, the stop send relay R1330 also interrupts, at the contacts 1332, the circuit for operating intermittently the rotary magnet 1DS3 from the impulsing cam 1317; and completes, at the contacts 1333, an alternative interrupter circuit, including the contacts 1DS4 and the grounded multiple engaged by the wiper 1DS2, for operating the rotary magnet 1DS3. Accordingly, the rotary magnet 1DS3 operates buzzer fashion by virtue of the inclusion of the interrupter contacts 1DS4 in its operating circuit so that the wipers 1DS1 and 1DS2 are driven step by step further in the counterclockwise direction back into their home positions; whereby the wiper 1DS2 disengages the multiple in the associated contact bank interrupting the operating circuit for the rotary magnet 1DS4 and the multiple circuit for energizing the winding of the shunt relay R1320. Accordingly, further operation of the digit send switch 1DS is arrested at this time and the shunt relay R1320 restores shortly thereafter, it being of the slow-to-release type. Also incident to the operation of the stop send relay R1330, there is interrupted, at the contacts 1334, the circuit for energizing the rotary magnet 1SS3 of the send sequence switch 1SS; whereby the rotary magnet 1SS3 restored to drive the wipers 1SS1 and 1SS2 out of their home positions to engage the first contacts in the associated contact banks. In passing, it is noted that when the wipers 1SS1 and 1SS2 of the send sequence switch 1SS are driven out of their home positions, the set of switch springs 1SS5 is operated, for a purpose more fully explained hereinafter. At this time, the grounded wiper 1SS1 of the send sequence switch 1SS disengages the home contact terminating the route conductor R and engages the first contact terminating the first code conductor 1C in the associated contact bank; whereby ground potential is applied to the first code conductor 1C and consequently to the ninth marking conductor M9, by virtue of the operated position of the recapture relay R1215 provided with the operated contacts 1216".

Upon restoring, the shunt relay R1320 recompletes, at the contacts 1321, the shunt across the impulsing conductors 1336 and 1337; interrupts, at the contacts 1322, a further point in the circuit for operating the rotary magnet 1SS3 of the send sequence switch 1SS; and interrupts, at the contacts 1323, the holding circuit for energizing the winding of the stop send relay R1330 in order to cause the latter relay to restore shortly thereafter, it being of the slow-to-release type. Upon restoring, the stop send relay R1330 interrupts, at the contacts 1331, the other shunt across the impulsing conductors 1336 and 1337; recompletes, at the contacts 1332 the original circuit for operating the rotary magnet 1DS3 of the digit send switch 1DS; interrupts, at the contacts 1333, a further point in the interrupter circuit for operating the rotary magnet 1DS3, and reprepares, at the contacts 1334, the circuit for operating the rotary magnet 1SS3 of the send sequence switch 1SS.

Accordingly, at this time, the rotary magnet 1DS3 of the digit send switch 1DS operates intermittently, whereby the first office code digit 9 is sent, at the contacts 1DS5, over the impulsing conductors 1336 and 1337 to the line relay R980 following operation of the shunt relay R1320, in the manner described above. In the present example, after the rotary magnet 1DS3 has operated and restored ten times transmitting the nine impulses of the first office code digit 9, the wiper 1DS1 of the digit send switch 1DS engages the tenth contact in the associated contact bank terminating the ninth marking conductor M9 having ground potential thereon; whereby the stop send relay R1330 is reoperated, in the manner previously explained, in order to terminate the transmission of the first office code digit 9.

The line relay R980 follows the impulses of the first office code digit 9. Each time the line relay R980 restores and then reoperates, it completes and then interrupts, at the contacts 982, the previously-mentioned circuit for energizing the winding of the shunt relay R1025, in order to cause the latter relay to operate and remain operated during impulsing, as it is of the slow-to-release type. Upon operating, the shunt relay R1025 completes, at the contacts 1026, a path for shorting the winding 1053 of the repeater 1050 and the upper winding of the answer relay R1020 in order to improve impulsing over the line wipers of the wiper set of the Strowger mechanism 1060, and consequently over the trunk line 1528 extending to the WA2 office. Also, each time the line relay R980 restores and then reoperates, it interrupts and then recompletes, at the contacts 981, the previously-traced bridge across the line wipers of the wiper set 1061 of the Strowger mechanism 1060 so as to repeat the impulses of the first office code digit 9 over the trunk line 1528 extending to the WA2 office.

At the conclusion of the transmission of the first office code digit 9, the digit send switch 1DS is returned back into its home position effecting the restoration of the shunt relay R1320 and operation of the rotary magnet 1SS3 of the send sequence switch 1SS, in a manner identical to that explained above. At this time, the grounded wiper 1SS1 engages the second contact in the associated contact bank terminating the second code conductor 2C and completing a marking path via the contacts 1217" of the operated recapture relay R1215 to the second marking conductor M2. In a manner identical to that described above, the digit send switch 1DS sends the second office code digit 2 and then effects operation of the grounded wiper 1SS1 of the send sequence switch 1SS into engagement with the third contact in the associated contact bank terminating the third code conductor 3C and completing the marking path via the contacts 1218" of the operated recapture relay R1215 to the second marking conductor M2. Then the digit send switch 1DS sends the third office code digit 2 and then effects operation of the grounded wiper 1SS1 of the send sequence switch 1SS into engagement with the fourth contact in the associated contact bank terminating the first numerical conductor 1N that is also terminated by the wiper 1N11 of the first numerical register 1N1; whereby the subsequent operation of the toll record link 900 is dependent upon whether the subscriber at the calling subscriber substation T1 has dialed the first numerical digit 5 at this time. The second office code digit 2 and the third office code digit 2 sent by the digit send switch 1DS are repeated by the line relay R980 over the trunk line 1528 extending to the WA2 office, in the manner previously explained.

First assuming that the subscriber at the calling subscriber substation T1 has not had an opportunity to dial the first numerical digit 5 at this time, the wiper 1N11 of the first numerical register 1N1 engages the home contact in the associated contact bank completing a multiple circuit for energizing the winding of the stop send relay R1330 so as to retain the latter relay in its operated position; whereby further operation of the digit send switch 1DS is arrested until the subscriber at the calling subscriber substation T1 has an opportunity to register the first numerical digit 5 in the first numerical register 1N1.

Recapitulating, it will be understood that as a consequence of the seizure of the trunk record link 900 by the primary selector 600, the digit send switch 1DS is operated to send the route digit 8 followed by the recaptured called office code digits 9, 2 and 2 so that the Strowger mechanism 1060 is operated to select the trunk line 1528 extending from the RA6 office to the WA2 office and then the line relay R980 is operated to repeat the called office code digit 9, 2 and 2 over the trunk line 1528 to the WA2 office.

Again reverting to the seizure of the trunk record link 900, via the trunk 800, the line relay R920 is in readiness to follow the first numerical digit 5 dialed at the calling subscriber substation T1 as soon as the subscriber thereat has an opportunity to dial the digit mentioned. Accordingly, when the subscriber at the calling subscriber substation T1 dials the first numerical digit 5, the line relay R920 follows. Each time the line relay R920 restores and then reoperates, it interrupts and then recompletes, at the contacts 921, the circuit for energizing the winding of the hold relay R930 in order to retain the latter relay in its operated position during impulsing, the hold relay R930 being of the slow-to-release type. Also each time the line relay R920 restores and then reoperates, it completes and then interrupts, at the contacts 923, a circuit, including the contacts 933, for energizing the winding of the series relay R1260 in series with the rotary magnet 1N12 of the first numerical register 1N1; this series circuit including the wiper 1RS1 of the register sequence switch 1RS and the engaged home contact in the associated contact bank. Thus the series relay R1260 operates and remains operated during impulsing as it is of the slow-to-release type, and the rotary magnet 1N12 of the first numerical register 1N1 operates and restores five times in order to register the first numerical digit 5 in the first numerical register 1N1. Upon operating, the series relay R1260 completes, at the contacts 1261, a circuit for operating the step relay R1270. At the conclusion of the dialing of the first numerical digit 5 at the calling subscriber substation T1, the line relay R920 is retained in its operated position in order to retain operated the hold relay R930; whereby the series relay R1260 restores shortly thereafter, it being of the slow-to-release type. Upon restoring, the series relay R1260 completes, at the contacts 1262 a circuit for operating the rotary magnet 1RS2 of the register sequence switch 1RS1, whereby the wiper 1RS1 is driven out of its home position one step in the clockwise direction to select the second conductor in the cable 1282 and extending to the rotary magnet 1N22 of the second numerical register 1N2. Also upon restoring, the series relay R1260 interrupts, at the contacts 1261, the circuit for energizing the winding of the step relay R1270 so as to cause the latter relay to restore shortly thereafter, it being of the slow-to-release type. Upon restoring, the step relay R1270 interrupts, at the contacts 1271, the circuit for operating the rotary magnet 1RS2 of the register sequence switch 1RS1. Also when the wiper 1RS1 of the register sequence switch 1RS is driven out of its home position, the set of switch springs 1RS4 is operated to prepare a circuit for operating the release magnet 1RS3.

In view of the foregoing description of the manner in which the first numerical digit 5 dialed at the calling subscriber substation T1 is received by the line relay R920 and repeated thereby and registered in the first numerical register 1N1, it will be understood that in a similar manner the second numerical digit 4, the third numerical digit 4, and the fourth numerical digit 3 dialed at the calling subscriber substation T1 are received by the line relay R920 and repeated thereby and respectively registered in the second numerical register 1N2, the third numerical register 1N3 and the fourth numerical register 1N4. As the various numerical digits are registered in the numerical registers 1N1, 1N2, 1N3, and 1N4, the associated sets of switch springs 1N14, 1N24, 1N34 and 1N44 are operated in order to prepare the associated release magnets 1N13, 1N23, 1N33 and 1N43.

In the foregoing description of the operation of the digit send switch 1DS to send the route digit 8 followed by the called office code digits 9, 2 and 2, it was assumed that when the grounded wiper 1SS1 of the send sequence switch 1SS engaged the fourth contact in the associated contact bank terminating the conductor extending to the wiper 1N11 of the first numerical register 1N1 that the subscriber at the calling subscriber substation T1 had not yet dialed the first numerical digit 5, whereby the stop send relay R1330 was retained in its operated position to prevent further operation of the digit send switch 1DS. Thus when the first numerical digit 5 is dialed at the calling subscriber substation T1 and registered in the first numerical register 1N1, the wiper 1N11 is driven out of its home position into engagement with the fifth contact in the associated contact bank terminating the fifth marking conductor M5 so as to apply ground potential thereto in order to effect the registration in the first numerical register 1N1 of the first numerical digit 5. Moreover when the wiper 1N11 of the first numerical register 1N1 disengages the home contact in the associated contact bank, a circuit for energizing the winding of the stop send relay R1330 is interrupted so that the latter relay restores shortly thereafter, it being of the slow-to-release type. Upon restoring, the stop send relay R1330 initiates reoperation of the digit send switch 1DS to send the first numerical digit 5 registered in the first numerical register 1N1, in a manner identical to that previously described; whereby the stop send relay R1330 is reoperated and the digit send switch 1DS is returned back into its home position effecting the restoration of the shunt relay R1320 and the restoration of the stop send relay R1330, assuming that the second numerical digit 4 is registered in the second numerical register 1N2 at this time.

Thus it will be understood that the digit send switch 1DS is operated to send the first, second, third and fourth numerical digits 5, 4, 4 and 3 respectively registered in the numerical registers 1N1, 1N2, 1N3 and 1N4 to the line relay R980; whereby the latter relay repeats the digits mentioned over the connection, including the trunk line 1528 to the WA2 office. Accordingly, it will be understood that after the Strowger mechanism 1060 operates to bring about the selection of the trunk 971 extending to the trunk circuit 1500 and terminating the trunk line 1528 that the three called office code digits 9, 2 and 2 and the four called numerical digits 5, 4, 4 and 3 are sent thereover; whereby all of the digits mentioned which are employed in the WA2 office bring the extension of the connection to the called subscriber substation T3 therein, as described in detail hereinafter.

Reverting to the operation of the trunk record link 900 following the transmission of the fourth numerical digit 3 from the fourth numerical register 1N4, the send sequence switch 1SS is operated into its eighth position so that the grounded wiper 1SS1 applies ground potential to the terminated conductor 1264 completing a circuit, including the contacts 1315, the conductor 1265 and the contacts 922 for operating the switch relay R940. Upon operating the switch relay R940 completes, at the contacts 945, a holding circuit, including the contacts 962 and 932, for energizing the winding thereof; and interrupts, at the contacts 948, the application of ground potential to the impulsing cam 1317 so as positively to arrest further operation of the digit send switch 1DS at this time. Also the switch relay R940 interrupts, at the contacts 941 and 943, the loop circuit extending from the calling subscriber substation T1 to the upper and lower windings of the line relay R920; and completes, at the contacts 942 and 944, an alternative loop circuit extending to the upper and lower windings of the line relay R980 via the windings 1051 and 1052 of the repeater 1050. Accordingly, the line relay R920 restores interrupting, at the contacts 921, the circuit for retaining operated the hold relay R930 so as to cause the latter relay to restore shortly thereafter, it being of the slow-to-release type. Upon restoring, the hold relay R930 interrupts, at the contacts 931 the bridge path, including the impulsing conductors 1336 and 1337 across the windings of the line relay R980. Also the hold relay R930 interrupts, at the contacts 932, the multiple holding circuits for retaining operated the switch relay R940 and the switchthrough relay R1040; however, the latter relays are retained in their operated position at this time by the return of ground potential over the control wiper of the wiper set 1061 of the Strowger mechanism 1060 from the trunk circuit 1500.

Referring now to the trunk circuits 1500 and 1700 respectively terminating the trunk line 1528 in the RA6 office and in the WA2 office, it is pointed out that the line relay R1530 in the trunk selector 1600 individually associated with the trunk circuit 1500 in the RA6 office is normally connected to the line conductors of the trunk line 1528; and likewise the line relay R1730 in the trunk selector 1800 individually associated with the trunk circuit 1700 in the WA2 office is normally connected to the line conductors of the trunk line 1528. More particularly, battery potential is connected via the upper winding of the line relay R1530 and the contacts 1561 and 1521 to the negative line conductor of the trunk line 1528; and ground potential is connected via the contacts 1541 and the lower winding of the line relay R1530 and the contacts 1563 and 1523 to the positive line conductor of the trunk line 1528. Likewise battery potential is connected via the upper winding of the line relay R1730 and the contacts 1761 and 1721 to the negative line conductor of the trunk line 1528; and ground potential is connected via the contacts 1741 and the lower winding of the line relay R1730 and the contacts 1763 and 1723 to the positive line conductor of the trunk line 1528. Accordingly, when the trunk circuits 1500 and 1700 are idle, the upper windings of the line relays R1530 and R1730 in the trunk selectors 1600 and 1800 are short-circuited in series relation; and likewise, the lower windings of the line relays R1530 and R1730 are short-circuited in series relation; whereby the line relay R1530 and R1730 normally occupy their restored positions. Also when the trunk circuit 1500 is idle, battery potential appears via the winding of the switch relay R1520 upon the control conductor of the trunk 971 marking the trunk 971 as idle to the switching apparatus having access thereto; and likewise, when the trunk circuit 1700 is idle, battery potential appears via the winding of the switch relay R1720 upon the control conductor of the trunk 2301 marking the trunk 2301 as idle to the switching apparatus having access thereto.

Accordingly, when the Strowger mechanism 1060 in the trunk record link 900 operated to seize the trunk 971 the application of ground potential upon the control conductor thereof in the trunk record link 900, in the manner previously explained, completed a circuit for operating the switch relay R1520 in the trunk circuit 1500. Upon operating, the switch relay R1520 interrupts, at the contacts 1521 and 1523, the normal connections between the upper and lower windings of the line relay R1530 and the line conductors of the trunk line 1528; and completes, at the contacts 1522 and 1524, connections between the line conductors of the trunk 971 and the line conductors of the trunk line 1528. The last-mentioned connection includes the upper winding of the answer relay R1020 in the trunk link 900, the winding of the series relay R1515 in the trunk circuit 1500, and the windings of the line relay R1730 in the trunk selector 1800; whereby the series relay R1510 and the line relay R1730 operate; however, the answer relay R1020 does not operate as it is of the polarized type. Upon operating, the series relay R1515 completes, at the contacts 1516, a circuit for operating the hold relay R1510; and upon operating, the hold relay R1510 completes, at the contacts 1511, a holding circuit for retaining operated the switch relay R1520 and a multiple path for applying ground potential to the control conductor of the trunk 971 so as to retain the trunk 971 marked as busy to the switching apparatus having access thereto and to retain the trunk record link 900 in its operated position subsequent to operation of the switch relay R940 therein, in the manner previously explained. Upon operating the line relay R1730 completes, at the contacts 1731, a circuit for operating the hold relay R1735; and upon operating the hold relay R1735 completes, at the contacts 1736, a circuit for operating the busy relay R1725 in the trunk circuit 1700. Upon operating the busy relay R1725 interrupts, at the contacts 1726, the normal path for applying battery potential via the winding of the switch relay R1720 to the control conductor of the trunk 2301; and completes, at the contacts 1727, a path for applying ground potential to the control conductor of the trunk 2301 so as to mark the trunk 2301 as busy to the switching apparatus having access thereto. At this time, the Strowger mechanism 1060 in the trunk record link 900 has operated to seize the trunk 971 extending to the trunk circuit 1500, and the trunk circuit 1500 has operated to switch-off the trunk selector switch 1600 and to switch-on to the trunk line 1528, and the trunk circuit 1700 has operated to mark the trunk 2301 as busy and to switch-on to the trunk selector 1800. Hence at this time the loop circuit extending from the upper winding of the answer relay R1020 in the trunk record link 900 extends directly to the line relay R1730 in the trunk selector 1800 in the WA2 office and includes the contacts 981 of the line relay R980.

Thus the three called office code digits 9, 2 and 2 that were transmitted from the trunk record link 900 over the loop circuit, including the trunk line 1528, were received by the line relay R1730 in the trunk selector 1800 and were respectively registered in the first digit register 1810, the send digit register 1820 and the third digit register 1830, the operation of the trunk selector 1800 to register the three digits mentioned being substantially identical to the operation of the primary selector 600, as described in detail in Section 3. The registration of the called office code digits 9, 2 and 2 in the digit register 1810, 1820 and 1830 effect operation of the sets of switch springs S1819, S1822 and S1832 so that the connect relay R1860 is operated in order to connect the conductors 1844, 1845 and 1846 to the respective conductors of the trunk 1886 extending to the preselected switch 1885; and it may be assumed that the preselect switch has previously operated to select the trunk 1910 extending to the local first selector 2322 in the WA2 office. In this case, the switch through relay R1760 is operated so as to extend the loop circuit from the trunk line 1528 on into the local first selector 2322 and to effect the restoration of the line relay R1730 and the subsequent restoration of the hold relay R1735 in the trunk selector 1800. Further, it may be assumed that the first numerical digit 5 transmitted over the trunk line 1528 effects operation of the local first selector 2322 to bring about selection of the local second selector 2323, and that the second numerical digit 4 transmitted over the trunk line 1528 effects operation of the local second selector 2323 to bring about the selection of the local connector 2324, and that the third and fourth numerical digits 4 and 3 transmitted over the trunk line 1528 effect operation of the local connector 2324 to bring about the selecting of the subscriber line 5443 extending to the called subscriber substation T3 in the WA2 office. Thus at this time, the connection has been extended from the calling subscriber substation T1 in the RA6 office to the called subscriber substation T3 in the WA2 office; and the subsequent operation of the apparatus depends upon the idle or busy condition of the called subscriber substation T3 at this time.

First assuming that the called subscriber substation T3 is busy at this time, the local connector 2324 operates to return busy tone current over the loop circuit, including the trunk line 1528, whereby the busy tone current traverses the windings 1053 and 1054 of the repeater 1050 in the trunk record link 900 inducing a corresponding busy tone signal in the windings 1051 and 1052 that is returned over the connection to the calling subscriber substation T1 in the RA6 office. The subscriber at the calling subscriber substation T1 then disconnects interrupting the loop circuit extending to the line relay R980 in the trunk record link 900 in order to cause the latter relay to restore and interrupt, at the contacts 981, the loop circuit extending between the answer relay R1020 in the trunk record link 900 and the line relay in the local connector 2324. When the loop circuit between the answer relay R1020 in the trunk record link 900 and the line relay in the local connector 2324 is thus interrupted, the local connector 2324, the local second selector 2323 and the local first selector 2322 are released, whereby ground potential is removed from the control conductor 1913 of the trunk 1910 bringing about the release of the preselect switch 1885 and the removal of ground potential from the conductor 1846 so that the switch-through relay R1760 is restored. Upon restoring the switch-through relay R1760 completes, at the contacts 1768, the multiple circuit, including the contacts 1732 and 1738, for operating the release magnets M1813, M1823 and M1833, so as to bring about the release of the corresponding digit registers 1810, 1820 and 1830, whereby the sets of switch springs NS1811, NS1821 and NS1831 are opened to interrupt the circuits for operating the release magnets M1813, M1823 and M1833 so as to effect the restoration of the connect relay R1860. Also the removal of ground potential from the conductor 1846 deenergizes the winding of the busy relay R1725 in the trunk circuit 1700 in order to cause the latter relay to restore shortly thereafter, it being of the slow-to-release type. Upon restoring the busy relay R1725 interrupts, at the contacts 1727, the path for applying ground potential to the control conductor of the trunk 2301 and recompletes, at the contacts 1726, the path for applying battery potential via the winding of the switch relay R1720 to the control conductor of the trunk 2301; whereby the trunk 2301 is again marked as idle to the switching apparatus having access thereto.

Also, when the loop circuit extending from the upper winding of the answer relay R1020 in the trunk record link 900 via the trunk line 1528 is interrupted, the winding of the series relay R1515 is deenergized causing the latter relay to restore and interrupt, at the contacts 1516, the circuit for energizing the winding of the hold relay R1510 so that the latter relay restores shortly thereafter, it being of the slow-to-release type. Upon restoring the hold relay R1510 interrupts, at the contacts 1511, the holding circuit for retaining operated the switch relay R1520; whereby the latter relay recompletes, at the contacts 1521 and 1523, the normal connections, short-circuiting in series relation the windings of the line relays R1530 and R1730 in the trunk selectors 1600 and 1800, as previously explained. Also the removal of ground potential from the control conductor of the trunk 971 and the application of battery potential thereto via the winding of the switch relay R1520 again marks the trunk 971 as idle to the switching apparatus having access thereto. Further, the removal of ground potential from the control conductor of the trunk 971 interrupts the holding circuit for retaining operated the switchthrough relay R1040 in the trunk record link 900. Upon restoring the switchthrough relay R1040 completes, at the contacts 1047, a circuit, including the contacts 984 and 1013, the set of switch springs S1017 and the contacts 973 and 946, for energizing the upper winding of the record relay R970; whereby the latter relay operates to complete, at the contacts 972 and 975, a holding circuit, including the grounded conductor 1084, for energizing the upper winding thereof. Further, the record relay R970 completes, at the contacts 971 and 975 a multiple holding circuit for energizing the winding of the switch relay R940 in order to prevent restoration of the latter relay of the slow-to-release type during the transition time that the record relay R970 is operating. Also, the switchthrough relay R1040 completes, at the contacts 1047, a multiple circuit, including the contacts 984 and 1013 and the set of switch springs S1018, for operating the release magnet M1065; whereby the wiper carriage of the Strowger mechanism 1060 is released and returned to its normal rotary and vertical positions so that the sets of switch springs S1017 and S1018 are opened. The momentary removal of ground potential from the conductor 1219 during the transition time between the restoration of the switchthrough relay R1040 and the operation of the record relay R970 brings about the momentary removal of ground potential from the control conductor 806 of the trunk 800 thereby to effect the restoration of the switchthrough relay R640 in the primary selector 600 and the restoration of the cutoff relay R510 in the line circuit 500. Upon restoring the switchthrough relay R640 completes, at the contacts 649, the previously-traced multiple circuits for operating the release magnets M713, M723 and M733 so as to bring about the release of the digit registers 710, 720 and 730 and the complete release of the primary selector 600, in the manner previously explained. Moreover, the restoration of the cutoff relay R510 brings about the complete release of the line circuit 500, whereby the subscriber line 7930 extending to the calling subscriber substation T1 is again marked as idle to the switching apparatus having access thereto.

Continuing now with the release of the trunk record link 900, upon operating the record relay R970 also completes, at the contacts 976, a path for applying ground potential to the conductor 1085 and consequently to one terminal of the winding 1418 carried by the head 1416 of the magnetic recorder 1410, the other terminal of the winding 1418 being connected in multiple to the wipers 2RS1 and 2RS2 of the record sequence switch 2RS. Also the application of ground potential to the conductor 1085 initiates operation of the motor 1414 of the magnetic recorder 1410 and effects operation of the gang relay R1430. The operating motor 1414 drives the reel 1413 through the power transmission 1415 so that the elongated paramagnetic medium 1411 is unwound from the reel 1412 and wound upon the reel 1413, the medium 1411 being drawn across the pole tabs 1417 of the sensing head 1416 in cooperating relation therewith. Upon operating the gang relay R1430 completes, at the contacts 1431, etc., connections, including the condensers 1441, etc., between the eleven sources of audible frequency extending to the eleven corresponding tone or frequency generators and the respective ten marking conductors M1 to M0, inclusive, and the conductor 1459. Thus frequency No. 1 is connected to the first marking conductor M1 and frequency No. 11 is connected to the conductor 1459. The impulsing cam 1405 operates to energize the rotary magnet 2RS3 intermittently at about twenty impulses per second, whereby the wipers 2RS1 and 2RS2 are driven in the counterclockwise direction at this rate across the contacts in the respectively associated contact banks, the wiper set 2RS1 cooperating with its contact bank prior to cooperation of the wiper 2RS2 with its contact bank. When the wipers 2RS1 and 2RS2 are driven out of their home positions, the set of switch springs 2RS5 is operated to prepare a circuit traced hereinafter, for operating the release magnet 2RS4.

Also upon operating the record relay R970 completes, at the contacts 974, a path for applying ground potential to the conductor 1081 so as to complete a circuit for operating the gang relay R1120. Upon operating, the gang relay R1120 completes, at the contacts 1121, a path for applying ground potential to the no-change conductor 1165 so as to prevent change of the time marked by the master clock 1160 upon the groups of marking conductors 1161, 1162, 1163 and 1164. Also, the gang relay R1120 completes, at the contacts 1122, etc., connections between the groups of marking conductors 1161, etc., and the respective time release registers 1171, 1172, 1173 and 1174, whereby the release time in tens and units of the hour and tens and units of the minute are registered in the registers 1171 to 1174, inclusive. Also, the application of ground potential to the conductor 1081 energizes the winding of the lockout relay R1110, whereby the latter relay operates shortly thereafter, it being of the slow-to-operate type. Upon operating, the lockout relay R1110 completes, at the contacts 1112, a holding circuit, including the grounded conductor 1084, for energizing the winding thereof; and interrupts, at the contacts 1111, the operating circuit of the gang relay R1120; whereby the gang relay R1120 restores, interrupting, at the contacts 1121, the path for applying ground potential to the no-change conductor 1165, and interrupting, at the contacts 1122, etc., the connections between the marking conductors 1161, etc., and the time release registers 1171, etc. Accordingly, it will be understood that the gang relay R1120 is operated only during a short time interval corresponding to the operating time of the lockout relay R1110 and that during this time interval the elements of the release time are appropriately registered in the time release registers 1171 to 1174, inclusive.

Continuing now with the operation of the record sequence switch 2RS, it is noted that the seventh, second and sixth marking conductors M7, M2 and M6 are respectively connected to the seventh, second and sixth audible frequencies by virtue of the operated gang relay R1430; and the marking conductors mentioned are respectively strapped by the straps 1452 to the second, third and fourth contacts of the contact bank associated with the wiper 2RS1 of the record sequence switch 2RS, the straps 1452 effecting a permanent registration of the calling office code RA6 (726) in the record sequence switch 2RS. The home and first contacts associated with the wiper 2RS1 are vacant; while the fifth, sixth, seventh and eighth contacts associated therewith are respectively connected to the conductors 1455, 1456, 1457 and 1458, that respectively extend to the T digit register 1401, the H digit register 1402, the D digit register 1403 and the U digit register 1404 of the calling number registers. The ninth, seventeenth, twenty-second, twenty-seventh, twenty-eighth and twenty-ninth contacts in the contact banks of the wipers 2RS1 and 2RS2 are connected to the conductor 1459 having the eleventh audible frequency connected thereto by virtue of the operated position of the gang relay R1430. The tenth, eleventh, twelfth, thirteenth, fourteenth, fifteenth and sixteenth contacts associated with the wiper 2RS1 are respectively connected to the conductors 1C, 2C, 3C, 1N, 2N, 3N and 4N in the cable 1281. The eighteenth, nineteenth, twentieth and twenty-first contacts associated with the wiper 2RS2 are respectively connected to the conductors 1468, 1469, 1470 and 1471 extending to the time answer registers 1175, 1176, 1177 and 1178; while the twenty-third, twenty-fourth, twenty-fifth and twenty-sixth contacts associated with the wiper 2RS2 are respectively connected to the conductors 1473, 1474, 1475 and 1476 respectively extending to the time release registers 1171, 1172, 1173 and 1174. Finally, the thirtieth contact associated with the wiper 2RS2 terminates the conductor 1480; and an interior grounded contact 2RS7 is provided that cooperates with a spatula 2RS6 carried by the wiper 2RS2; whereby the wiper 2RS2 simultaneously bridges the contacts 2RS7 and the thirtieth contact in the associated contact bank, for a purpose more fully explained hereinafter. At this time, the seventh T relay T7 in the T digit register 1401 occupies its operated position by virtue of the registration of the thousand digit 7 in the T register 1401, whereby the conductor 1455 is connected via the contacts T71 of the operated T7 relay to the seventh marking conductor M7. In a similar manner, the conductors 1456, 1457 and 1458 are connected via the operated relays in the registers 1402, 1403 and 1404 to the respective marking conductors M9, M3 and M0. Further, the conductors 1C, 2C and 3C are connected via the contacts 1216″, 1217″ and 1218″ of the operated recapture relay R1215 to the respective marking conductors 9, 2 and 2; while the conductor 1N, 2N, 3N and 4N are connected via the wipers 1N11, 1N21, 1N31 and 1N41 to the respective marking conductors M5, M4, M4 and M3. The marking conductors 1468, 1469, 1470 and 1471 are open in the time answer registers 1175, 1176, 1177 and 1178 by virtue of the circumstance that the present call was never answered; while the conductors 1473, 1474, 1475 and 1476 are appropriately connected to the marking conductors M1 to M0, inclusive, in the time release registers 1171, 1172, 1173 and 1174 dependent upon the time as established by the master clock 1160 when the gang relay R1120 was operated. For example, it may be assumed that the master clock 1170 stood at this time at 2345 corresponding on a twenty-four hour basis to a time of 11:45 p.m.

Accordingly when the wiper 2RS1 engages the second contact in the associated contact bank, the seventh audible frequency applied to the marking conductor M7 is connected thereto and consequently through the winding 1418 of the recording head 1416 so that an oscillation of this audible frequency is recorded on the moving medium 1411 since the motor 1414 is operating at this time. Thus it will be understood that in the second, etc., positions of the wipers 2RS1 and 2RS2 the various digits are recorded by the recording head 1416 upon the moving medium 1411 and have the significance as follows:

| Positions of the wipers 2RS1 and 2RS2 of the record sequence switch 2RS | Character of the digit | Value of the digit |
| --- | --- | --- |
| H | | |
| 1 | | |
| 2 | 1st digit calling office code | 7 |
| 3 | 2nd digit calling office code | 2 |
| 4 | 3rd digit calling office code | 6 |
| 5 | 1st digit calling line number | 7 |
| 6 | 2nd digit calling line number | 9 |
| 7 | 3rd digit calling line number | 3 |
| 8 | 4th digit calling line number | 0 |
| 9 | Separator digit | 11 |
| 10 | 1st digit called office code | 9 |
| 11 | 2nd digit called office code | 2 |
| 12 | 3rd digit called office code | 2 |
| 13 | 1st digit called line number | 5 |
| 14 | 2nd digit called line number | 4 |
| 15 | 3rd digit called line number | 4 |
| 16 | 4th digit called line number | 3 |
| 17 | Separator Digit | 11 |
| 18 | Answer time-hour ten digit | Blank |
| 19 | Answer time-hour unit digit | Blank |
| 20 | Answer time-minute ten digit | Blank |
| 21 | Answer time-minute unit digit | Blank |
| 22 | Separator digit | 11 |
| 23 | Release time-hour ten digit | 2 |
| 24 | Release time-hour unit digit | 3 |
| 25 | Release time-minute ten digit | 4 |
| 26 | Release time-minute unit digit | 5 |
| 27 | Separator digit | 11 |
| 28 | ----do---- | 11 |
| 29 | ----do---- | 11 |
| 30 | Release | |

Now when the wiper 2RS2 of the record sequence switch 2RS ultimately engages the interior contact 2RS7 and the thirtieth contact in the associated contact bank, a circuit is completed for operating the release relay R1150; and a multiple path is completed for short-circuiting the winding 1418 of the recording head 1416. Upon operating, the release relay R1150 interrupts, at the contacts 1151, the path for applying ground potential to the release conductor 1084 so as to effect the restoration of the various marking relays in the registers 1401, 1402, 1403, 1404, 1171, 1172, 1173 and 1174. Also when ground potential is removed from the release conductor 1084, the holding circuits for retaining operated the lockout relay R1140 and the record relay R970 are interrupted. Upon restoring, the record relay R970 interrupts, at the contacts 976, the circuit for operating the motor 1414 so as to arrest operation of the magnetic recorder 1410. Also the record relay R970 interrupts, at the contacts 976, a multiple circuit for retaining operated the gang relay R1430 and the multiple path for applying ground potential to the impulsing cam 1405 so as to arrest further operation of the record sequence switch 2RS at this time. Further, the record relay R970 interrupts, at the contacts 971, the alternative holding circuit for energizing the winding of the switch relay R940 so as to cause the latter relay to restore shortly thereafter, it being of the slow-to-release type. Also, the record relay R970 interrupts, at the contacts 971, a multiple path for applying ground potential to the conductor 1219 so as to deenergize the windings of the recapture relay R1215, whereby the latter relay restores shortly thereafter, effecting the restoration of the lockout relay R1210. Incident to the release of the T digit register 1401, ground potential was removed from the conductor 1082 bringing about the restoration of the register relay R950. Upon restoring, the register relay R950 completes, at the contacts 951, a path, including the contacts 934, for applying ground potential to the release conductor 1266. The application of ground potential to the release conductor 1266 completes multiple circuits for operating the release magnets 1RS3, 1N13, 1N23, 1N33, 1N43 and 2SR4 of the respective register sequence switch 1RS, the numerical registers 1N1, 1N2, 1N3 and 1N4, and the record sequence switch 2RS, whereby the switches mentioned are released. Also the application of ground potential to the release conductor 1266 completes a circuit, including the wiper 1SS2 of the send sequence switch 1SS and the contacts 1SS4, for operating the rotary magnet 1SS3 buzzer fashion, whereby the wiper 1SS2 is driven back into its home position to disengage the grounded multiple in the associated contact bank. When the send sequence switch 1SS is thus released, the set of switch springs 1SS5 is opened; and when the register sequence switch 1RS and the record sequence switch 2RS are thus released, the sets of switch springs 1RS4 and 2RS5 are opened to deenergize the release magnets 1RS3 and 2RS4. When the numerical switches 1N1, 1N2, 1N3 and 1N4 are thus released, the sets of switch springs 1N14, 1N24, 1N34 and 1N44 are opened to deenergize the respective release magnets 1N13, 1N23, 1N33 and 1N43. Upon restoring, the lockout relay R1210 again connects, at the contacts 1211, etc., the recapture relays R1230, etc., to the control conductors 803, etc., of the trunk 801, whereby battery potential thus returned upon the control conductors mentioned of the trunk 800 again mark the trunk record link 900 as idle to the switching apparatus having access thereto. At this time, the trunk record link 900 is completely released and available for further use and a record has been prepared by the magnetic recorder 1410 that is individual to the present call; which record bears the items above set forth, including the blanks in the answer time items therein; which circumstance demonstrates that the present call was not completed as there were no answer time items in the record.

In further explanation of the record produced by the magnetic recorder 1410, it will be appreciated from the data set forth above that the principal groups of items are separated by the separator digits 11, whereby the medium 1411 may be employed in automatic magnetic-sensing apparatus, for the purpose of producing a permanent record or bill in conjunction with calls, the separator digits 11 being employed to coordinate the control of the apparatus noted. Further, it will be understood that upon the magnetic medium 1411 a series of complete recordings are made in magnetic form indicative of the various calls that have been initiated and extended to the trunk record link 900 in the RA6 office and regardless of whether the calls have been completed or not. Of course, in conjunction with a completed call answer time items appear in the record, as explained more fully hereinafter, that may be employed in conjunction with the release time items for the purpose of establishing an appropriate charge for the connection in conjunction with the calling office code RA6 and the particular called office code appearing in the record. Also it will be apparent that after an appropriate number of calls have been recorded by the magnetic recorder 1410 a fresh medium 1411 will be placed in the recorder 1410 and the used medium 1411 having the records thereon will be removed therefrom and transferred to the recording or billing apparatus, previously noted. In this regard, it will be appreciated that the arrangement of the magnetic recorders 1410, etc., in the various trunk record links 900, etc., in the various offices RA6, etc., permits the recording or billing apparatus to be located at a central business office apart from the offices RA6, etc.

Again reverting to the operation of the trunk record link in conjunction with the extension of the present call from the calling subscriber substation T1 in the RA6 office to the called subscriber substation T3 in the WA2 office, it may occur that the called subscriber substation T3 is idle at this time so that the local connector 2324 that is employed in the connection projects ringing current over the subscriber line 5443 to the called subscriber substation T3 and causes ring-back tone current to be returned over the connection including the trunk line 1528 to the windings 1053 and 1054 of the repeater 1050. The ring-back tone current is repeated via the windings 1053—1054 and the windings 1051—1052 and thus over the calling loop circuit including the subscriber line 7930 to the calling subscriber substation T1 in the RA6 office so as to indicate to the subscriber thereat that the called subscriber substation T3 in the WA2 office is being signalled at this time.

Subsequently when the subscriber at the called subscriber substation T3 in the WA2 office answers the call, the local connector 2324 operates to interrupt the projection of ringing current over the called subscriber line 5443 extending to the called subscriber substation T3 and to interrupt the return of ring-back tone current over the connection including the trunk line 1528 and the calling subscriber line 7930 to the calling subscriber substation T1. Also the local connector 2324 operates to reverse battery potential over the connection including the trunk line 1528, whereby the polarity of the upper winding of the answer relay R1020 in the trunk record link 900 is reversed causing the latter relay to operate. Upon operating, the answer relay R1020 complete, at the contacts 1021, a path for applying ground potential to the conductor 1083 so as to effect operation of the gang relay R1130, whereby the time established by the master clock 1160 is registered in the time answer registers 1175, 1176, 1177 and 1178, in a manner substantially identical to that described heretofore in conjunction with the time release registers 1171, etc. Also the application of ground potential to the conductor 1083 effects operation of the lockout relay R1140 shortly thereafter, whereby the latter relay completes, at the contacts 1142, a holding circuit, including the grounded release conductor 1084, for energizing the winding thereof. Also, the lockout relay R1140 interrupts, at the contacts 1141, the circuit for retaining operated the gang relay R1130 so as to cause the latter relay to restore and disconnect the time answer registers 1175, etc., from the groups of marking conductors 1161, etc., extending to the master clock 1160. Accordingly, the gang relay R1130 is operated only momentarily so as to register in the time answer registers 1175, etc., the time at which the present connection was answered at the called subscriber substation T3 in the WA2 office.

The subsequent release of the established connection between the calling subscriber substation T1 in the RA6 office and the called subscriber substation T3 in the WA2 office proceeds in a manner substantially identical to that previously explained, the line relay R980 being restored incident to disconnection at the calling subscriber substation T1 and the answer relay R1020 being restored incident to the disconnection at the called subscriber substation T3. The resoration of the line relay R980 in conjunction with the restoration of the switch through relay R1040 brings about the release of the Strowger mechanism 1060 and operation of the record relay R970, all in the manner previously explained, whereby the record sequence switch 2RSS is operated to produce a record in conjunction with the present connection. In this case, the record that is produced by the magnetic recorder 1410 is the same as that previously described, with the exception that answer time items also appear upon the medium 1411, instead of the blank spaces as described in the preceding example, the position of the time items being the same as that previously indicated. In the present example, the answer time items that are recorded in the eighteenth, nineteenth, twentieth and twenty-first positions of the wiper 2RS2 of the record sequence switch 2RS might comprise the digits 2330. Accordingly, in this example, the composite record indicates an answer time of 2330 and a release time of 2345 indicating that the present call was established for an overall time interval of 15 minutes which items in the billing apparatus are productive of a charge for the call that is dependent on this time duration of 15 minutes, as noted above.

Again reverting to the operation of the trunk record link 900 incident to the seizure thereof, it was explained that immediately the hold relay R1010 operated following operation of the line relay R980 and as a consequence of the operation of the hold relay R930, as a result of operation of the line relay R920, the digit send switch 1DS was operated to send the route digit 8 established by the operated recapture relay R1215; and in the operation, it was assumed that the Strowger mechanism 1060 responded to the digit 8 to select the group of trunks 971, etc., terminated by the trunk circuits 1500, etc., and terminating the trunk lines 1528, etc., that comprised the first choice route between the RA6 office and the WA2 office, and then operated automatically to select the idle trunk 971 in the group mentioned. While this is the normal operation of the Strowger mechanism 1060 in the toll record link 900, it may occur that all of the trunk lines 1528 in this first choice route are busy, whereby all of the trunks 971 are busy; and in this case, the wiper set 1061 of the Strowger mechanism 1060 is operated in the rotary direction eleven steps in the rotary direction, whereby the set of switch springs S927 is operated completing a circuit, including the contacts 936 and 1253, for energizing the upper winding of the busy relay R1310 causing the latter relay to operate. Upon operating, the busy relay R1310 completes, at the contacts 1314, a holding circuit, including the set of switch springs 1SS5, for energizing the lower winding thereof; and interrupts, at the contacts 1311, the loop circuit extending between the impulsing conductors 1336 and 1337 and the windings of the line relay R980 in order to bring about the restoration of the line relay R980 and the consequent restoration of the hold relay R1010 shortly thereafter, the latter relay being of the slow-to-release type. Upon restoring, the hold relay R1010 completes, at the contacts 1013, the previously-traced circuit, including the set of switch springs S1018, for operating the release magnet M1065; whereby the wiper shaft of the Strowger mechanism 1060 is released and returned back into its normal rotary and vertical positions opening the sets of switch springs S927, S1017 and S1018. Opening of the set of switch springs S1018 deenergizes the release magnet M1065; and opening of the set of switch springs S927 deenergizes the upper winding of the busy relay R1310.

Also upon operating the busy relay R1310 interrupts, at the contacts 1312, a further point in the path for applying ground potential to the impulsing cam 1317; interrupts, at the contacts 1315, a further point in the circuit for operating the switch relay R940; and completes, at the contacts 1316, an interrupter circuit, including the contacts 1SS4, for operating the rotary magnet 1SS3 of the send sequence switch 1SS; whereby the rotary magnet 1SS3 operates buzzer fashion to drive the wipers 1SS2 back into their home positions so that the grounded wiper 1SS1 again engages the home contact terminating the route conductor R and so that the set of switch springs 1SS5 is opened. Also upon operating, the busy relay R1310 completes, at the contacts 1313, a circuit, including the contacts 1243, for energizing the lower winding of the route relay R1240, in order to cause the latter relay to operate through its first step and to complete, at the contacts 1241, a path for short-circuiting the upper winding thereof, the route relay R1240 being of the two-step type. When the set of switch springs 1SS5 is opened, the holding circuit for energizing the lower winding of the busy relay R1310 is interrupted, causing the latter relay to rstore; whereby there is interrupted, at the contacts 1313, the path for short-circuiting the upper winding of the route relay R1240 so that the upper and lower windings of the route relay R1240 are energized in series relation causing the latter relay to operate through its second step. When the route relay R1240 operates through its second step, it opens the contacts 1243 and closes the contacts 1242, and opens the contacts 1241'' etc., and closes the contacts 1243', etc. The opening of the contacts 1241'' removes ground potential from the eighth marking conductor M8, and cancels the selection of the first choice route by the operated recapture relay R1215; while the closing of the contacts 1243' applies ground potential to the fifth marking conductor M5 and establishes a selection of a second choice route by the operated recapture relay R1215; the connection of the grounded route conductor R to the fifth marking conductor 5M corresponds to a second choice route between the RA6 office and the WA2 office via the LI6 office.

Also upon restoring the busy relay R1310 interrupts, at the contacts 1316, the interrupter circuit for operating the rotary magnet 1SS3 of the send sequence switch 1SS; reprepares, at the contacts 1315, the circuit for operating the switch relay R940; interrupts, at the contacts 1314, a further point in the holding circuit for energizing the lower winding thereof; reprepares, at the contacts 1312, the path for applying ground potential to the impulsing cam 1317; and recompletes, at the contacts 1311 the loop circuit for reoperating the line relay R980. Upon reoperating the line relay R980 effects reoperation of the hold relay R1010 and the consequent completion, at the contacts 1014, of the path for applying ground potential to the impulsing cam 1317. The impulsing cam 1317 then operates the rotary magnet 1DS3 of the digit send switch 1DS so as to send the presently registered route digit 5 to the line relay R980 so as to bring about reoperation of the Strowger mechanism 1060, in accordance with the route digit 5. Specifically, the wiper set 1061 selects the group of trunks 972, etc., extending to the trunk circuits 973, etc., and terminating the trunk lines 975, etc., extending between the RA6 office and the LI6 office. The Strowger mechanism 1060 is then operated automatically in the rotary direction to select an idle one of the trunks 972, etc., whereby the recaptured office code digits 9, 2 and 2 are sent over the selected trunk and consequently over the selected trunk line, such, for example, as the trunk line 975, by the digit send switch 1DS, all in the manner previously explained. In passing, it is noted that the switching apparatus in the LI6 office operates to route the present call on a tandem basis to the WA2 office, in a manner substantially identical to that described hereinafter in Section 7, wherein there appears a detailed description of the extension of a tandem call through the WA2 office.

Again reconsidering the operation of the trunk record link 900, it may occur that all of the trunk lines 975, etc., extending between the RA6 office and the LI6 office are busy at this time, whereby the wiper set 1061 of the Strowger mechanism 1060 is again operated eleven steps in the rotary direction again closing the set of switch springs S927 so as to bring about reoperation of the busy relay R1310. This second reoperation of the busy relay R1310 effects the release of the Strowger mechanism 1060 and the send sequence switch 1SS, in the manner previously explained, and operation of the second route relay R1250 through its second step. Now at this time, the operation of the second route relay R1250 through its second step cancels the selection of the second choice route between the RA6 office and the WA2 office and re-established the first choice route between the offices mentioned. Specifically, the operated route relays R1240 and R1250 in conjunction with the operated recapture relay R1215 again connect the grounded route conductor R to the eighth marking conductor M8 so that the digit send switch 1DS is again operated to send the route digit 8 to the Strowger mechanism 1060, whereby the wiper set 1061 is again operated so as to select the group of trunks 971 in an endeavor to find an idle trunk line in the group including the trunk line 1528, etc., at this time.

Now in the event all of the trunk lines in the group, including the trunk line 1528, constituting the first choice route between the RA6 office and the WA2 office should again be tested as busy by the Strowger mechanism 1060, the set of switch springs S927 is again operated incident to the movement of the wiper set 1061 into its eleventh rotary position. In this case, closure of the set of switch springs S927 completes a circuit, including the contacts 936 and 1252, as well as the busy tone coil 924 and the condenser 1263, for applying a busy-tone signal to the line conductor 801 of the trunk 800; whereby the busy-tone signal is returned to the subscriber at the calling subscriber substation T1 indicating to the subscriber thereat that an all-trunks-busy condition has been encountered in the extension of the present connection. The subscriber at the calling subscriber substation T1 then disconnects effecting the release of the apparatus, in a manner substantially identical to that previously explained, whereby the magnetic recorder 1410 in the toll record link 900 may or may not produce a record in a manner previously explained.

More particularly, in conjunction with the release of the trunk record link 900, in the event of an all-trunks-busy condition, as described above, it is pointed out that when the subscriber at the calling subscriber substation T1 disconnects the loop circuit extending to the line relay R920 is interrupted in the present example since the switch relay R940 does not occupy its operated position. Upon restoring, the line relay R920 interrupts, at the contacts 921, the circuit for energizing the winding of the hold relay R930, so that the latter relay restores shortly thereafter, interrupting, at the contacts 931, the circuit for retaining operated the line relay R980. Upon restoring, the line relay R980 interrupts, at the contacts 983, the circuit for energizing the winding of the hold relay R1010 in order to cause the latter relay to restore shortly thereafter, it being of the slow-to-release type. Upon restoring, the hold relay R1010 completes, at the contacts 1013, the circuit, including the set of switch springs S1018, for operating the release magnet M1065; and completes, at the contacts 1013, a multiple circuit, for energizing the lower winding of the record relay R970, only in the special event that the identity apparatus has brought about the identification of the calling subscriber line 7930 at this time so as to effect operation of the register relay R950. In other words, in the present case, the record relay R970 is not operated unless the register relay R950 occupies its operated position; and in the last-mentioned case, the circuit for energizing the lower winding of the record relay R970 includes the contacts 952, 947 and 935. When the lower winding of the record relay R970 is thus energized, the latter relay operates to complete, at the contacts 972 and 975, the holding circuit for energizing the upper winding thereof; whereby the production of the record by the magnetic recorder 1410 is the same as that previously described; and in any case, the ultimate release of the trunk record link 900 is the same as that previously described and regardless of whether a record is made by the magnetic recorder 1410.

Again considering the extension of the present connection from the calling subscriber substation T1 in the RA6 office to the called subscriber substation T3 in the WA2 office, it may occur that when the called office code digits 9, 2 and 2 are registered in the trunk selector 1800 in the WA2 office that all of the trunks 1910, etc., appearing before the preselect switch 1885 and extending to the local first selector 2322, etc., are busy at this time. In this case, the operation of the trunk selector 1800 in response to the all-trunks-busy condition is substantially the same as that previously described in conjunction with the primary selector 600 in that the switchthrough relay R1760 fails to operate; whereby the timer relay R1750 upon restoring completes, at the contacts 1751, the circuit for energizing the winding of the lockout relay R1740 so that shortly thereafter the lockout relay R1740 operates, it being of the slow-to-operate type, operates to complete, at the contacts 1742, an alternative loop circuit extending from the upper winding of the answer relay R1020 in the trunk record link 900 to the upper and lower windings of the line relay R1730 in the trunk selector 1800 and including the busy-tone coil 1752; whereby busy-tone current is returned over the connection and repeated by the repeater 1050 in the trunk record link 900 over the loop circuit extending back to the calling subscriber substation T1. At this time, the subscriber, at the calling subscriber substation T1 disconnects so as to bring about the release of the apparatus, in the manner previously described.

*Section 7.—A call from a subscriber substation in the RA6 office to a subscriber substation in the MA3 office*

Considering now the extension of a call from a calling subscriber substation in the RA6 office to a called subscriber substation in the MA3 office, it is first noted that this call is routed as a tandem call through the WA2 office and it is also pointed out that the MA3 office is a rather small office having a maximum of only one thousand lines, whereby the directory number of the called subscriber substation in the MA3 office includes only three digits and may be 123, for example. Also, it may be assumed that the call is initiated at the calling subscriber substation T1 and is extended via the line circuit 500 and the finder 535 to the primary selector 600, in the manner described in Section 3. In this case, the called office code digits 6, 2 and 3 are then dialed at the calling subscriber substation T1 and registered in the primary selector 600 so as to effect operation of the connect relay R755, and it may be assumed that the preselect switch 850 has previously selected the trunk 800 extending to the trunk record link 900. In this case, when the primary selector 600 switches-through the trunk record link 900 is seized and the recapture relay R1220 is operated to establish the routing digit 8 and to recapture the called office code digits 6, 2 and 3, in a manner similar to that described in Section 6. In this case, upon operating the recapture relay R1220 also completes, at the contacts 1224, a path for applying ground potential to the skip conductor 1273, in order to mark the circumstance to the send sequence switch 1SS that only three numerical digits are to be received from the calling subscriber substation T1 since the called office MA3 is of the thousand line. The digit send switch 1DS then proceeds to operate to transmit the routing digit 8 followed by the called office code digits 6, 2 and 3, and it may again be assumed that the Strowger mechanism 1060 selects the trunk 971 extending to the trunk circuit 1500 terminating the trunk line 1528, whereby the trunk circuit 1700 again seizes the trunk selector 1800. Accordingly, in this case, the called office code digits 6, 2 and 3 are transmitted over the trunk line 1528 by the trunk record link 900 and are registered in the trunk selector 1800.

The registration of the called office code digits 6, 2 and 3 in the trunk selector 1800 effects operation of the connect relay R1850 and it may be assumed that the preselect switch 1870 has previously operated to select the trunk 1890 extending to the trunk register link 1900, the connection including the C conductor 1893 of the trunk 1890; whereby the recapture relay R2120 in the toll register link 1900 is operated. Upon operating, the recapture relay R2120 effects operation of the lockout relay R2110 and closes the contacts 2123 to establish the routing digit 7 connecting the grounded route conductor R to the seventh marking conductor M7. Also the recapture relay R2120 closes the contacts 2124 in order to indicate to the send sequence switch 2SS that only three numerical digits are to be received; and further the recapture relay R2120 closes the contacts 2121', 2122' and 2123' so as to effect the recapture of the called office code digits 6, 2 and 3, by the connection of the office code conductors 1C, 2C and 3C respectively to the marking conductors M6, M2 and M3.

Reverting to the trunk record link 900, the subscriber at the calling subscriber substation T1 proceeds with the dialing of the three numerical digits 1, 2 and 3, causing them to be registered in the corresponding three numerical registers 1N1, 1N2 and 1N3; and the digit send switch 1DS proceeds to send the three registered numerical digits 1, 2 and 3; whereby the wipers of the send sequence switch 1SS are driven into their seventh positions. In the seventh position of the send sequence switch 1SS the wiper 1SS1 selects the fourth numerical register 1N4 and the wiper 1SS2 selects the interior contact thereof terminating the skip conductor 1273 that is grounded by virtue of the operated position of the recapture relay R1220 in the present case. Accordingly, the interrupter circuit, including the wiper 1SS2 and the contacts 1SS4, is completed for operating the rotary magnet 1SS3; whereby the wipers of the send sequence switch 1SS are driven into their eighth positions so that the grounded wiper 1SS1 applies ground potential to the conductor 1264 in order to effect operation of the switch relay R940 and the consequent switch-through of the trunk record link 900 in the normal manner described in Section 6. Accordingly, in the present example, the seizure of the trunk record link 900 brings about the sending of the route digit 8 so that the Strowger mechanism 1060 extends the connection over the trunk line 1528 to the trunk selector 1800 in the WA2 office. Also, the trunk record link 900 automatically transmits the recaptured called office code digits 6, 2 and 3, followed by the three numerical digits 1, 2 and 3 that are subsequently dialed by the subscriber at the calling subscriber substation T1, as previously explained. The three called office code digits are registered in the trunk selector 1800 effecting operation thereof to bring about the selection of the trunk register link 1900; whereby the trunk register link 1900 effects the recapture of the called office code digits 6, 2 and 3 and the subsequent registration of the called numerical digits 1, 2 and 3 therein.

Upon seizure, the trunk register link 1900 operates to transmit the routing digit 7 to the Strowger mechanism 2060, whereby it may be assumed that the wiper set 2061 therein selects the group of trunks, including the trunk 2303, and then an idle trunk therein. For example, the wiper set 2061 of the Strowger mechanism 2060 may select the trunk 2303 extending to the trunk circuit 1918 and terminating the trunk line 1917 extending between the WA2 office and the MA3 office. The trunk register link 1900 then proceeds to send over the connection the recaptured called office code digits 6, 2 and 3, in a manner substantially identical to that described in Section 6 in conjunction with the trunk record link 1900. As the three numerical digits are sent from the trunk record link 900 over the trunk line 1528, they are registered in the three numerical registers 2N1, 2N2 and 2N3 in the trunk register link 1900, and they are repeated by the digit send switch 2DS over the trunk line 1917, the operation of the trunk register link 1900 being substantially identical to the trunk record link 900 described in Section 6. Accordingly, in the present example after the third numerical digit 3 has been transmitted by the digit send switch 2DS, the wipers 2SS1 and 2SS2 of the send sequence switch 2SS engage the seventh contacts in the associated contact banks; whereby the application of ground potential upon the skip conductor 2173 due to the operated position of the recapture relay R2120 effects reoperation of the rotary magnet 2SS3 so that the wipers of the send sequence switch 2SS are driven into their eighth positions. When the grounded wiper 2SS1 of the send sequence switch 2SS engages the eighth contact in the associated contact bank ground potential is applied to the conductor 2174 bringing about operation of the switch relay R1940; whereby the trunk register link 1900 is switched through, in a manner substantially identical to that described in Section 6 in conjunction with the trunk record link 900.

In view of the foregoing, it will be understood that the trunk register link 1900 transmits the three called office code digits 6, 2 and 3 followed by the three numerical digits 1, 2 and 3 over the trunk line 1917; whereby the switching apparatus, not shown, in the MA3 office operates to extend the connection to the called subscriber line. The subsequent operation of the switching apparatus in the MA3 office depends upon the idle or busy condition of the called subscriber line, in the usual manner, and for the present purpose, it may be assumed that the called subscriber line is idle so that the local connector in the MA3 office projects ringing current thereover and returns ring-back tone current over the connection to the upper winding of the answer relay R2020. The ring-back tone current traverses the windings 2053 and 2054 so that the ring-back tone signal induced in the windings 2051 and 2052 is returned over the trunk line 1528 to the repeater 1050 in the trunk record link 900 and thence to the calling subscriber substation T1 in the RA6 office. When the subscriber at the called subscriber substation in the MA3 office answers the call, the local switch train therein reverses polarity over the trunk line 1917 so that the upper winding of the answer relay R2020 in the trunk register link 1900 is poled to operate. Upon operating, the answer relay R2020 reverses, at the contacts 2021 and 2023, the polarity of the connection over the line relay R1950 to the line conductors 1891 and 1892 of the trunk 1890; whereby the polarity of the trunk line 1528 is reversed so as to effect operation of the answer relay R1020 in the trunk record link 900 so as to bring about the registration of the answer time items therein, in the manner explained in Section 6. Accordingly, at this time, a connection is established between the calling subscriber substation in the RA6 office and the called subscriber substation in the MA3 office that includes the WA2 office in tandem relation. In this connection, the trunk record link 900 in the calling RA6 office is connected in tandem relation with the trunk register link 1900 in the tandem WA2 office.

At the conclusion of the connection and incident to disconnections at the calling subscriber substation T1 in the RA6 office and at the called subscriber substation in the MA3 office, the apparatus is released, in a manner substantially identical to that described in Section 6. More particularly, the loop circuit from the calling subscriber substation in the RA6 office to the line relay R980 in the trunk record link 900 is interrupted, whereby the line relay R980 restores effecting the interruption of the loop circuit extending from the upper winding of the answer relay R1020 in the trunk record link 900 to the line relay R1950 in the trunk register link 1900. The line relay R1950 restores to interrupt, at the contacts 1951, the loop circuit between the upper winding of the answer relay R2020 in the trunk register link 1900 and the line relay in the local connector in the RA3 office. Accordingly, the local connector in the RA3 office restores effecting the release of the local switch train so that the trunk circuit 1918 brings about the removal of ground potential from the control conductor of the trunk 2303 so that the trunk register link 1900 is released. The release of the trunk register link 1900 is substantially the same as that of the trunk record link 900, except that no record is produced in the trunk register link 1900. The trunk circuit 1500 then brings about the release of the trunk record link 900 and the consequent release of the primary selector 600, the finder 535 and the line circuit 500, in the manner previously explained. In the present example, the trunk record link 900 operates to produce a record of the items of information in conjunction with the established connection between the calling subscriber substation T1 in the RA6 office and the called subscriber substation in the MA3 office, in a manner substantially identical to that previously described in Section 6.

In conjunction with the extension of the present connection from the trunk register link 1900, it is pointed out that the wiper set 2061 of the Strowger mechanism 2060 may encounter an all-trunks-busy condition after responding to the routing digit 7, whereby the wiper set 2061 is driven eleven steps in the rotary direction effecting closure of the set of switch springs S1956 and the consequent operation of the busy relay R2210 and the resulting release of the send sequence switch 2SS and operation of the retest relay R2140 through its second step. Also operation of the busy relay R2210 effects the release of the Strowger mechanism 2060. The digit send switch 2DS then proceeds again to transmit the routing digit 7 to the Strowger mechanism 2060 in order again to operate the wiper set 2061 in an endeavor to find an idle trunk in the group including the trunk 2303. This operation of the busy relay R2210 and the retest relay R2140 in the trunk register link 1900 is substantially the same as that of the busy relay R1310 and the reroute relay R1240 in the trunk record link 900 except that in the trunk register link 1900 alternative trunking is not provided whereas alternative trunking is provided in the trunk record link 900. It will be apparent that there can be no alternative trunking from the trunk register link 1900 from the WA2 office to the MA3 office since the MA3 office occupies a satellite position with regard to the WA2 office, as clearly illustrated in Fig. 1.

Accordingly, in the present example, the first operation of the busy relay R2210 in the trunk register link 1900 merely effects reoperation of the digit send switch 2DS to send the previously-established routing digit 7. In the event of a second operation of the busy relay R2210, the Strowger mechanism 2060 is again released and the retest relay R2150 is operated through its second step; whereby the digit send switch 2DS is again operated to transmit the established routing digit 7 to the Strowger mechanism 2060. Now in the event of a third operation of the set of switch springs S1956, busy tone current is returned from the busy-tone coil 1955 over the connection by virtue of the operated position of the retest relay R2150, whereby an all-trunks-busy signal is returned over the trunk line 1528 and consequently to the calling subscriber substation T1 in the RA6 office so that the apparatus may be released by disconnection at the calling subscriber substation T1, in the manner previously explained.

In the interest of brevity, a detailed description of the operation of the various relays and registers in the trunk register link 1900 has not been set forth in conjunction with the extension of the present connection by virtue of the circumstance of these relay combinations are substantially identical to the corresponding relay combinations in the trunk record link 900 that have been described in detail in Section 6.

*Section 8.—A call from a subscriber substation in the RA6 office to a subscriber substation in the LI6 office*

The extension of a call from a calling subscriber substation such, for example, as the subscriber substation T1 in the RA6 office to a subscriber substation in the LI6 office proceeds in a manner substantially identical to that described in Section 6; and in this case, the primary selector 600 may be used, whereby the connect relay R745 is operated to route the connection via the preselect switch 830; whereby the connection may be then routed to the trunk record link 900 effecting operation of the recapture relay R1230. The toll record link 900 then transmits the routing digit 5 to the Strowger mechanism 1060, whereby the trunk 972 may be selected causing the trunk circuit 973 to seize the trunk line 975 extending between the RA6 office and the LI6 office. The trunk record link 900 then proceeds to send the three digits of the called office code 5, 4 and 6 over the trunk line 975, whereby the switching apparatus in the LI6 office proceeds with the extension of the connection. Of course, the four numerical digits dialed at the calling subscriber substation T1 are registered in the trunk record link 900, and are sent therefrom over the trunk line 975, whereby the local switch train in the LI6 office completes the connection to the called subscriber line therein. The subsequent release of the established connection and the operation of the trunk record link 900 to produce a record therewith is the same as that explained in Section 6.

*Section 9.—A call from a subscriber substation in the RA6 office to a subscriber substation in the MO6 office*

The extension of a call from a calling subscriber substation, such for example, as the subscriber substation T1 in the RA6 office to a subscriber substation in the MO6 office proceeds in a manner substantially identical to that described in Section 7; and in this case, the primary selector 600 may be used, whereby the connect relay R750 is operated to route the connection via the preselect switch 840; whereby the connection may be then routed to the trunk record link 900 effecting operation of the recapture relay R1225. The trunk record link 900 then transmits the routing digit 5 to the Strowger mechanism 1060, whereby the trunk 972 may be selected causing the trunk circuit 973 to seize the trunk line 975, extending between the RA6 office and the LI6 office. The trunk record link 900 then proceeds to send the three digits of the called office code 6, 6 and 6 over the trunk line 975, whereby the switching apparatus in the LI6 office proceeds with the extension of the connection. Of course, the two numerical digits dialed at the calling subscriber substation T1 are registered in the trunk record link 900, and are sent therefrom over the trunk line 975 to the LI6 office. In this case, the operated recapture relay R1225 grounds both of the skip conductors 1272 and 1273 so that the send sequence switch 1SS in the toll record link 900 is automatically operated from its sixth position into its eighth position following the transmission of the second numerical digit since the MO6 office is a very small office comprising only one hundred lines so that only two numerical digits are dialed at the calling subscriber substation T1.

The trunk selector in the LI6 office upon receiving the called office code 6, 6 and 6 selects a trunk register link therein that recaptures the called office code 6, 6 and 6 and is set to switch-through after the reception of two numerical digits, the trunk register link mentioned then transmits a routing digit to the Strowger mechanism incorporated therein so as to select a trunk line, such, for example, as the trunk line 101 extending between the LI6 office and the MO6 office. The trunk register link in the LI6 office then automatically transmits the called office code 6, 6 and 6 over the trunk line 101 causing the trunk selector in the MO6 office to select the local switch train; the two numerical digits transmitted from the trunk record link 900 over the trunk line 975 are registered in the trunk register link in the LI6 office and are repeated over the trunk line 101 in order to cause the local switch train in the MO6 office to extend the connection to the called subscriber substation therein. The subsequent release of the established connection and the operation of the trunk record link 900 to produce a record in conjunction therewith is the same as that explained in Section 6.

*Section 10.—Other calls in the telephone system and the fundamental method thereof*

In view of the foregoing, it will be understood that calls from the WA2 office to the RA6 office, to the MA3 office and to the LI6 offices, calls from the LI6 office to the RA6 office, to the WA2 office and to the MO6 office, calls from the MA3 office to the WA2 office, and calls from the MO6 office to the LI6 office are extended in a manner that is the same as a call from the RA6 office to the WA2 office, as described in Section 6. Likewise a call from the WA2 office to the MO6 office, a call from the LI6 office to the MA3 office, a call from the MO6 office to the WA2 office, a call from the MA3 office to the LI6 office, a call from the MA3 office to the RA6 office, a call from the MO6 office to the RA6 office are extended in a manner that is the same as a call from the RA6 office to the MA3 office, as described in Section 7. Finally, a call from the MA3 office to the MO6 office, as well as a call from the MO6 to the MA3 office is extended in a manner that is similar to a call from the RA6 office to the MA3 office, as described in Section 7, except that in these cases, trunk register links are employed in both the WA2 office and in the LI6 office in tandem relation with each other and with the trunk record link in the calling MA3 office or the calling MO6 office.

Recapitulating, and concerning the fundamental method of setting up a connection in the telephone system, it will be understood that in a calling office, the primary selector always registers the complete called office code or called service code, and completes connections directly to the local switch train or to the called service, without reference to the trunk record links. Now in the event the called office code registered in a primary selector indicates a distant called office, the primary selector operates to select one of the trunk record links; whereby the selected trunk record link automatically recaptures the called office code and immediately selects an idle trunk line to the next office to which the call should be extended in route to the called office and then immediately sends over the selected trunk line the complete called office code. In the next office the trunk selector is operated by the complete called office code and either selects the local switch train in that office or a trunk register link therein. In the event the trunk selector selects the local switch train, the local switch train is subsequently operated by the numerical digits transmitted over the trunk line. On the other hand, in the event the trunk selector selects a trunk register link, the trunk register link automatically recaptures the called office code and immediately selects an idle trunk line to the next office to which the connection should be extended in route to the called office and then immediately sends over the selected trunk line the complete called office code. Ultimately in the called office, the trunk selector selects the local switch train. In the event of the tandem connections above described, the numerical digits dialed at the calling subscriber substation in the calling office are registered in the trunk record link therein and are sent therefrom over the connected trunk line; in each tandem office, the numerical digits are registered in the trunk register link therein and are sent therefrom over the connected trunk line; and finally in the called office, the numerical digits effect operation of the local switch train to extend the connection to the called subscriber line.

In view of the foregoing, it will be understood that in a calling office, a trunk record link is always taken into use by a primary selector when the call is to be extended out of the calling office; and in a tandem office, a trunk register link is always taken into use by a trunk selector since the call is to be extended through the tandem office. Finally, in a called office, the local switch train is operated by the numerical digits received over the connected trunk line from the preceding trunk record link in a calling office or from the preceding trunk register link in a tandem office depending upon whether the connection includes a tandem office. Moreover, the trunk record link that is taken into use in a calling office always makes a magnetic record in conjunction with a call routed thereby, whereby the determination of whether a special charge is to be made for the call may be made at a subsequent time from the magnetic record in a central billing office.

The arrangement in the telephone system of the three-digit primary selectors and the three-digit trunk selectors is very advantageous in view of the fact that the complete called office code is received and registered thereby before any switching takes place so that three-digit office codes may be employed to designate each office, regardless of the number of lines therein, and so that the matter of recapture by a trunk record link or by a trunk register link is simplified in that the recapture always involves the complete three digits of a called office code.

Section 11.—Conclusion

In view of the foregoing, it is apparent that there has been provided an improved switching arrangement for setting up suburban toll calls, without the assistance of operators, in a simple and straightforward manner, so that trunk record links incorporating register and sender and recorder equipment are employed only in conjunction with these suburban toll calls.

While there has been described what is at present considered to be the preferred embodiment of the invention, it will be understood that various modifications may be made therein, and it is intended to cover in the appended claims, all such modifications as fall within the true spirit and scope of the invention.

What is claimed is:

1. In a telephone system including a plurality of offices each identified by an individual three-digit office code; an originating one of said offices comprising a calling line, a unitary three-digit primary selector, means for connecting said calling line to said primary selector, means included in said primary selector for registering the three digits of a called office code dialed over said calling line, local switching apparatus, an interoffice link, a trunk line over which a connection may be routed from said originating office to another of said offices, means controlled by the registration in said primary selector of the three digits of the office code of said originating office for operating said primary selector to seize said local switching apparatus, means controlled by the registration in said primary selector of the three digits of the office code of said other office for operating said primary selector to seize said interoffice link, means controlled by the seizure of said interoffice link by said primary selector for recapturing and registering therein the three digits of the called office code registered in said primary selector and for seizing said trunk line and for connecting said interoffice link thereto, and means controlled by the seizure of said trunk line for sending thereover the three digits of the called office code registered in said interoffice link.

2. The telephone system set forth in claim 1, wherein said local switching apparatus includes means controlled by numerical digits dialed over said calling line for extending further said connection therefrom, and said interoffice link includes means for registering numerical digits dialed over said calling line and means for sending over said trunk line numerical digits registered therein.

3. In a telephone system including a plurality of offices each identified by an individual three-digit office code; an originating one of said offices comprising a calling line, a unitary three-digit primary selector, means for connecting said calling line to said primary selector, means included in said primary selector for registering the three digits of a called office code dialed over said calling line, local switching apparatus, an interoffice link, a trunk line over which connections may be routed from said originating office to a plurality of other of said offices, means controlled by the registration in said primary selector of the three digits of the office code of said originating office for operating said primary selector to seize said local switching apparatus, means controlled by the registration in said primary selector of the three digits of the office code of any one of said other offices for operating said primary selector to seize said interoffice link, means controlled by the seizure of said interoffice link by said primary selector for recapturing and registering therein the three digits of the called office code registered in said primary selector and for seizing said trunk line and for connecting said interoffice link thereto, and means controlled by the seizure of said trunk line for sending thereover the three digits of the called office code registered in said interoffice link.

4. In a telephone system including a plurality of offices each identified by an individual three-digit office code; an originating one of said offices comprising a calling line, a unitary three-digit primary selector, means for connecting said calling line to said primary selector, means included in said primary selector for registering the three digits of a called office code dialed over said calling line, local switching apparatus, an interoffice link, a plurality of trunk lines respectively extending to other of said offices, means controlled by the registration in said primary selector of the office code of said originating office for operating said primary selector to seize said local switching apparatus, means controlled by the registration in said primary selector of the three digits of the office code of any one of said other offices for operating said primary selector to seize said interoffice link, means controlled by the three digits of the seizure of said interoffice link by said primary selector for recapturing and registering therein the three digits of the called office code registered in said primary selector, means controlled by the registration of a called office code in said interoffice link for seizing the corresponding one of said trunk lines and for connecting said interoffice link thereto, and means controlled by the seizure of said one trunk line for sending thereover the three digits of the called office code registered in said interoffice link.

5. In a telephone system including an originating office and a plurality of other offices interconnected by trunk lines, each of said offices being identified by an individual three-digit office code; said originating office comprising a calling line, automatic local switching apparatus, an operator switchboard identified by a single-digit operator code, a trunk link, a unitary three-digit primary selector connected to said calling line and selectively operated by a code dialed over said calling line, said primary selector being operated by the three digits of the office code of said originating office to select said local switching apparatus, said primary selector being operated by the single digit of said operator code to select said operator switchboard, said primary selector being operated by the three digits of the office code of any one of said other offices to select said trunk link, means controlled by the selection of said trunk link by said primary selector for recapturing and registering in said trunk link the three digits of the particular office code employed in the operation of said primary selector to select said trunk link, and means controlled by the three digits of the particular office code registered in said trunk link for further extending said connection from said trunk link via one of said trunk lines to the corresponding one of said other offices.

6. In a telephone system including a plurality of offices each identified by an individual three-digit office code; an originating one of said offices comprising a calling line, a unitary three-digit primary selector, means for connecting said calling line to said primary selector, a plurality of interoffice links each provided with a plurality of incoming channels respectively corresponding to the other of said offices, said primary selector including a plurality of preselect means respectively corresponding to said incoming channels, each of said preselect means preselecting an idle incoming channel in the corresponding group of incoming channels, means included in said primary selector for registering the three digits of a called office code dialed over said calling line, means controlled by the registration in said primary selector of the three digits of the called office code individual to any other of said offices for connecting said primary selector to the preselected incoming channel in the corresponding group of said incoming channels, and means controlled by the connection of said primary selector to one of said incoming channels for registering in the corresponding one of said interoffice links the three digits of the corresponding called office code.

7. The telephone system set forth in claim 6, wherein said primary selector further comprises means controlled by the registration therein of the three digits of an unassigned called office code for returning over said calling line a corresponding misdial signal.

8. The telephone system set forth in claim 6, wherein said primary selector further comprises means controlled by the registration therein of the three digits of a called office code corresponding to a busy group of said incoming channels for returning over said calling line a corresponding busy signal.

9. In a telephone system including a plurality of offices each identified by an individual three-digit office code; an originating one of said offices comprising a calling line, a unitary three-digit primary selector, means for connecting said calling line to said primary selector, said primary selector including first and second and third digit registers, means included in said primary selector for registering the respective first and second and third digits of a called office code dialed over said calling line in respective ones of said first and second and third digit registers, an interoffice link provided with a plurality of incoming channels respectively corresponding to the other of said offices, means controlled by the registration in said first and second and third digit registers of the respective first and second and third digits of the called office code individual to any other of said offices for connecting said primary selector to the corresponding one of said incoming channels, and means controlled by the connection of said primary selector to one of said incoming channels for registering in said interoffice link the three digits of the corresponding called office code.

10. In a telephone system including a plurality of offices each identified by an individual three-digit office code; an originating one of said offices comprising a calling line, a unitary three-digit primary selector, means for connecting said calling line to said primary selector, means included in said primary selector for registering the three digits of a called office code dialed over said calling line, said primary selector including a plurality of connect relays respectively corresponding to the other of said offices, means controlled by the registration of the called three digits of the office code individual to any other of said offices for operating the corresponding one of said connect relays, an interoffice link provided with a plurality of incoming channels respectively corresponding to said connect relays, means controlled by operation of one of said connect relays for connecting said primary selector to the corresponding one of said incoming channels, and means controlled by the connection of said primary selector to one of said incoming channels for registering in said interoffice link the three digits of the corresponding called office code.

11. In a telephone system including an originating office and a tandem office and a plurality of other offices interconnected by trunk lines, each of said other offices being identified by an individual three-digit office code, and means for extending a connection from said originating office over a first of said trunk lines to said tandem office and then for sending over said first trunk line the three digits of the office code of any one of said other offices; said tandem office comprising a link, a unitary three-digit trunk selector connected to said first trunk line and selectively operated by the three digits of the office code sent over said first trunk line to select said link, means controlled by the selection of said link by said trunk selector for recapturing and registering in said link the three digits of the particular office code employed in the operation of said trunk selector to select said link, and means controlled by the three digits of the particular office code registered in said link for further extending said connection from said link via a second of said trunk lines to the corresponding one of said other offices.

12. In a telephone system including an originating office and a tandem office and a plurality of other offices interconnected by trunk lines, each of said other offices being identified by an individual three-digit office code, and means for extending a connection from said originating office over a first of said trunk lines to said tandem office and then for sending over said first trunk line the three digits of the office code of any one of said other offices; said tandem office comprising a link, a unitary three-digit trunk selector connected to said first trunk line and selectively operated by the three digits of the office code sent over said first trunk line to select said link, means controlled by the operated position of said trunk selector in selecting said link for recapturing and registering in said link the three digits of the particular office code employed in the operation of said trunk selector, and means controlled by the three digits of the particular office code registered in said link for further extending said connection from said link via a second of said trunk lines to the corresponding one of said other offices.

13. In a telephone system including an originating office and a tandem office and a plurality of other offices interconnected by trunk lines, each of said other offices being identified by an individual three-digit office code, and means for extending a connection from said originating office over a first of said trunk lines to said tandem office and then for sending over said first trunk line the three digits of the office code of any one of said other offices; said tandem office comprising a link including a plurality of incoming channels respectively corresponding to said other offices, a unitary three-digit trunk selector connected to said first trunk line and selectively operated by the three digits of the office code sent over said first trunk line to select a corresponding one of said incoming channels, means including in said link and controlled by the selection of one of said incoming channels by said trunk selector for recapturing and registering therein the three digits of the corresponding office code, and means controlled by the three digits of the particular office code registered in said link for further extending said connection from said link via a second of said trunk lines to the corresponding one of said other offices.

14. The telephone system set forth in claim 11, wherein said link includes means controlled by the further extension of said connection over said second trunk line for sending over said second trunk line the three digits of said particular office code registered therein.

15. In a telephone system including an originating office and a tandem office and a plurality of other offices interconnected by trunk lines, said tandem office and each of said other offices being identified by individual three-digit office codes, and means for extending a connection from said originating office over a first of said trunk lines to said tandem office and then for sending over said first trunk line the three digits of the office code of either said tandem office or any one of said other offices; said tandem office comprising automatic local switching apparatus, a trunk link, a unitary three-digit trunk selector connected to said first trunk line and selectively operated by the three digits of the office code sent over said first trunk line, said trunk selector being operated by the three digits of the office code of said tandem office to select said local switching apparatus and operated by the three digits of the office code of any one of said other offices to select said trunk link, means controlled by the selection of said trunk link by said trunk selector for recapturing and registering in said trunk link the three digits of the particular office code employed in the operation of said trunk selector to select said trunk link, and means controlled by the three digits of the particularly office code registered in said trunk link for further extending said connection from said trunk link via a second of said trunk lines to the corresponding one of said other offices.

16. In a telephone system including an originating office and a tandem office and a plurality of other offices interconnected by trunk lines, said tandem office and each of said other offices being identified by individual three digit office codes, and means for extending a connection from said originating office over a first of said trunk lines to said tandem office and then for sending over said first trunk line the three digits of the office code of either said tandem office or any one of said other offices; said tandem office comprising automatic local switching apparatus, a trunk link, a unitary three-digit trunk selector connected to said first trunk line and selectively operated by the three digits of the office code sent over said first trunk line, said trunk selector being operated by the three digits of the office code of said tandem office to select said local switching apparatus and operated by the three digits of the office code of any one of said other offices to select said trunk link, means controlled by the operated position of said trunk selector in selecting said trunk link for recapturing and registering in said trunk link the three digits of the particular office code employed in the operation of said trunk selector, and means controlled by the three digits of the particular office code registered in said trunk link for further extending said connection from said trunk link via a second of said trunk lines to the corresponding one of said other offices.

17. In a telephone system including an originating office and a tandem office and a plurality of other offices interconnected by trunk lines, said tandem office and each of said other offices being identified by individual three digit office codes, and means for extending a connection from said originating office over a first of said trunk lines to said tandem office and then for sending over said first trunk line the three digits of the office code of either said tandem office or any one of said other offices; said tandem office comprising automatic local switching apparatus, a trunk link including a plurality of incoming channels respectively corresponding to said other offices, a unitary three-digit trunk selector connected to said first trunk line and selectively operated by the office code sent over said first trunk line, said trunk selector being operated by the three digits of the office code of said tandem office to select said local switching apparatus and operated by the three digits of the office code of any one of said other offices to select the corresponding one of said incoming channels, means included in said trunk link and controlled by the selection of one of said incoming channel's trunk selector for recapturing and registering therein the three digits of the corresponding office code, and means controlled by the three digits of the particular office code registered in said trunk link for further extending said connection from said trunk link via a second of said trunk lines to the corresponding one of said other offices.

18. The telephone system set forth in claim 15, wherein said trunk link includes means controlled by the further extension of said connection over said second trunk line for sending over said second trunk line the three digits of said particular office code registered therein.

19. In a telephone system including an originating office and a tandem office and a plurality of other offices interconnected by trunk lines, each of said offices being identified by an individual three digit office code; said originating office comprising a calling subscriber line, a trunk record link, a unitary three digit primary selector connected to said calling subscriber line and selectively operated by the office code dialed over said calling subscriber line, said primary selector being operated by the three digits of the office code of either said tandem office or any one of said other offices to select said trunk record link, means controlled by the selection of said trunk record link by said primary selector for recapturing and registering in said trunk record link the three digits of the particular office code employed in the operation of said primary selector to select said trunk record link, additional means controlled by the selection of said trunk record link by said primary selector for identifying said calling subscriber line and for registering the identity thereof in said trunk record link, and means controlled by the three digits of the particular office code registered in said trunk record link for further extending said connection therefrom via a first of said trunk lines to said tandem office and then for sending the three digits of said particular office code over said first trunk line; said tandem office comprising a trunk register link, a unitary three-digit trunk selector connected to said first trunk line and selectively operated by the three digits of the office code sent over said first trunk line, said trunk selector being operated by the three digits of the office code of any one of said other offices to select said trunk register link, means controlled by the selection of said trunk register link by said trunk selector for recapturing and registering in said trunk register link the three digits of the particular office code employed in the operation of said trunk selector to select said trunk register link, and means controlled by the three digits of the particular office code registered in said trunk register link for further extending said connection therefrom via a second of said trunk lines to the corresponding one of said other offices and then for sending the three digits of said particular office code over said second trunk line.

20. The telephone system set forth in claim 19, wherein said originating office also comprises local switching apparatus, and said primary selector is operated by the three digits of the office code of said originating office to select said local switching apparatus.

21. The telephone system set forth in claim 19, wherein said tandem office also comprises local switching apparatus and said trunk selector is operated by the three digits of the office code of said tandem office to select said local switching apparatus.

References Cited in the file of this patent
UNITED STATES PATENTS

| | | |
|---|---|---|
| 2,300,829 | Gooderham | Nov. 3, 1942 |
| 2,301,015 | Busch | Nov. 3, 1942 |
| 2,333,324 | Low | Nov. 2, 1943 |
| 2,562,717 | Holden | July 31, 1951 |
| 2,594,014 | Haines | Apr. 22, 1952 |
| 2,604,540 | Blake | July 22, 1952 |
| 2,621,256 | Stehlik | Dec. 9, 1952 |
| 2,678,968 | Gooderham | May 18, 1954 |
| 2,739,184 | Baird et al. | Mar. 20, 1956 |